United States Patent
Muller et al.

(10) Patent No.: US 9,218,376 B2
(45) Date of Patent: Dec. 22, 2015

(54) INTELLIGENT DATA SOURCING IN A NETWORKED STORAGE SYSTEM

(71) Applicant: CommVault Systems, Inc., Oceanport, NJ (US)

(72) Inventors: Marcus S. Muller, Cambridge, MA (US); David Ngo, Shrewsbury, NJ (US)

(73) Assignee: COMMVAULT SYSTEMS, INC., Tinton Falls, NJ (US)

( * ) Notice: Subject to any disclaimer, the term of this patent is extended or adjusted under 35 U.S.C. 154(b) by 167 days.

(21) Appl. No.: 13/916,467

(22) Filed: Jun. 12, 2013

(65) Prior Publication Data

US 2013/0339390 A1 Dec. 19, 2013

Related U.S. Application Data

(60) Provisional application No. 61/659,387, filed on Jun. 13, 2012.

(51) Int. Cl.
*G06F 17/30* (2006.01)
*G06F 11/14* (2006.01)

(52) U.S. Cl.
CPC ...... *G06F 17/30306* (2013.01); *G06F 11/1412* (2013.01); *G06F 11/1448* (2013.01); *G06F 11/1451* (2013.01); *G06F 11/1464* (2013.01); *G06F 17/30082* (2013.01); *G06F 17/30097* (2013.01); *G06F 17/30159* (2013.01); *G06F 17/30221* (2013.01); *G06F 17/30283* (2013.01); *G06F 17/30575* (2013.01); *G06F 17/30943* (2013.01); *G06F 11/1453* (2013.01)

(58) Field of Classification Search
CPC .......... G06F 17/3015; G06F 17/30156; G06F 17/30159
See application file for complete search history.

(56) References Cited

U.S. PATENT DOCUMENTS

| 4,686,620 A | 8/1987 | Ng |
| 4,995,035 A | 2/1991 | Cole et al. |
| 5,005,122 A | 4/1991 | Griffin et al. |

(Continued)

FOREIGN PATENT DOCUMENTS

| EP | 0259912 | 3/1988 |
| EP | 0405926 | 1/1991 |

(Continued)

OTHER PUBLICATIONS

Armstead et al., "Implementation of a Campus-Wide Distributed Mass Storage Service: The Dream vs. Reality," IEEE, 1995, pp. 190-199.

(Continued)

*Primary Examiner* — Khanh Pham

(74) *Attorney, Agent, or Firm* — Knobbe, Martens, Olson & Bear, LLP

(57) ABSTRACT

A storage system according to certain embodiments includes a repository of client-side data block signature information representative of a set of data blocks stored in a primary storage subsystem. In some cases, the system sources data blocks for secondary copy and restore operations from the primary storage subsystem instead of the secondary storage subsystem. Where multiple primary storage components (e.g., multiple client computing devices) contain copies of a data blocks involved in a secondary copy or restore operation, the system can decide which client to source the data block from based on sourcing criteria.

20 Claims, 22 Drawing Sheets

(56) References Cited

U.S. PATENT DOCUMENTS

| | | | |
|---|---|---|---|
| 5,093,912 | A | 3/1992 | Dong et al. |
| 5,133,065 | A | 7/1992 | Cheffetz et al. |
| 5,193,154 | A | 3/1993 | Kitajima et al. |
| 5,212,772 | A | 5/1993 | Masters |
| 5,226,157 | A | 7/1993 | Nakano et al. |
| 5,239,647 | A | 8/1993 | Anglin et al. |
| 5,241,668 | A | 8/1993 | Eastridge et al. |
| 5,241,670 | A | 8/1993 | Eastridge et al. |
| 5,276,860 | A | 1/1994 | Fortier et al. |
| 5,276,867 | A | 1/1994 | Kenley et al. |
| 5,287,500 | A | 2/1994 | Stoppani, Jr. |
| 5,321,816 | A | 6/1994 | Rogan et al. |
| 5,333,315 | A | 7/1994 | Saether et al. |
| 5,347,653 | A | 9/1994 | Flynn et al. |
| 5,410,700 | A | 4/1995 | Fecteau et al. |
| 5,448,724 | A | 9/1995 | Hayashi et al. |
| 5,491,810 | A | 2/1996 | Allen |
| 5,495,607 | A | 2/1996 | Pisello et al. |
| 5,499,367 | A | 3/1996 | Bamford et al. |
| 5,504,873 | A | 4/1996 | Martin et al. |
| 5,544,345 | A | 8/1996 | Carpenter et al. |
| 5,544,347 | A | 8/1996 | Yanai et al. |
| 5,559,957 | A | 9/1996 | Balk |
| 5,619,644 | A | 4/1997 | Crockett et al. |
| 5,625,793 | A | 4/1997 | Mirza |
| 5,638,509 | A | 6/1997 | Dunphy et al. |
| 5,673,381 | A | 9/1997 | Huai et al. |
| 5,699,361 | A | 12/1997 | Ding et al. |
| 5,729,743 | A | 3/1998 | Squibb |
| 5,732,240 | A | 3/1998 | Caccavale |
| 5,751,997 | A | 5/1998 | Kullick et al. |
| 5,758,359 | A | 5/1998 | Saxon |
| 5,761,677 | A | 6/1998 | Senator et al. |
| 5,764,972 | A | 6/1998 | Crouse et al. |
| 5,765,173 | A | 6/1998 | Cane et al. |
| 5,778,395 | A | 7/1998 | Whiting et al. |
| 5,812,398 | A | 9/1998 | Nielsen |
| 5,813,008 | A | 9/1998 | Benson et al. |
| 5,813,009 | A | 9/1998 | Johnson et al. |
| 5,813,017 | A | 9/1998 | Morris |
| 5,875,478 | A | 2/1999 | Blumenau |
| 5,887,134 | A | 3/1999 | Ebrahim |
| 5,901,327 | A | 5/1999 | Ofek |
| 5,924,102 | A | 7/1999 | Perks |
| 5,940,833 | A | 8/1999 | Benson |
| 5,950,205 | A | 9/1999 | Aviani, Jr. |
| 5,974,563 | A | 10/1999 | Beeler, Jr. |
| 5,990,810 | A | 11/1999 | Williams |
| 6,021,415 | A | 2/2000 | Cannon et al. |
| 6,026,414 | A | 2/2000 | Anglin |
| 6,052,735 | A | 4/2000 | Ulrich et al. |
| 6,076,148 | A | 6/2000 | Kedem |
| 6,094,416 | A | 7/2000 | Ying |
| 6,131,095 | A | 10/2000 | Low et al. |
| 6,131,190 | A | 10/2000 | Sidwell |
| 6,148,412 | A | 11/2000 | Cannon et al. |
| 6,154,787 | A | 11/2000 | Urevig et al. |
| 6,161,111 | A | 12/2000 | Mutalik et al. |
| 6,167,402 | A | 12/2000 | Yeager |
| 6,212,512 | B1 | 4/2001 | Barney et al. |
| 6,260,069 | B1 | 7/2001 | Anglin |
| 6,269,431 | B1 | 7/2001 | Dunham |
| 6,275,953 | B1 | 8/2001 | Vahalia et al. |
| 6,286,084 | B1 | 9/2001 | Wexler et al. |
| 6,301,592 | B1 | 10/2001 | Aoyama et al. |
| 6,324,581 | B1 | 11/2001 | Xu et al. |
| 6,328,766 | B1 | 12/2001 | Long |
| 6,330,570 | B1 | 12/2001 | Crighton |
| 6,330,642 | B1 | 12/2001 | Carteau |
| 6,343,324 | B1 | 1/2002 | Hubis et al. |
| RE37,601 | E | 3/2002 | Eastridge et al. |
| 6,356,801 | B1 | 3/2002 | Goodman et al. |
| 6,389,432 | B1 | 5/2002 | Pothapragada et al. |
| 6,421,711 | B1 | 7/2002 | Blumenau et al. |
| 6,425,057 | B1 | 7/2002 | Cherkasova et al. |
| 6,487,561 | B1 | 11/2002 | Ofek et al. |
| 6,519,679 | B2 | 2/2003 | Devireddy et al. |
| 6,538,669 | B1 | 3/2003 | Lagueux, Jr. et al. |
| 6,557,030 | B1 | 4/2003 | Hoang |
| 6,564,228 | B1 | 5/2003 | O'Connor |
| 6,658,526 | B2 | 12/2003 | Nguyen et al. |
| 6,704,730 | B2 | 3/2004 | Moulton et al. |
| 6,757,794 | B2 | 6/2004 | Cabrera et al. |
| 6,760,812 | B1 | 7/2004 | Degenaro et al. |
| 6,810,398 | B2 | 10/2004 | Moulton |
| 6,823,377 | B1 | 11/2004 | Wu et al. |
| 6,865,655 | B1 | 3/2005 | Andersen |
| 6,952,758 | B2 | 10/2005 | Chron et al. |
| 7,028,096 | B1 | 4/2006 | Lee |
| 7,065,619 | B1 | 6/2006 | Zhu et al. |
| 7,085,904 | B2 | 8/2006 | Mizuno et al. |
| 7,103,617 | B2 | 9/2006 | Phatak |
| 7,117,246 | B2 | 10/2006 | Christenson et al. |
| 7,143,091 | B2 | 11/2006 | Charnock |
| 7,243,163 | B1 | 7/2007 | Friend et al. |
| 7,246,272 | B2 | 7/2007 | Cabezas et al. |
| 7,272,606 | B2 | 9/2007 | Borthakur et al. |
| 7,284,030 | B2 | 10/2007 | Ackaouy et al. |
| 7,287,252 | B2 | 10/2007 | Bussiere et al. |
| 7,383,462 | B2 | 6/2008 | Osaki et al. |
| 7,437,388 | B1 | 10/2008 | DeVos |
| 7,472,238 | B1 | 12/2008 | Gokhale et al. |
| 7,472,242 | B1 | 12/2008 | Deshmukh et al. |
| 7,490,207 | B2 | 2/2009 | Amarendran et al. |
| 7,516,186 | B1 | 4/2009 | Borghetti et al. |
| 7,519,726 | B2 | 4/2009 | Palliyll et al. |
| 7,539,710 | B1 | 5/2009 | Haustein et al. |
| 7,568,080 | B2 | 7/2009 | Prahlad et al. |
| 7,581,077 | B2 | 8/2009 | Ignatius et al. |
| 7,584,338 | B1 | 9/2009 | Bricker et al. |
| 7,613,748 | B2 | 11/2009 | Brockway et al. |
| 7,631,194 | B2 | 12/2009 | Wahlert et al. |
| 7,657,550 | B2 | 2/2010 | Prahlad et al. |
| 7,685,126 | B2 | 3/2010 | Patel et al. |
| 7,720,841 | B2 | 5/2010 | Gu et al. |
| 7,734,820 | B1 | 6/2010 | Ranade et al. |
| 7,747,579 | B2 | 6/2010 | Prahlad et al. |
| 7,761,425 | B1 | 7/2010 | Erickson et al. |
| 7,797,279 | B1 | 9/2010 | Starling et al. |
| 7,814,149 | B1 | 10/2010 | Stringham |
| 7,822,939 | B1 | 10/2010 | Veprinsky et al. |
| 7,827,150 | B1 | 11/2010 | Wu et al. |
| 7,831,795 | B2 | 11/2010 | Prahlad et al. |
| 8,074,043 | B1 | 12/2011 | Zeis |
| 8,145,614 | B1 | 3/2012 | Zimran et al. |
| 8,200,923 | B1 | 6/2012 | Healey et al. |
| 8,204,862 | B1 | 6/2012 | Paulzagade et al. |
| 8,209,334 | B1 | 6/2012 | Doerner |
| 8,280,854 | B1 | 10/2012 | Emmert |
| 8,364,652 | B2 | 1/2013 | Vijayan et al. |
| 8,484,162 | B2 | 7/2013 | Prahlad et al. |
| 8,572,340 | B2 | 10/2013 | Vijayan et al. |
| 8,577,851 | B2 | 11/2013 | Vijayan et al. |
| 8,578,109 | B2 | 11/2013 | Vijayan et al. |
| 8,621,240 | B1 | 12/2013 | Auchmoody et al. |
| 8,930,306 | B1 | 1/2015 | Ngo et al. |
| 8,954,446 | B2 | 2/2015 | Retnamma et al. |
| 9,020,900 | B2 | 4/2015 | Retnamma et al. |
| 2001/0052015 | A1 | 12/2001 | Lin et al. |
| 2002/0107877 | A1 | 8/2002 | Whiting et al. |
| 2002/0143892 | A1 | 10/2002 | Mogul |
| 2002/0144250 | A1 | 10/2002 | Yen |
| 2002/0169934 | A1 | 11/2002 | Krapp et al. |
| 2003/0033308 | A1 | 2/2003 | Patel et al. |
| 2003/0115346 | A1 | 6/2003 | McHenry et al. |
| 2003/0172130 | A1 | 9/2003 | Fruchtman et al. |
| 2003/0174648 | A1 | 9/2003 | Wang et al. |
| 2003/0187917 | A1 | 10/2003 | Cohen |
| 2003/0188106 | A1 | 10/2003 | Cohen |
| 2004/0010562 | A1 | 1/2004 | Itonaga |
| 2004/0148306 | A1 | 7/2004 | Moulton et al. |
| 2004/0215746 | A1 | 10/2004 | McCanne et al. |
| 2004/0230753 | A1 | 11/2004 | Amiri et al. |
| 2005/0033756 | A1 | 2/2005 | Kottomtharayil et al. |

(56) References Cited

U.S. PATENT DOCUMENTS

| | | |
|---|---|---|
| 2005/0060643 A1 | 3/2005 | Glass et al. |
| 2005/0117558 A1 | 6/2005 | Angermann et al. |
| 2005/0204108 A1 | 9/2005 | Ofek et al. |
| 2005/0216659 A1 | 9/2005 | Ogawa et al. |
| 2005/0243609 A1 | 11/2005 | Yang et al. |
| 2005/0246393 A1 | 11/2005 | Coates et al. |
| 2005/0268068 A1 | 12/2005 | Ignatius et al. |
| 2005/0273654 A1 | 12/2005 | Chen et al. |
| 2006/0004808 A1 | 1/2006 | Hsu et al. |
| 2006/0010227 A1 | 1/2006 | Atluri |
| 2006/0020660 A1 | 1/2006 | Prasad et al. |
| 2006/0064456 A1 | 3/2006 | Kalthoff et al. |
| 2006/0095527 A1 | 5/2006 | Malik |
| 2006/0101096 A1 | 5/2006 | Fuerst |
| 2006/0167900 A1 | 7/2006 | Pingte et al. |
| 2006/0168318 A1 | 7/2006 | Twiss |
| 2006/0179405 A1 | 8/2006 | Chao et al. |
| 2006/0224846 A1 | 10/2006 | Amarendran et al. |
| 2007/0043757 A1 | 2/2007 | Benton et al. |
| 2007/0073814 A1 | 3/2007 | Kamat et al. |
| 2007/0156966 A1 | 7/2007 | Sundarrajan et al. |
| 2007/0162462 A1 | 7/2007 | Zhang et al. |
| 2007/0179990 A1 | 8/2007 | Zimran et al. |
| 2007/0179995 A1 | 8/2007 | Prahlad et al. |
| 2007/0192444 A1 | 8/2007 | Ackaouy et al. |
| 2007/0192542 A1 | 8/2007 | Frolund et al. |
| 2007/0192544 A1 | 8/2007 | Frolund et al. |
| 2007/0203937 A1 | 8/2007 | Prahlad et al. |
| 2007/0250670 A1 | 10/2007 | Fineberg et al. |
| 2007/0255758 A1 | 11/2007 | Zheng et al. |
| 2008/0005141 A1 | 1/2008 | Zheng et al. |
| 2008/0005509 A1 | 1/2008 | Smith et al. |
| 2008/0016131 A1 | 1/2008 | Sandorfi et al. |
| 2008/0028149 A1 | 1/2008 | Pardikar et al. |
| 2008/0089342 A1 | 4/2008 | Lansing et al. |
| 2008/0091655 A1 | 4/2008 | Gokhale et al. |
| 2008/0098041 A1 | 4/2008 | Chidambaran et al. |
| 2008/0133561 A1 | 6/2008 | Dubnicki et al. |
| 2008/0159331 A1 | 7/2008 | Mace et al. |
| 2008/0229037 A1 | 9/2008 | Bunte et al. |
| 2008/0243879 A1 | 10/2008 | Gokhale et al. |
| 2008/0243914 A1 | 10/2008 | Prahlad et al. |
| 2008/0243953 A1 | 10/2008 | Wu et al. |
| 2008/0243957 A1 | 10/2008 | Prahlad et al. |
| 2008/0243958 A1 | 10/2008 | Prahlad et al. |
| 2008/0244172 A1 | 10/2008 | Kano |
| 2008/0244199 A1 | 10/2008 | Nakamura et al. |
| 2008/0244204 A1 | 10/2008 | Cremelie et al. |
| 2008/0250204 A1 | 10/2008 | Kavuri et al. |
| 2008/0256431 A1 | 10/2008 | Hornberger |
| 2008/0281908 A1 | 11/2008 | McCanne et al. |
| 2008/0294660 A1 | 11/2008 | Patterson et al. |
| 2008/0294696 A1 | 11/2008 | Frandzel |
| 2008/0320151 A1 | 12/2008 | McCanne et al. |
| 2009/0013129 A1 | 1/2009 | Bondurant |
| 2009/0043767 A1 | 2/2009 | Joshi et al. |
| 2009/0055425 A1 | 2/2009 | Evans et al. |
| 2009/0055471 A1 | 2/2009 | Kozat et al. |
| 2009/0077140 A1 | 3/2009 | Anglin et al. |
| 2009/0138481 A1 | 5/2009 | Chatley et al. |
| 2009/0144416 A1 | 6/2009 | Chatley et al. |
| 2009/0144422 A1 | 6/2009 | Chatley et al. |
| 2009/0171888 A1 | 7/2009 | Anglin |
| 2009/0172139 A1 | 7/2009 | Wong et al. |
| 2009/0183162 A1 | 7/2009 | Kindel et al. |
| 2009/0204636 A1 | 8/2009 | Li et al. |
| 2009/0204649 A1 | 8/2009 | Wong et al. |
| 2009/0210431 A1 | 8/2009 | Marinkovic et al. |
| 2009/0254507 A1 | 10/2009 | Hosoya et al. |
| 2009/0268903 A1 | 10/2009 | Bojinov et al. |
| 2009/0271454 A1 | 10/2009 | Anglin et al. |
| 2009/0276454 A1 | 11/2009 | Smith |
| 2009/0307251 A1 | 12/2009 | Heller et al. |
| 2009/0319534 A1 | 12/2009 | Gokhale |
| 2009/0319585 A1 | 12/2009 | Gokhale |
| 2009/0327625 A1 | 12/2009 | Jaquette et al. |
| 2010/0005259 A1 | 1/2010 | Prahlad |
| 2010/0036887 A1 | 2/2010 | Anglin et al. |
| 2010/0042790 A1 | 2/2010 | Mondal et al. |
| 2010/0070478 A1 | 3/2010 | Anglin |
| 2010/0077161 A1 | 3/2010 | Stoakes et al. |
| 2010/0082558 A1 | 4/2010 | Anglin et al. |
| 2010/0082672 A1 | 4/2010 | Kottomtharayil et al. |
| 2010/0088296 A1 | 4/2010 | Periyagaram et al. |
| 2010/0094817 A1 | 4/2010 | Ben-Shaul et al. |
| 2010/0114833 A1 | 5/2010 | Mu |
| 2010/0169287 A1 | 7/2010 | Klose |
| 2010/0180075 A1 | 7/2010 | McCloskey et al. |
| 2010/0250549 A1 | 9/2010 | Muller et al. |
| 2010/0250896 A1 | 9/2010 | Matze |
| 2010/0257142 A1* | 10/2010 | Murphy et al. ............... 707/681 |
| 2010/0257346 A1* | 10/2010 | Sosnosky et al. ................. 713/2 |
| 2010/0299490 A1 | 11/2010 | Attarde et al. |
| 2010/0312752 A1 | 12/2010 | Zeis et al. |
| 2010/0318759 A1* | 12/2010 | Hamilton et al. ............. 711/171 |
| 2011/0113013 A1 | 5/2011 | Reddy et al. |
| 2011/0113016 A1 | 5/2011 | Gruhl et al. |
| 2011/0119741 A1 | 5/2011 | Kelly et al. |
| 2011/0161723 A1 | 6/2011 | Taleck et al. |
| 2011/0258161 A1 | 10/2011 | Constantinescu et al. |
| 2011/0276543 A1 | 11/2011 | Matze |
| 2011/0289281 A1 | 11/2011 | Spackman |
| 2011/0314070 A1 | 12/2011 | Brown et al. |
| 2011/0314400 A1 | 12/2011 | Mital et al. |
| 2012/0011101 A1 | 1/2012 | Fang et al. |
| 2012/0078881 A1 | 3/2012 | Crump et al. |
| 2012/0089574 A1 | 4/2012 | Doerner |
| 2012/0150814 A1 | 6/2012 | Retnamma et al. |
| 2012/0150817 A1 | 6/2012 | Retnamma et al. |
| 2012/0150818 A1 | 6/2012 | Retnamma et al. |
| 2012/0150826 A1 | 6/2012 | Retnamma et al. |
| 2012/0150949 A1 | 6/2012 | Retnamma et al. |
| 2012/0233417 A1 | 9/2012 | Kalach |
| 2012/0303622 A1 | 11/2012 | Dean et al. |
| 2013/0232309 A1 | 9/2013 | Vijayan et al. |
| 2013/0290280 A1 | 10/2013 | Prahlad et al. |
| 2013/0339298 A1 | 12/2013 | Muller et al. |
| 2013/0339299 A1 | 12/2013 | Muller et al. |
| 2013/0339300 A1 | 12/2013 | Muller et al. |
| 2013/0339310 A1 | 12/2013 | Muller et al. |
| 2013/0339390 A1 | 12/2013 | Muller et al. |
| 2013/0346373 A1 | 12/2013 | Muller et al. |
| 2014/0032864 A1 | 1/2014 | Vijayan et al. |
| 2014/0201170 A1 | 7/2014 | Vijayan et al. |
| 2014/0201171 A1 | 7/2014 | Vijayan et al. |
| 2015/0154220 A1 | 6/2015 | Ngo et al. |

FOREIGN PATENT DOCUMENTS

| | | |
|---|---|---|
| EP | 0467546 | 1/1992 |
| EP | 0774715 | 5/1997 |
| EP | 0809184 | 11/1997 |
| EP | 0899662 | 3/1999 |
| EP | 0981090 | 2/2000 |
| WO | WO 95/13580 | 5/1995 |
| WO | WO 99/09480 | 2/1999 |
| WO | WO 99/12098 | 3/1999 |
| WO | WO 2010/013292 A1 | 2/2010 |
| WO | WO 2012/044366 | 4/2012 |
| WO | WO 2012/044367 | 4/2012 |
| WO | WO 2013/188550 | 12/2013 |

OTHER PUBLICATIONS

Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

CommVault Systems, Inc. "Continuous Data Replicator 7.0," Product Data Sheet, 2007.

(56) References Cited

OTHER PUBLICATIONS

CommVault Systems, Inc., "Deduplication—How to," http://documentation.commvault.com/commvault/release_8_0_0/books_online_1/english_US/features/single_instance/single_instance_how_to.htm, internet accessed on Jan. 26, 2009, 7 pages.
CommVault Systems, Inc., "Deduplication," http://documentation.commvault.com/commvault/release_8_0_0/books_online_1/english_US/features/single_instance/single_instance.htm, internet accessed on Jan. 26, 2009, 9 pages.
Diligent Technologies HyperFactor, http://www.dilligent.com/products:protecTIER-1:HyperFactor-1, Internet accessed on Dec. 5, 2008, 2 pages.
Eitel, "Backup and Storage Management in Distributed Heterogeneous Environments," IEEE, 1994, pp. 124-126.
Gait, "The Optical File Cabinet: A Random-Access File system for Write-Once Optical Disks," IEEE Computer, vol. 21, No. 6, pp. 11-22 (1988).
Jander, "Launching Storage-Area Net," Data Communications, US, McGraw Hill, NY, vol. 27, No. 4(Mar. 21, 1998), pp. 64-72.
Kornblum, Jesse, "Identifying Almost Identical Files Using Context Triggered Piecewise Hashing," www.sciencedirect.com, Digital Investigation 3S (2006), pp. S91-S97.
Lortu Software Development, "Kondar Technology-Deduplication," http://www.lortu.com/en/deduplication.asp, Internet accessed on Dec. 5, 2008, 3 pages.
Overland Storage, "Data Deduplication," http://www.overlandstorage.com/topics/data_deduplication.html, Internet accessed on Dec. 5, 2008, 2 pages.
Quantum Corporation, "Data De-Duplication Background: A Technical White Paper," May 2008, 13 pages.
Rosenblum et al., "The Design and Implementation of a Log-Structure File System," Operating Systems Review SIGOPS, vol. 25, No. 5, New York, US, pp. 1-15 (May 1991).
International Search Report and Written Opinion, International Application No. PCT/US2009/58137, Mail Date Dec. 23, 2009, 14 pages.
International Search Report and Written Opinion, International Application No. PCT/US2011/030804, mailed Jun. 9, 2011.
International Search Report and Written Opinion, International Application No. PCT/US2011/030814, mailed Jun. 9, 2011.
International Search Report and Written Opinion, International Application No. PCT/US2013/045443, mailed Jun. 12, 2013.
Bhagwat, Extreme Binning: Scalable, Parallel Deduplication for Chunk-based File Backup. IEEE 2009, 9 pages.
Cohen, Edith, et al.,. "The Age Penalty and Its Effect on Cache Performance." in USITS, pp. 73-84. 2001.
Cohen, Edith, et al.,."Aging through cascaded caches: Performance issues in the distribution of web content." in ACM SIGCOMM Computer Communication Review, vol. 31, No. 4, pp. 41-53. ACM, 2001.
Cohen, Edith, et al.,. "Refreshment policies for web content caches." Computer Networks 38.6 (2002): 795-808.
Dubnicki, et al. "HYDRAstor: A Scalable Secondary Storage." FAST. vol. 9.2009, 74 pages.
International Preliminary Report on Patentability, International Application No. PCT/US2013/045443 mailed Dec. 16, 2014, 11 pages.
Wei, et al. "MAD2: A scalable high-throughput exact deduplication approach for network backup services." Mass Storage Systems and Technologies (MSST), 2010 IEEE 26th Symposium on. IEEE, 2010, 14 pages.
Wolman et al., On the scale and performance of cooperative Web proxy caching, 1999.
Wu, et al., Load Balancing and Hot Spot Relief for Hash Routing among a Collection of Proxy Caches, 1999.

\* cited by examiner

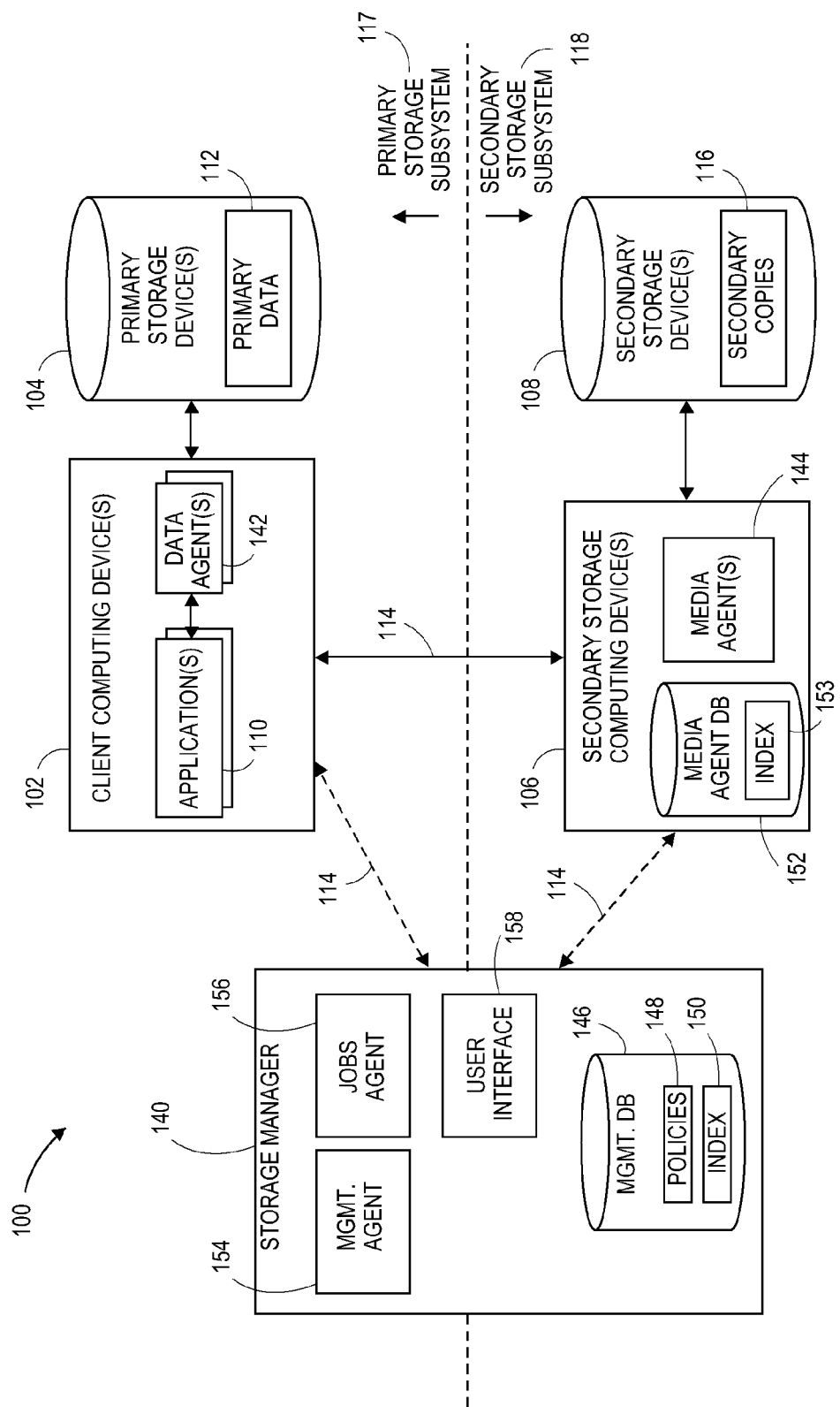

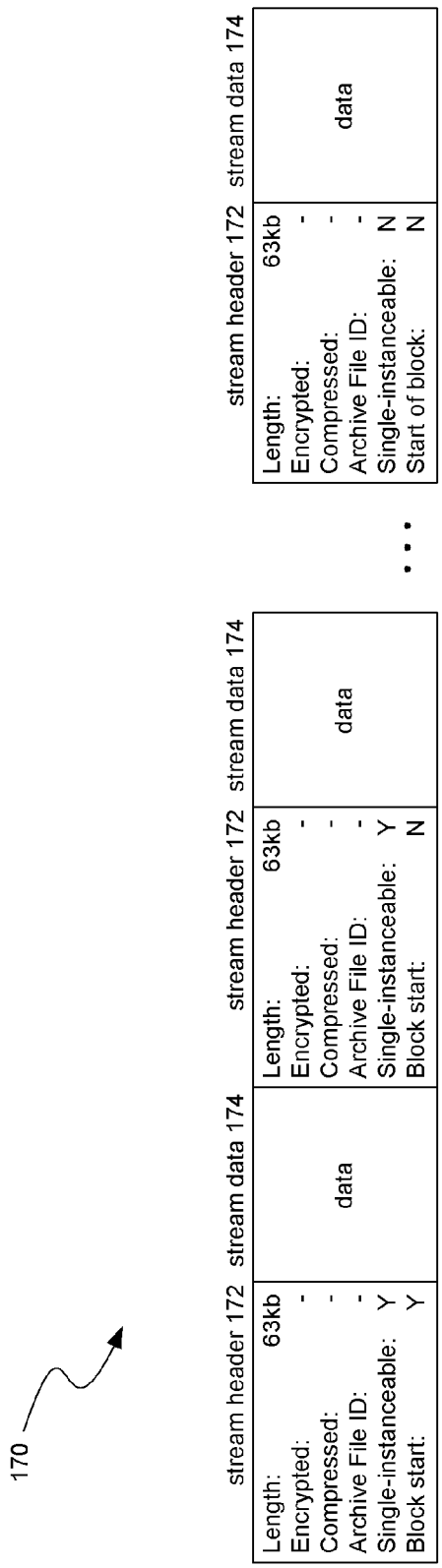
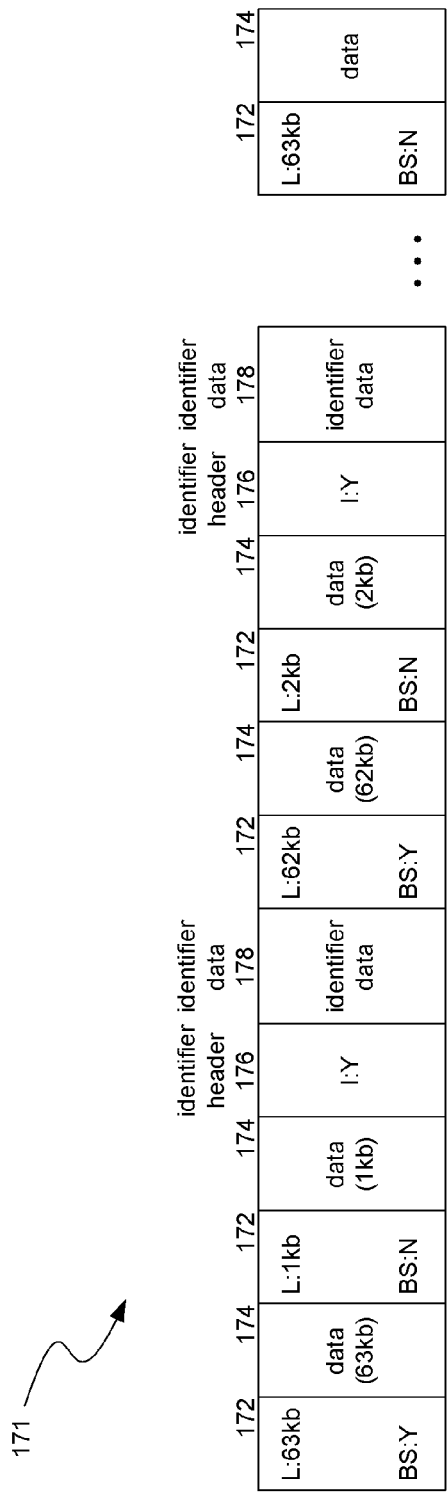
FIG. 1F
FIG. 1G

INTELLIGENT DATA SOURCING IN A NETWORKED STORAGE SYSTEM

CROSS-REFERENCE TO RELATED APPLICATIONS

The present application claims priority benefit to U.S. Provisional Application No. 61/659,387 entitled CLIENT-SIDE SIGNATURE REPOSITORY IN A NETWORKED DEDUPLICATED STORAGE SYSTEM, filed Jun. 13, 2012, and is hereby incorporated by reference herein in its entirety.

The present application is being filed concurrently with U.S. application Ser. No. 13/916,409, entitled COLLABORATIVE RESTORE IN A NETWORKED STORAGE SYSTEM, filed Jun. 12, 2013; U.S. application Ser. No. 13/916,429 entitled RESTORE USING A CLIENT SIDE SIGNATURE REPOSITORY IN A NETWORKED STORAGE SYSTEM, filed Jun. 12, 2013; U.S. application Ser. No. 13/916,385 entitled COLLABORATIVE BACKUP IN A NETWORKED STORAGE SYSTEM, filed Jun. 12, 2013; U.S. application Ser. No. 13/916,434 entitled BACKUP USING A CLIENT-SIDE SIGNATURE REPOSITORY IN A NETWORKED STORAGE SYSTEM, filed Jun. 12, 2013; and U.S. application Ser. No. 13/916,458 entitled DEDICATED CLIENT-SIDE SIGNATURE GENERATOR IN A NETWORKED STORAGE SYSTEM, filed Jun. 12, 2013; each of which is incorporated herein by reference.

BACKGROUND

Businesses worldwide recognize the commercial value of their data and seek reliable, cost-effective ways to protect the information stored on their computer networks while minimizing impact on productivity. Protecting information is often part of a routine process that is performed within an organization.

A company might back up critical computing systems such as databases, file servers, web servers, and so on as part of a daily, weekly, or monthly maintenance schedule. The company may similarly protect computing systems used by each of its employees, such as those used by an accounting department, marketing department, engineering department, and so forth.

Given the rapidly expanding volume of data under management, companies also continue to seek innovative techniques for managing data growth, in addition to protecting data. For instance, companies often implement migration techniques for moving data to lower cost storage over time and data reduction techniques such as for reducing redundant data, pruning lower priority data, etc.

Enterprises also increasingly view their stored data as a valuable asset. Along these lines, customers are looking for solutions that not only protect and manage, but also leverage their data. For instance, solutions providing data analysis capabilities, improved data presentation and access features, and the like, are in increasing demand.

SUMMARY

In response to these challenges, one technique developed by storage system providers is data deduplication. Deduplication typically involves eliminating or reducing the amount of redundant data stored and communicated within a storage system, improving storage utilization. For example, data can be divided into units of a chosen granularity (e.g., files or sub-file data blocks). The sizes of the data blocks can be of fixed or variable length. As new data enters the system, the data units can be checked to see if they already exist in the storage system. If the data unit already exists, instead of storing and/or communicating a duplicate copy, the storage system stores and/or communicates a reference to the existing data unit. Thus, deduplication can improve storage utilization, system traffic (e.g., over a networked storage system), or both.

Even in those systems employing deduplication, data management operations, including backup and restore operations, can place heavy demands on available network bandwidth and available system resources. Such operations can also introduce significant delay due to communication latency between secondary storage (e.g., non-production, backup storage) and primary storage (e.g., production storage).

In accordance with certain aspects of the disclosure, one technique developed to address these challenges incorporates the use of a client-side signature repository with a store of information including a set of signatures that correspond to data blocks stored in primary storage, where the primary data is generated by applications running on a set of client machines. For instance, the client-side signature repository can include signatures of most, if not all, of the data blocks stored in primary storage and a reference to where copies of the data block are located throughout the primary storage, similar to an index in a book. In this manner, the system can identify signatures (and corresponding data blocks) that are unique to primary storage (e.g., not found in secondary storage) and otherwise track the data blocks that reside in primary storage. In some cases, the client-side signature repository can be used to track the location of substantially all (e.g., greater than 95 percent or greater than 99 percent) of the data blocks in primary storage. In yet other cases, the client-side signature repository can be used to track a smaller subset of the data blocks in primary storage.

The client-side signature repository can generate and/or store signatures and certain metadata associated with the primary data. The signature/metadata pairs are referred to as signature blocks in certain embodiments, as will be described. During copy operations (e.g., backup, replication, snapshot or other types of copy operations), restore operations, or other types of storage operations, the client-side signature repository can be queried to determine which data blocks reside in primary storage (which may also be referred to as production storage or as "client-side" storage) and which data blocks reside in secondary storage (which may also be referred to as non-production storage). In some embodiments, during a deduplicated backup or other copy operation, the data blocks unique to primary storage are identified and sent to secondary storage, while only signature information or other reference data is sent to secondary storage for data blocks that are already located in secondary storage. In certain instances, during a restore, the data blocks unique to secondary storage are identified and retrieved from secondary storage, while the data blocks already located in primary storage are retrieved from primary storage.

The client-side signature repository can be used as part of a storage system to reduce the demands on the network between one or more production clients generating and storing primary data and non-production, secondary storage storing secondary copy data, such as backup storage. For example, one or more client-side repositories can form part of the production client(s) or may share a common network topology with the client(s), whereas the client(s) and the secondary storage devices may be remote from one another or reside on differing network topologies.

As just one example, the client-side signature repository and the client may communicate over a local area network (LAN), while client and secondary storage communicate over a wide area network (WAN). Thus, the client-side signature repository can communicate more effectively (e.g., at a higher data transfer rate, more reliably, with less latency, etc.) with the client than the backup storage devices can communicate with the client.

In some embodiments, each production client maintains a local client-side signature repository including signature information, such as signature information corresponding only to the data blocks in that production client, or in alternative embodiments, signature information corresponding to multiple production clients. In certain embodiments, the primary storage subsystem (also sometimes referred to herein as "primary storage") maintains a shared client-side signature repository including signature information that corresponds to data blocks stored across some or all of the production clients. In this manner, a shared client-side signature repository can be a global map to all of the data blocks in primary storage.

Because the client-side signature repository in some embodiments stores the signatures of all or substantially all of the data blocks located in primary storage, the signatures and/or associated metadata can be used to identify which data is already present in primary storage, without having to read the actual data blocks themselves during the identification process, thereby improving storage operation efficiency. For instance, during a restore operation, the secondary storage subsystem (also sometimes referred to herein as "secondary storage") can send a set of signatures to primary storage for a data set that is to be restored to a client machine. In response, the primary storage subsystem consults the signature information in the client-side signature repository, without reading the data blocks, to determine which data blocks are already present in primary storage.

Primary storage can include one or more signature generation components configured to generate the data block signatures stored in the client-side signature repository. In some cases, each client maintains its own signature generation module. For instance, each client-specific signature generator can snoop or otherwise monitor data operations on the corresponding client, and generate and send the signatures (and corresponding metadata) to the client-side signature repository for storage. Such a configuration can reduce network traffic within the primary storage subsystem. In other cases, a shared signature generator resides in primary storage (e.g., forms part of a central client-side signature repository) and is configured to generate signatures for all of the clients (or for at least a plurality of the clients).

The client-side signature repository can also be used to perform storage operations in a collaborative fashion such that data from multiple clients is sourced for storage operations that don't necessarily involve those clients. For instance, during a collaborative copy operation (e.g., a backup operation), in which the client-side signature repository is used during a secondary copy operation associated with a target client, the client-side signature repository can identify which of the multiple clients contain a copy of a particular data block in the copy data set. A sourcing policy can include criteria for determining which of the identified clients to source data blocks from. Based on the desired sourcing policy, the data block to be used in a storage operation can be retrieved from any one of the clients storing the copy of the subject data block, including the target client, or any other client. Moreover, during a collaborative restore operation from secondary storage to a target client, the client-side signature repository can be used to identify non-target clients that include data blocks in the restore data set, and to source the data blocks from those clients during the restore. Among other benefits, collaborative sourcing can be used to reduce the amount of relatively high latency traffic between primary and secondary storage and to distribute storage operation processing across the client machines in a desired fashion. Collaborative sourcing can also reduce the down time of the target client, or otherwise distribute processing load for deduplication operations.

In some embodiments, a method is provided for generating a backup data set for a client computing device by using a signature repository residing in a primary storage subsystem. The method can include for each respective client computing device of one or more client computing devices in a primary storage subsystem, monitoring the storage of a plurality of files formed by data blocks generated by one or more software applications running on the respective client computing device. The plurality of files are stored in a data store associated with the respective client computing device. The method can further include maintaining, by a repository agent executing on one or more processors in the primary storage subsystem, a repository indicating at least which data blocks of the monitored files are stored in the primary storage subsystem. In response to instructions to create a secondary copy in a secondary storage subsystem of at least a subset of the plurality of files stored in a data store associated with a first client computing device of the one or more client computing devices, the method can include querying the repository to identify at least a first group of data blocks that form at least a portion of the subset of files and for which matching data blocks are not stored in the secondary storage subsystem, identifying the location of the first group of data blocks within the primary storage subsystem, and retrieving the first group of data blocks from one or more of the data stores associated with the one or more client computing devices.

In certain embodiments, a method is provided for generating a secondary copy data set for a client computing device by collaboratively sourcing data to be used in the secondary copy data set from at least one other client computing device. The method can include for each respective client computing device of a plurality of client computing devices, monitoring storage of a plurality of files formed by data blocks generated by one or more software applications running on the respective client computing device. The files are stored in a data store associated with the respective client computing device. The method can further include maintaining, by a signature repository agent executing on one or more processors, a global mapping indicating which data blocks are stored in the data stores associated with each of the plurality of client computing devices. The separate copies of at least some of the data blocks reside in the data stores of multiple ones of the plurality of client computing devices. The method can further include in response to instructions to create a secondary copy in secondary storage of at least a subset of the plurality of files stored in the data store of a first client computing device of the plurality of client computing devices, querying, by the signature repository agent, the global mapping to identify at least a first group of data blocks in the subset of the plurality of files that are stored in the data store associated with a second client computing device of the plurality of client computing devices. The method can further include retrieving the first group of data blocks from the data store associated with the second client computing device, and retrieving at least some of the remaining data blocks in the first portion from the data store associated with the first client computing device.

In some embodiments, a method is provided for restoring data to a primary storage subsystem using data blocks residing in the primary storage subsystem. The method can include maintaining data block signatures in a signature repository. The data block signatures correspond to at least unique signatures of data blocks that form primary data. The primary data is generated by one or more applications executing on one or more of client computing devices. In addition, the primary data for each respective client computing device of the one or more client computing devices is stored in a data store associated with the respective client computing device.

The method can further include receiving a set of data block signatures corresponding to data blocks in a secondary copy of data maintained in a secondary storage subsystem. The secondary copy corresponding to a previous version of the primary data of a first client computing device of the one or more client computing devices. The method can further include comparing, by one or more processors, the received set of data block signatures to the data block signatures in the signature repository to determine which data blocks in the secondary copy already reside in the primary storage subsystem, and restoring the secondary copy to the data store associated with the first client computing device using at least some of the data blocks in the secondary copy that already reside in the primary storage subsystem. The remaining data blocks in the secondary copy are retrieved from the secondary storage subsystem.

In certain embodiments, a method is provided for restoring data to a first client computing device located in a primary storage subsystem using data blocks residing in a data store associated with a second client computing device located in the primary storage subsystem. The method can include maintaining in a signature repository data block signatures corresponding to data blocks that form primary data. The primary data generated by one or more applications executing on a plurality of client computing devices is located within the primary storage subsystem, and the primary data for each respective client computing device of the plurality of client computing devices is stored in a data store associated with the respective client computing device. The method can further include receiving a set of data block signatures corresponding to data blocks in a secondary copy of data maintained in a secondary storage subsystem. The secondary copy of can correspond to a previous version of the primary data of a first client computing device of the plurality of client computing devices.

The method can further include querying, using one or more processors, the signature repository to identify at least a first group of data blocks corresponding to a first group of data block signatures of the received set of data block signatures. The first group of data blocks are stored in the data store associated with a second client computing device of the plurality of client computing devices. The method can further include retrieving at least some of the first group of data blocks from the data store associated with the second client computing device, and restoring the secondary copy to the data store associated with the first client computing device using at least the data blocks retrieved from the second client computing device.

In some embodiments, a method is provided for maintaining a signature repository accessible by multiple client computing devices in a data storage system. The method can include tracking storage of data units corresponding to primary data generated by one or more applications executing on a plurality of client computing devices that form a primary storage subsystem. The primary data for each of the client computing devices is stored in a data store associated with the respective client computing device, and the primary storage subsystem is in communication with a secondary storage subsystem that is separate from the primary storage subsystem and is configured to maintain secondary copies of at least some of the primary data. The method can further include generating, by a signature agent executing on one or more processors in the primary storage subsystem, signatures corresponding to the plurality of tracked data units, and maintaining a signature repository including a signature block for at least each unique signature of the generated signatures. Each signature block can include the unique signature, and one or data unit entries. Each entry can correspond to a copy of the data unit associated with the unique signature that is stored in the primary storage subsystem. Each entry can indicate which of the plurality of client computing devices stores the corresponding copy of the data unit. At least some of the signature blocks can include at least a first entry indicating that a first client computing device of the plurality of client computing devices stores a copy of the data unit and a second entry indicating that a second client computing device of the plurality of client computing devices stores a copy of the data unit.

In certain embodiments, a method is provided for sourcing data from storage associated with a pool of computing devices during a data storage operation associated with one of the computing devices in the pool. The method can include obtaining signatures corresponding to data units that form a data set associated with a data storage operation. The data set can correspond to a version of primary data of a first computing device in a pool of a plurality of computing devices. Each respective computing device in the pool can store primary data generated by one or more software applications executing on the respective computing device, and the primary data stored in at least one storage device can be associated with the respective computing device. The method can further include populating, by one or more processors, a shared signature repository. The shared signature repository can include signatures corresponding to at least each unique data unit stored in the storage devices of the computing devices in the pool. For each signature included in the signature repository, an indication as to one or more of the computing devices whose at least one storage device can include a copy of the data unit corresponding to the signature. The method can further include comparing the obtained signatures with the signature repository to identify one or more of the computing devices in the pool whose respective at least one storage devices include copies of data units in the data set, consulting, by one or more processors, a priority policy; and based on the priority policy, and for at least some data units in the backup set, deciding to access copies of the at least some data units from one or more computing devices in the pool other than the first computing device.

BRIEF DESCRIPTION OF THE DRAWINGS

FIG. 1C is a block diagram of an exemplary information management system including a storage manager, one or more data agents, and one or more media agents.

FIGS. 1F-1H are block diagrams illustrating suitable data structures that may be employed by the information management system.

DETAILED DESCRIPTION

Figure 1A:
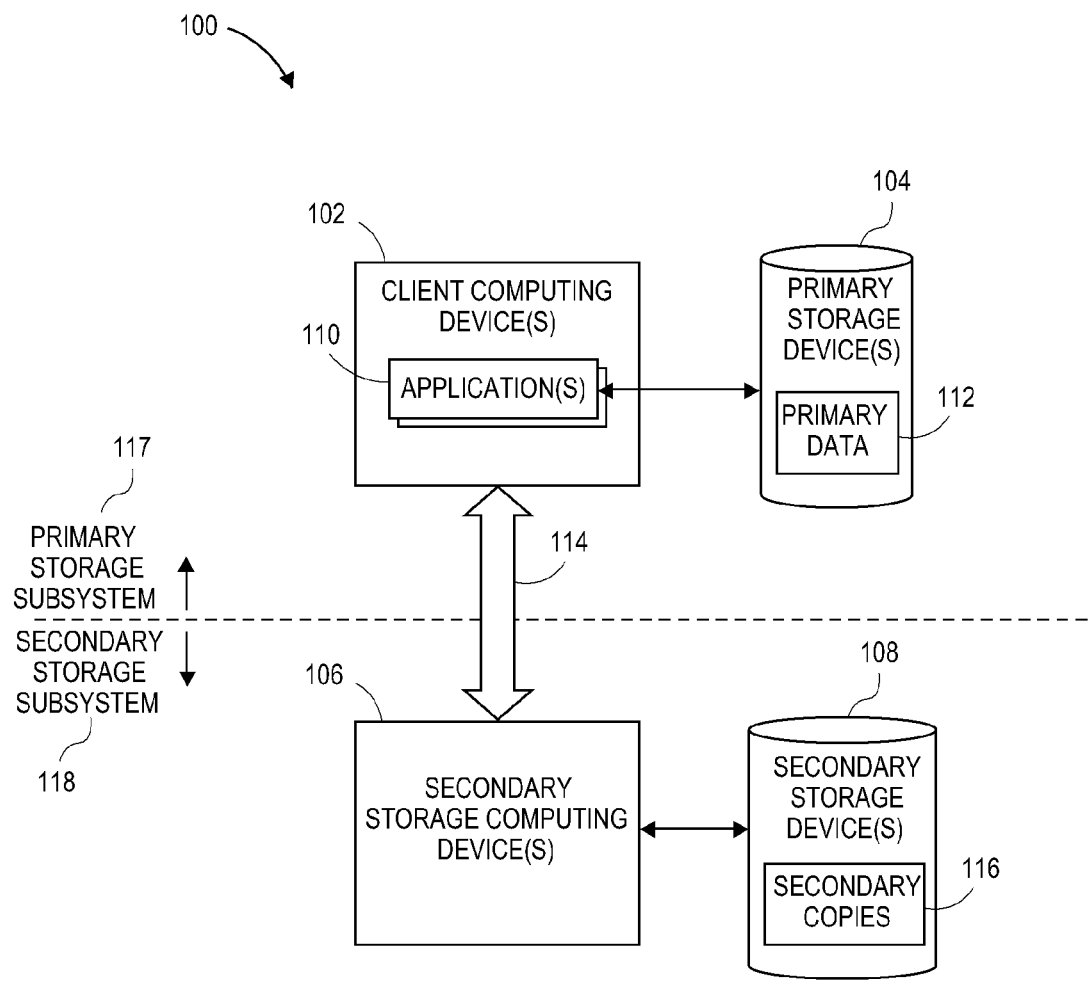
FIG. 1A is a block diagram illustrating an exemplary information management system.

Deduplication techniques designed to reduce the demands on storage systems during backup and/or replication operations are described in greater detail in the following U.S. patent applications, each of which is incorporated by reference in its entirety. One or more embodiments of the present disclosure may be used with systems and methods disclosed therein:

U.S. patent application Ser. No. 13/324,884, entitled "Client-Side Repository in a Networked Deduplicated Storage System," and filed on Dec. 13, 2011;

U.S. patent application Ser. No. 13/324,613, entitled "Distributed Deduplicated Storage System," and filed on Dec. 13, 2011;

U.S. patent application Ser. No. 12/982,086, entitled "Content Aligned Block-Based Deduplication," filed Dec. 30, 2010;

U.S. patent application Ser. No. 12/982,100, entitled "Systems and Methods for Retaining and Using Block Signatures in Data Protection Operations," filed Dec. 30, 2010

U.S. patent application Ser. No. 12/145,347, entitled "Application-Aware and Remote Single Instance Data Management," filed Jun. 24, 2008;

U.S. patent application Ser. No. 12/145,342, entitled "Application-Aware and Remote Single Instance Data Management," filed Jun. 24, 2008; and U.S. patent application Ser. No. 12/725,288, entitled "Extensible Data Deduplication System and Method," filed Mar. 16, 2010.

In addition, one or more embodiments of the present disclosure may also be used with systems and methods disclosed in the following patents, each of which is hereby incorporated herein by reference in its entirety:

U.S. Pat. No. 7,389,311, entitled "Hierarchical Backup and Retrieval System," issued Jun. 17, 2008;

U.S. Pat. No. 6,418,478, entitled "Pipelined High Speed Data Transfer Mechanism," issued Jul. 9, 2002;

U.S. Pat. No. 7,035,880, entitled "Modular Backup and Retrieval System Used in Conjunction with a Storage Area Network," issued Apr. 25, 2006;

U.S. Pat. No. 6,542,972, entitled "Logical View and Access to Physical Storage in Modular Data and Storage Management System," issued Apr. 1, 2003;

U.S. Pat. No. 6,658,436, entitled "Logical View and Access to Data Manage by a Modular Data and Storage Management System," issued Dec. 2, 2003;

U.S. Pat. No. 7,130,970, entitled "Dynamic Storage Device Pooling in a Computer System," issued Oct. 10, 2006;

U.S. Pat. No. 7,246,207, entitled "System and Method for Dynamically Performing Storage Operations in a Computer Network," issued Jul. 17, 2007;

U.S. Pat. No. 7,454,569, entitled "Hierarchical System and Method for Performing Storage Operations in a Computer Network," issued Nov. 18, 2008;

U.S. Pat. No. 7,613,748, entitled "System and Method for Containerized Data Storage and Tracking," issued Nov. 3, 2009; and U.S. Pat. No. 7,620,710, entitled "Systems and Methods for Performing Multi-Path Storage Operations," issued Nov. 17, 2009.

Client-Side Repository Overview

Systems and methods are described herein for using deduplication and collaborative data movement techniques to improve data storage operations. Examples of such systems and methods are discussed in further detail herein, e.g., with respect to FIGS. 1I-14. It will be appreciated that such techniques can be implemented by information management systems including those that will now be described with respect to FIGS. 1A-1H. Moreover, the componentry for implementing the deduplication and data movement functionality shown and described with respect to FIGS. 1I-14 can be incorporated into the information management systems of FIGS. 1A-1H, where applicable.

Information Management System Overview

With the increasing importance of protecting and leveraging data, organizations simply cannot afford to take the risk of losing critical data. Moreover, runaway data growth and other modern realities make protecting and managing data an increasingly difficult task. There is therefore a need for efficient, powerful, and user-friendly solutions for protecting and managing data.

Depending on the size of the organization, there are typically many data production sources which are under the purview of tens, hundreds, or even thousands of employees or other individuals. In the past, individual employees were sometimes responsible for managing and protecting their data. A patchwork of hardware and software point solutions have been applied in other cases. These solutions were often provided by different vendors and had limited or no interoperability.

Certain embodiments described herein provide systems and methods capable of addressing these and other shortcomings of prior approaches by implementing unified, organization-wide information management. FIG. 1A shows one such information management system 100, which generally can include combinations of hardware and software configured to protect and manage data and metadata generated and used by the various computing devices in the information management system 100.

The organization which employs the information management system 100 may be a corporation or other business entity, non-profit organization, educational institution, household, governmental agency, or the like.

Generally, the systems and associated components described herein may be compatible with and/or provide some or all of the functionality of the systems and corresponding components described in one or more of the following U.S. patents and patent application publications assigned to CommVault Systems, Inc., each of which is hereby incorporated in its entirety by reference herein:

- U.S. Pat. No. 8,285,681, entitled "DATA OBJECT STORE AND SERVER FOR A CLOUD STORAGE ENVIRONMENT, INCLUDING DATA DEDUPLICATION AND DATA MANAGEMENT ACROSS MULTIPLE CLOUD STORAGE SITES";
- U.S. Pat. No. 8,307,177, entitled "SYSTEMS AND METHODS FOR MANAGEMENT OF VIRTUALIZATION DATA";
- U.S. Pat. No. 7,035,880, entitled "MODULAR BACKUP AND RETRIEVAL SYSTEM USED IN CONJUNCTION WITH A STORAGE AREA NETWORK";
- U.S. Pat. No. 7,343,453, entitled "HIERARCHICAL SYSTEMS AND METHODS FOR PROVIDING A UNIFIED VIEW OF STORAGE INFORMATION";
- U.S. Pat. No. 7,395,282, entitled "HIERARCHICAL BACKUP AND RETRIEVAL SYSTEM";
- U.S. Pat. No. 7,246,207, entitled "SYSTEM AND METHOD FOR DYNAMICALLY PERFORMING STORAGE OPERATIONS IN A COMPUTER NETWORK";
- U.S. Pat. No. 7,747,579, entitled "METABASE FOR FACILITATING DATA CLASSIFICATION";
- U.S. Pat. No. 8,229,954, entitled "MANAGING COPIES OF DATA";
- U.S. Pat. No. 7,617,262, entitled "SYSTEM AND METHODS FOR MONITORING APPLICATION DATA IN A DATA REPLICATION SYSTEM";
- U.S. Pat. No. 7,529,782, entitled "SYSTEM AND METHODS FOR PERFORMING A SNAPSHOT AND FOR RESTORING DATA";
- U.S. Pat. No. 8,230,195, entitled "SYSTEM AND METHOD FOR PERFORMING AUXILIARY STORAGE OPERATIONS";
- U.S. Pat. No. 7,315,923, entitled "SYSTEM AND METHOD FOR COMBINING DATA STREAMS IN A STORAGE OPERATION";
- U.S. Pat. No. 8,364,652, entitled "CONTENT-ALIGNED, BLOCK-BASED DEDUPLICATION";
- U.S. Pat. Pub. No. 2006/0224846, entitled "SYSTEM AND METHOD TO SUPPORT SINGLE INSTANCE STORAGE OPERATIONS";
- U.S. Pat. Pub. No. 2010-0299490, entitled "BLOCK-LEVEL SINGLE INSTANCING";
- U.S. Pat. Pub. No. 2009/0329534, entitled "APPLICATION-AWARE AND REMOTE SINGLE INSTANCE DATA MANAGEMENT";
- U.S. Pat. Pub. No. 2012/0150826, entitled "DISTRIBUTED DEDUPLICATED STORAGE SYSTEM";
- U.S. Pat. Pub. No. 2012/0150818, entitled "CLIENT-SIDE REPOSITORY IN A NETWORKED DEDUPLICATED STORAGE SYSTEM";
- U.S. Pat. No. 8,170,995, entitled "METHOD AND SYSTEM FOR OFFLINE INDEXING OF CONTENT AND CLASSIFYING STORED DATA"; and
- U.S. Pat. No. 8,156,086, entitled "SYSTEMS AND METHODS FOR STORED DATA VERIFICATION".

The information management system 100 can include a variety of different computing devices. For instance, as will be described in greater detail herein, the information management system 100 can include one or more client computing devices 102 and secondary storage computing devices 106.

Computing devices can include, without limitation, one or more: workstations, personal computers, desktop computers, or other types of generally fixed computing systems such as mainframe computers and minicomputers.

Other computing devices can include mobile or portable computing devices, such as one or more laptops, tablet computers, personal data assistants, mobile phones (such as smartphones), and other mobile or portable computing devices such as embedded computers, set top boxes, vehicle-mounted devices, wearable computers, etc. Computing devices can include servers, such as mail servers, file servers, database servers, and web servers.

In some cases, a computing device includes virtualized and/or cloud computing resources. For instance, one or more virtual machines may be provided to the organization by a third-party cloud service vendor. Or, in some embodiments, computing devices can include one or more virtual machine(s) running on a physical virtual machine host operated by the organization. As one example, the organization may use one virtual machine as a database server and another virtual or physical machine as a mail server. A virtual machine manager (VMM) (e.g., a Hypervisor) may manage the virtual machines, and reside and execute on the virtual machine host. Examples of techniques for implementing information management techniques in a cloud computing environment are described in U.S. Pat. No. 8,285,681, which is incorporated by reference herein. Examples of techniques for implementing information management techniques in a virtualized computing environment are described in U.S. Pat. No. 8,307,177, also incorporated by reference herein.

The information management system 100 can also include a variety of storage devices, including primary storage devices 104 and secondary storage devices 108, for example. Storage devices can generally be of any suitable type including, without limitation, disk drives, hard-disk arrays, semi-conductor memory (e.g., solid state storage devices), network attached storage (NAS) devices, tape libraries or other magnetic, non-tape storage devices, optical media storage devices, combinations of the same, and the like. In some embodiments, storage devices can form part of a distributed file system. In some cases, storage devices are provided in a cloud (e.g., a private cloud or one operated by a third-party vendor). A storage device in some cases comprises a disk array or portion thereof.

The illustrated information management system 100 includes one or more client computing device 102 having at least one application 110 executing thereon, and one or more primary storage devices 104 storing primary data 112. The client computing device(s) 102 and the primary storage devices 104 may generally be referred to in some cases as a primary storage subsystem 117.

Depending on the context, the term "information management system" can refer to generally all of the illustrated hardware and software components. Or, in other instances, the term may refer to only a subset of the illustrated components.

For instance, in some cases, the information management system 100 generally refers to a combination of specialized components used to protect, move, manage, manipulate, analyze, and/or process data and metadata generated by the client computing devices 102. However, the information management system 100 in some cases does not include the underlying components that generate and/or store the primary data 112, such as the client computing devices 102 themselves, the applications 110 and operating system residing on the client computing devices 102, and the primary storage devices 104. As an example, "information management system" may sometimes refer to one or more of the following components and corresponding data structures: storage managers, data agents, and media agents. These components will be described in further detail below.

Client Computing Devices

There are typically a variety of sources in an organization that produce data to be protected and managed. As just one illustrative example, in a corporate environment such data sources can be employee workstations and company servers such as a mail server, a web server, or the like. In the information management system 100, the data generation sources include the one or more client computing devices 102.

The client computing devices 102 may include any of the types of computing devices described above, without limitation, and in some cases the client computing devices 102 are associated with one or more users and/or corresponding user accounts, of employees or other individuals.

The information management system 100 generally addresses & handles the data management and protection needs for the data generated by the client computing devices 102. However, the use of this term does not imply that the client computing devices 102 cannot be "servers" in other respects. For instance, a particular client computing device 102 may act as a server with respect to other devices, such as other client computing devices 102. As just a few examples, the client computing devices 102 can include mail servers, file servers, database servers, and web servers.

Each client computing device 102 may have one or more applications 110 (e.g., software applications) executing thereon which generate and manipulate the data that is to be protected from loss and managed.

The applications 110 generally facilitate the operations of an organization (or multiple affiliated organizations), and can include, without limitation, mail server applications (e.g., Microsoft Exchange Server), file server applications, mail client applications (e.g., Microsoft Exchange Client), database applications (e.g., SQL, Oracle, SAP, Lotus Notes Database), word processing applications (e.g., Microsoft Word), spreadsheet applications, financial applications, presentation applications, browser applications, mobile applications, entertainment applications, and so on.

The client computing devices 102 can have at least one operating system (e.g., Microsoft Windows, Mac OS X, iOS, IBM z/OS, Linux, other Unix-based operating systems, etc.) installed thereon, which may support or host one or more file systems and other applications 110.

As shown, the client computing devices 102 and other components in the information management system 100 can be connected to one another via one or more communication pathways 114. The communication pathways 114 can include one or more networks or other connection types including as any of following, without limitation: the Internet, a wide area network (WAN), a local area network (LAN), a Storage Area Network (SAN), a Fibre Channel connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, a neural network, other appropriate wired, wireless, or partially wired/wireless computer or telecommunications networks, combinations of the same or the like. The communication pathways 114 in some cases may also include application programming interfaces (APIs) including, e.g., cloud service provider APIs, virtual machine management APIs, and hosted service provider APIs.

Primary Data and Exemplary Primary Storage Devices

Primary data 112 according to some embodiments is production data or other "live" data generated by the operating system and other applications 110 residing on a client computing device 102. The primary data 112 is generally stored on the primary storage device(s) 104 and is organized via a file system supported by the client computing device 102. For instance, the client computing device(s) 102 and corresponding applications 110 may create, access, modify, write, delete, and otherwise use primary data 112. In some cases, some or all of the primary data 112 can be stored in cloud storage resources.

Primary data 112 is generally in the native format of the source application 110. According to certain aspects, primary data 112 is an initial or first (e.g., created before any other copies or before at least one other copy) stored copy of data generated by the source application 110. Primary data 112 in some cases is created substantially directly from data generated by the corresponding source applications 110.

The primary data 112 may sometimes be referred to as a "primary copy" in the sense that it is a discrete set of data. However, the use of this term does not necessarily imply that the "primary copy" is a copy in the sense that it was copied or otherwise derived from another stored version.

The primary storage devices 104 storing the primary data 112 may be relatively fast and/or expensive (e.g., a disk drive, a hard-disk array, solid state memory, etc.). In addition, primary data 112 may be intended for relatively short term retention (e.g., several hours, days, or weeks).

According to some embodiments, the client computing device 102 can access primary data 112 from the primary storage device 104 by making conventional file system calls via the operating system. Primary data 112 representing files may include structured data (e.g., database files), unstructured data (e.g., documents), and/or semi-structured data. Some specific examples are described below with respect to FIG. 1B.

It can be useful in performing certain tasks to organize the primary data 112 into units of different granularities. In general, primary data 112 can include files, directories, file system volumes, data blocks, extents, or any other hierarchies or organizations of data objects. As used herein, a "data object" can refer to both (1) any file that is currently addressable by a file system or that was previously addressable by the file system (e.g., an archive file) and (2) a subset of such a file (e.g., a data block).

As will be described in further detail, it can also be useful in performing certain functions of the information management system 100 to access and modify metadata within the primary data 112. Metadata generally includes information about data objects or characteristics associated with the data objects.

Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), frequency of change (e.g., a period in which the data object is modified), business unit (e.g., a group or department that generates, manages or is otherwise associated with the data object), aging information (e.g., a schedule, such as a time period, in which the data object is migrated to secondary or long term storage), boot sectors, partition layouts, file location within a file folder directory structure, user permissions, owners, groups, access control lists [ACLs]), system metadata (e.g., registry information), combinations of the same or the other similar information related to the data object.

In addition to metadata generated by or related to file systems and operating systems, some of the applications 110 and/or other components of the information management system 100 maintain indices of metadata for data objects, e.g., metadata associated with individual email messages. Thus, each data object may be associated with corresponding metadata. The use of metadata to perform classification and other functions is described in greater detail below.

Each of the client computing devices 102 are generally associated with and/or in communication with one or more of the primary storage devices 104 storing corresponding primary data 112. A client computing device 102 may be considered to be "associated with" or "in communication with" a primary storage device 104 if it is capable of one or more of: routing and/or storing data to the particular primary storage device 104, coordinating the routing and/or storing of data to the particular primary storage device 104, retrieving data from the particular primary storage device 104, coordinating the retrieval of data from the particular primary storage device 104, and modifying and/or deleting data retrieved from the particular primary storage device 104.

The primary storage devices 104 can include any of the different types of storage devices described above, or some other kind of suitable storage device. The primary storage devices 104 may have relatively fast I/O times and/or are relatively expensive in comparison to the secondary storage devices 108. For example, the information management system 100 may generally regularly access data and metadata stored on primary storage devices 104, whereas data and metadata stored on the secondary storage devices 108 is accessed relatively less frequently.

In some cases, each primary storage device 104 is dedicated to an associated client computing device 102. For instance, a primary storage device 104 in one embodiment is a local disk drive of a corresponding client computing device 102. In other cases, one or more primary storage devices 104 can be shared by multiple client computing devices 102, e.g., via a network such as in a cloud storage implementation. As one example, a primary storage device 104 can be a disk array shared by a group of client computing devices 102, such as one of the following types of disk arrays: EMC Clariion, EMC Symmetrix, EMC Celerra, Dell EqualLogic, IBM XIV, NetApp FAS, HP EVA, and HP 3PAR.

The information management system 100 may also include hosted services (not shown), which may be hosted in some cases by an entity other than the organization that employs the other components of the information management system 100. For instance, the hosted services may be provided by various online service providers to the organization. Such service providers can provide services including social networking services, hosted email services, or hosted productivity applications or other hosted applications).

Hosted services may include software-as-a-service (SaaS), platform-as-a-service (PaaS), application service providers (ASPs), cloud services, or other mechanisms for delivering functionality via a network. As it provides services to users, each hosted service may generate additional data and metadata under management of the information management system 100, e.g., as primary data 112. In some cases, the hosted services may be accessed using one of the applications 110. As an example, a hosted mail service may be accessed via browser running on a client computing device 102. The hosted services may be implemented in a variety of computing environments. In some cases, they are implemented in an environment having a similar arrangement to the information management system 100, where various physical and logical components are distributed over a network.

Secondary Copies and Exemplary Secondary Storage Devices

The primary data 112 stored on the primary storage devices 104 may be compromised in some cases, such as when an employee deliberately or accidentally deletes or overwrites primary data 112 during their normal course of work. Or the primary storage devices 104 can be damaged or otherwise corrupted.

For recovery and/or regulatory compliance purposes, it is therefore useful to generate copies of the primary data 112. Accordingly, the information management system 100 includes one or more secondary storage computing devices 106 and one or more secondary storage devices 108 configured to create and store one or more secondary copies 116 of the primary data 112 and associated metadata. The secondary storage computing devices 106 and the secondary storage devices 108 may sometimes be referred to as a secondary storage subsystem 118.

Creation of secondary copies 116 can help in search and analysis efforts and meet other information management goals, such as: restoring data and/or metadata if an original version (e.g., of primary data 112) is lost (e.g., by deletion, corruption, or disaster); allowing point-in-time recovery; complying with regulatory data retention and electronic discovery (e-discovery) requirements; reducing utilized storage capacity; facilitating organization and search of data; improving user access to data files across multiple computing devices and/or hosted services; and implementing data retention policies. The client computing devices 102 access or receive primary data 112 and communicate the data, e.g., over the communication pathways 114, for storage in the secondary storage device(s) 108.

A secondary copy 116 can comprise a separate stored copy of application data that is derived from one or more earlier created, stored copies (e.g., derived from primary data 112 or another secondary copy 116). Secondary copies 116 can include point-in-time data, and may be intended for relatively long-term retention (e.g., weeks, months or years), before some or all of the data is moved to other storage or is discarded.

In some cases, a secondary copy 116 is a copy of application data created and stored subsequent to at least one other stored instance (e.g., subsequent to corresponding primary data 112 or to another secondary copy 116), in a different storage device than at least one previous stored copy, and/or remotely from at least one previous stored copy. In some other cases, secondary copies can be stored in the same storage device as primary data 112 and/or other previously stored copies. For example, in one embodiment a disk array capable of performing hardware snapshots stores primary data 112 and creates and stores hardware snapshots of the primary data 112 as secondary copies 116. Secondary copies 116 may be stored in relatively slow and/or low cost storage (e.g., magnetic tape). A secondary copy 116 may be stored in a backup or archive format, or in some other format different than the native source application format or other primary data format.

In some cases, secondary copies 116 are indexed so users can browse and restore at another point in time. After creation of a secondary copy 116 representative of certain primary data 112, a pointer or other location indicia (e.g., a stub) may be placed in primary data 112, or be otherwise associated with primary data 112 to indicate the current location on the secondary storage device(s) 108.

Since an instance of a data object or metadata in primary data 112 may change over time as it is modified by an application 110 (or hosted service or the operating system), the information management system 100 may create and manage multiple secondary copies 116 of a particular data object or metadata, each representing the state of the data object in primary data 112 at a particular point in time. Moreover, since an instance of a data object in primary data 112 may eventually be deleted from the primary storage device 104 and the file system, the information management system 100 may continue to manage point-in-time representations of that data object, even though the instance in primary data 112 no longer exists.

For virtualized computing devices the operating system and other applications 110 of the client computing device(s) 102 may execute within or under the management of virtualization software (e.g., a VMM), and the primary storage device(s) 104 may comprise a virtual disk created on a physical storage device. The information management system 100 may create secondary copies 116 of the files or other data objects in a virtual disk file and/or secondary copies 116 of the entire virtual disk file itself (e.g., of an entire .vmdk file).

Secondary copies 116 may be distinguished from corresponding primary data 112 in a variety of ways, some of which will now be described. First, as discussed, secondary copies 116 can be stored in a different format (e.g., backup, archive, or other non-native format) than primary data 112. For this or other reasons, secondary copies 116 may not be directly useable by the applications 110 of the client computing device 102, e.g., via standard system calls or otherwise without modification, processing, or other intervention by the information management system 100.

Secondary copies 116 are also in some embodiments stored on a secondary storage device 108 that is inaccessible to the applications 110 running on the client computing devices 102 (and/or hosted services). Some secondary copies 116 may be "offline copies," in that they are not readily available (e.g. not mounted to tape or disk). Offline copies can include copies of data that the information management system 100 can access without human intervention (e.g. tapes within an automated tape library, but not yet mounted in a drive), and copies that the information management system 100 can access only with at least some human intervention (e.g. tapes located at an offsite storage site).

The Use of Intermediate Devices for Creating Secondary Copies

Creating secondary copies can be a challenging task. For instance, there can be hundreds or thousands of client computing devices 102 continually generating large volumes of primary data 112 to be protected. Also, there can be significant overhead involved in the creation of secondary copies 116. Moreover, secondary storage devices 108 may be special purpose components, and interacting with them can require specialized intelligence.

In some cases, the client computing devices 102 interact directly with the secondary storage device 108 to create the secondary copies 116. However, in view of the factors described above, this approach can negatively impact the ability of the client computing devices 102 to serve the applications 110 and produce primary data 112. Further, the client computing devices 102 may not be optimized for interaction with the secondary storage devices 108.

Thus, in some embodiments, the information management system 100 includes one or more software and/or hardware components which generally act as intermediaries between the client computing devices 102 and the secondary storage devices 108. In addition to off-loading certain responsibilities from the client computing devices 102, these intermediate components can provide other benefits. For instance, as discussed further below with respect to FIG. 1D, distributing some of the work involved in creating secondary copies 116 can enhance scalability.

The intermediate components can include one or more secondary storage computing devices 106 as shown in FIG. 1A and/or one or more media agents, which can be software modules residing on corresponding secondary storage computing devices 106 (or other appropriate devices). Media agents are discussed below (e.g., with respect to FIGS. 1C-1E).

The secondary storage computing device(s) 106 can comprise any of the computing devices described above, without limitation In some cases, the secondary storage computing device(s) 106 include specialized hardware and/or software componentry for interacting with the secondary storage devices 108.

To create a secondary copy 116 involving the copying of data from the primary storage subsystem 117 to the secondary storage subsystem 118, the client computing device 102 in some embodiments communicates the primary data 112 to be copied (or a processed version thereof) to the designated secondary storage computing device 106, via the communication pathway 114. The secondary storage computing device 106 in turn conveys the received data (or a processed version thereof) to the secondary storage device 108. In some such configurations, the communication pathway 114 between the client computing device 102 and the secondary storage computing device 106 comprises a portion of a LAN, WAN or SAN. In other cases, at least some client computing devices 102 communicate directly with the secondary storage devices 108 (e.g., via Fibre Channel or SCSI connections). In some other cases, one or more secondary copies 116 are created from existing secondary copies, such as in the case of an auxiliary copy operation, described in greater detail below.

Exemplary Primary Data and an Exemplary Secondary Copy

Figure 1B:
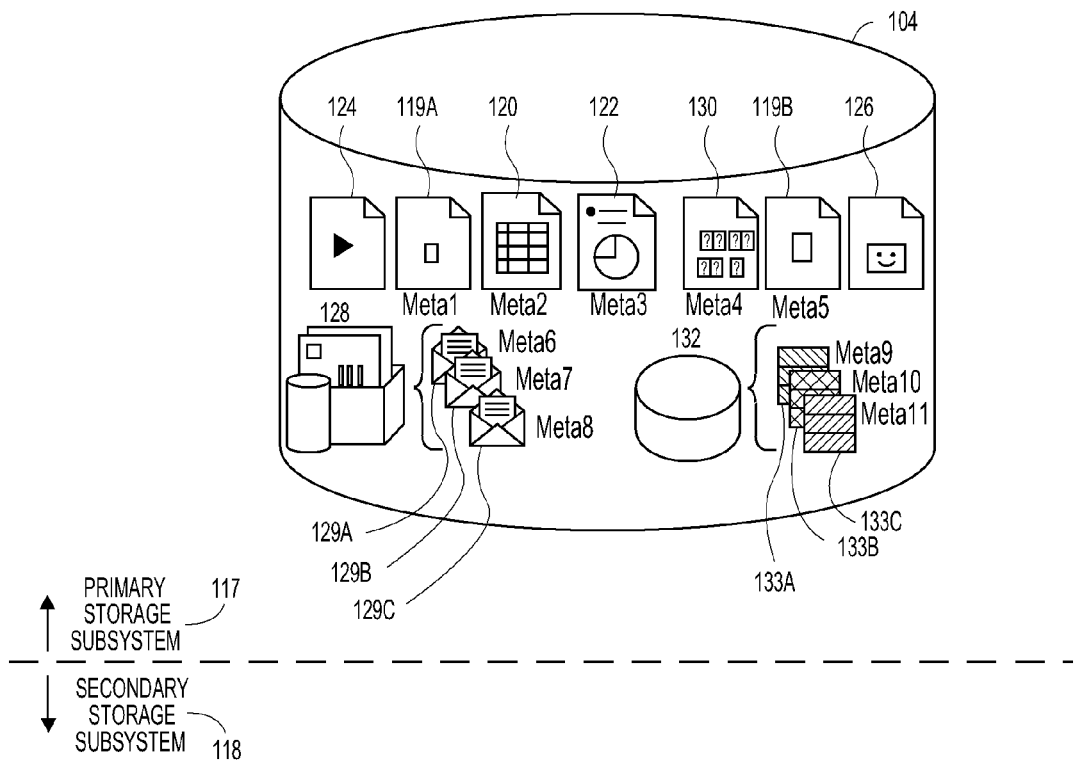
FIG. 1B is a detailed view of a primary storage device, a secondary storage device, and some examples of primary data and secondary copy data.
Figure 1B:
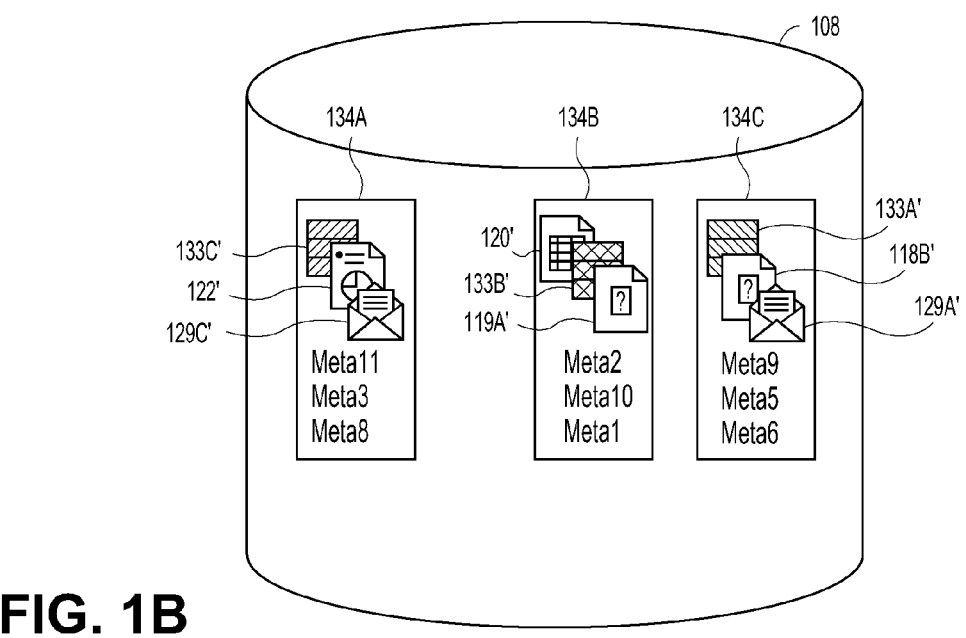

FIG. 1B is a detailed view showing some specific examples of primary data stored on the primary storage device(s) 104 and secondary copy data stored on the secondary storage device(s) 108, with other components in the system removed for the purposes of illustration. Stored on the primary storage device(s) 104 are primary data objects including word processing documents 119A-B, spreadsheets 120, presentation documents 122, video files 124, image files 126, email mailboxes 128 (and corresponding email messages 129A-C), html/xml or other types of markup language files 130, databases 132 and corresponding tables or other data structures 133A-133C).

Some or all primary data objects are associated with corresponding metadata (e.g., "Meta1-11"), which may include file system metadata and/or application specific metadata. Stored on the secondary storage device(s) 108 are secondary copy data objects 134A-C which may include copies of or otherwise represent corresponding primary data objects and metadata.

As shown, the secondary copy data objects 134A-C can individually represent more than one primary data object. For example, secondary copy data object 134A represents three separate primary data objects 133C, 122 and 129C (represented as 133C', 122' and 129C', respectively). Moreover, as indicated by the prime mark ('), a secondary copy object may store a representation of a primary data object or metadata differently than the original format, e.g., in a compressed, encrypted, deduplicated, or other modified format.

Exemplary Information Management System Architecture

The information management system 100 can incorporate a variety of different hardware and software components, which can in turn be organized with respect to one another in many different configurations, depending on the embodiment. There are critical design choices involved in specifying the functional responsibilities of the components and the role of each component in the information management system 100. For instance, as will be discussed, such design choices can impact performance as well as the adaptability of the information management system 100 to data growth or other changing circumstances.

FIG. 1C shows an information management system 100 designed according to these considerations and which includes: a central storage or information manager 140 configured to perform certain control functions, one or more data agents 142 executing on the client computing device(s) 102 configured to process primary data 112, and one or more media agents 144 executing on the one or more secondary storage computing devices 106 for performing tasks involving the secondary storage devices 108. While distributing functionality amongst multiple computing devices can have certain advantages, in other contexts it can be beneficial to consolidate functionality on the same computing device. As such, in various other embodiments, one or more of the components shown in FIG. 1C as being implemented on separate computing devices are implemented on the same computing device. In one configuration, a storage manager 140, one or more data agents 142, and one or more media agents 144 are all implemented on the same computing device. In another embodiment, one or more data agents 142 and one or more media agents 144 are implemented on the same computing device, while the storage manager is implemented on a separate computing device.

Storage Manager

As noted, the number of components in the information management system 100 and the amount of data under management can be quite large. Managing the components and data is therefore a significant task, and a task that can grow in an often unpredictable fashion as the quantity of components and data scale to meet the needs of the organization.

For these and other reasons, according to certain embodiments, responsibility for controlling the information management system 100, or at least a significant portion of that responsibility, is allocated to the storage manager 140.

By distributing control functionality in this manner, the storage manager 140 can be adapted independently according to changing circumstances. Moreover, a computing device for hosting the storage manager 140 can be selected to best suit the functions of the storage manager 140. These and other advantages are described in further detail below with respect to FIG. 1D.

The storage manager 140 may be a software module or other application. The storage manager generally initiates, performs, coordinates and/or controls storage and other information management operations performed by the information management system 100, e.g., to protect and control the primary data 112 and secondary copies 116 of data and metadata.

As shown by the dashed, arrowed lines, the storage manager 140 may communicate with and/or control some or all elements of the information management system 100, such as the data agents 142 and media agents 144. Thus, in certain embodiments, control information originates from the storage manager 140, whereas payload data and payload metadata is generally communicated between the data agents 142 and the media agents 144 (or otherwise between the client computing device(s) 102 and the secondary storage computing device(s) 106), e.g., at the direction of the storage manager 140. Control information can generally include parameters and instructions for carrying out information management operations, such as, without limitation, instructions to perform a task associated with an operation, timing information specifying when to initiate a task associated with an operation, data path information specifying what components to communicate with or access in carrying out an operation, and the like. Payload data, on the other hand, can include the actual data involved in the storage operation, such as content data written to a secondary storage device 108 in a secondary copy operation. Payload metadata can include any of the types of metadata described herein, and may be written to a storage device along with the payload content data (e.g., in the form of a header).

In other embodiments, some information management operations are controlled by other components in the information management system 100 (e.g., the media agent(s) 144 or data agent(s) 142), instead of or in combination with the storage manager 140.

According to certain embodiments, the storage manager provides one or more of the following functions:
- initiating execution of secondary copy operations;
- managing secondary storage devices 108 and inventory/capacity of the same;
- reporting, searching, and/or classification of data in the information management system 100;
- allocating secondary storage devices 108 for secondary storage operations;
- monitoring completion of and providing status reporting related to secondary storage operations;

tracking age information relating to secondary copies 116, secondary storage devices 108, and comparing the age information against retention guidelines;

tracking movement of data within the information management system 100;

tracking logical associations between components in the information management system 100;

protecting metadata associated with the information management system 100; and implementing operations management functionality.

The storage manager 140 may maintain a database 146 of management-related data and information management policies 148. The database 146 may include a management index 150 or other data structure that stores logical associations between components of the system, user preferences and/or profiles (e.g., preferences regarding encryption, compression, or deduplication of primary or secondary copy data, preferences regarding the scheduling, type, or other aspects of primary or secondary copy or other operations, mappings of particular information management users or user accounts to certain computing devices or other components, etc.), management tasks, media containerization, or other useful data. For example, the storage manager 140 may use the index 150 to track logical associations between media agents 144 and secondary storage devices 108 and/or movement of data from primary storage devices 104 to secondary storage devices 108. For instance, the storage manager index 150 may store data associating a client computing device 102 with a particular media agent 144 and/or secondary storage device 108, as specified in a storage policy.

Administrators and other employees may be able to manually configure and initiate certain information management operations on an individual basis. But while this may be acceptable for some recovery operations or other relatively less frequent tasks, it is often not workable for implementing on-going organization-wide data protection and management.

Thus, the information management system 100 may utilize information management policies 148 for specifying and executing information management operations (e.g., on an automated basis). Generally, an information management policy 148 can include a data structure or other information source that specifies a set of parameters (e.g., criteria and rules) associated with storage or other information management operations.

The storage manager database 146 may maintain the information management policies 148 and associated data, although the information management policies 148 can be stored in any appropriate location. For instance, a storage policy may be stored as metadata in a media agent database 152 or in a secondary storage device 108 (e.g., as an archive copy) for use in restore operations or other information management operations, depending on the embodiment. Information management policies 148 are described further below.

According to certain embodiments, the storage manager database 146 comprises a relational database (e.g., an SQL database) for tracking metadata, such as metadata associated with secondary copy operations (e.g., what client computing devices 102 and corresponding data were protected). This and other metadata may additionally be stored in other locations, such as at the secondary storage computing devices 106 or on the secondary storage devices 108, allowing data recovery without the use of the storage manager 140.

As shown, the storage manager 140 may include a jobs agent 156, a user interface 158, and a management agent 154, all of which may be implemented as interconnected software modules or application programs.

The jobs agent 156 in some embodiments initiates, controls, and/or monitors the status of some or all storage or other information management operations previously performed, currently being performed, or scheduled to be performed by the information management system 100. For instance, the jobs agent 156 may access information management policies 148 to determine when and how to initiate and control secondary copy and other information management operations, as will be discussed further.

The user interface 158 may include information processing and display software, such as a graphical user interface ("GUI"), an application program interface ("API"), or other interactive interface through which users and system processes can retrieve information about the status of information management operations (e.g., storage operations) or issue instructions to the information management system 100 and its constituent components.

Via the user interface 158, users may optionally issue instructions to the components in the information management system 100 regarding performance of storage and recovery operations. For example, a user may modify a schedule concerning the number of pending secondary copy operations. As another example, a user may employ the GUI to view the status of pending storage operations or to monitor the status of certain components in the information management system 100 (e.g., the amount of capacity left in a storage device).

The storage manager 140 may also track information that permits it to select, designate, or otherwise identify content indices, deduplication databases, or similar databases or resources or data sets within its information management "cell" (or another cell) to be searched in response to certain queries. Such queries may be entered by the user via interaction with the user interface 158. An information management cell may generally include a logical and/or physical grouping of a combination of hardware and software components associated with performing information management operations on electronic data. For instance, the components shown in FIG. 1C may together form an information management cell. Multiple cells may be organized hierarchically. With this configuration, cells may inherit properties from hierarchically superior cells or be controlled by other cells in the hierarchy (automatically or otherwise). Alternatively, in some embodiments, cells may inherit or otherwise be associated with information management policies, preferences, information management metrics, or other properties or characteristics according to their relative position in a hierarchy of storage operation cells. Cells may also be delineated and/or organized hierarchically according to function, geography, architectural considerations, or other factors useful or desirable in performing information management operations. A first cell may represent a geographic segment of an enterprise, such as a Chicago office, and a second storage operation cell may represent a different geographic segment, such as a New York office. Other cells may represent departments within a particular office. Where delineated by function, a first cell may perform one or more first types of information management operations (e.g., one or more first types of secondary or other copies), and a second cell may perform one or more second types of information management operations (e.g., one or more second types of secondary or other copies).

In general, the management agent 154 allows multiple information management cells 100 to communicate with one another. For example, the information management system 100 in some cases may be one information management cell of a network of multiple cells adjacent to one another or otherwise logically related in a WAN or LAN. With this arrangement, the cells may be connected to one another through respective management agents 154.

For instance, the management agent 154 can provide the storage manager 140 with the ability to communicate with other components within the information management system 100 (and/or other cells within a larger information management system) via network protocols and application programming interfaces ("APIs") including, e.g., HTTP, HTTPS, FTP, REST, virtualization software APIs, cloud service provider APIs, and hosted service provider APIs. Intercell communication and hierarchy is described in greater detail in U.S. Pat. No. 7,035,880, which is incorporated by reference herein.

Data Agents

As discussed, a variety of different types of applications 110 can reside on a given client computing device 102, including operating systems, database applications, e-mail applications, and virtual machines, just to name a few. And, as part of the process of creating and restoring secondary copies 116, the client computing devices 102 may be tasked with processing and preparing the primary data 112 from these various different applications 110. Moreover, the nature of the processing/preparation can differ across clients and application types, e.g., due to inherent structural and formatting differences between applications 110.

The one or more data agent(s) 142 are therefore advantageously configured in some embodiments to assist in the performance of information management operations based on the type of data that is being protected, at a client-specific and/or application-specific level.

The data agent 142 may be a software module or component that is generally responsible for managing, initiating, or otherwise assisting in the performance of information management operations. For instance, the data agent 142 may take part in performing data storage operations such as the copying, archiving, migrating, replicating of primary data 112 stored in the primary storage device(s) 104. The data agent 142 may receive control information from the storage manager 140, such as commands to transfer copies of data objects, metadata, and other payload data to the media agents 144.

In some embodiments, a data agent 142 may be distributed between the client computing device 102 and storage manager 140 (and any other intermediate components) or may be deployed from a remote location or its functions approximated by a remote process that performs some or all of the functions of data agent 142. In addition, a data agent 142 may perform some functions provided by a media agent 144, or may perform other functions such as encryption and deduplication.

As indicated, each data agent 142 may be specialized for a particular application 110, and the system can employ multiple application-specific data agents 142, each of which may perform information management operations (e.g., perform backup, migration, and data recovery) associated with a different application 110. For instance, different individual data agents 142 may be designed to handle Microsoft Exchange data, Lotus Notes data, Microsoft Windows file system data, Microsoft Active Directory Objects data, SQL Server data, SharePoint data, Oracle database data, SAP database data, virtual machines and/or associated data, and other types of data.

A file system data agent, for example, may handle data files and/or other file system information. If a client computing device 102 has two or more types of data, one data agent 142 may be used for each data type to copy, archive, migrate, and restore the client computing device 102 data. For example, to backup, migrate, and restore all of the data on a Microsoft Exchange server, the client computing device 102 may use one Microsoft Exchange Mailbox data agent 142 to backup the Exchange mailboxes, one Microsoft Exchange Database data agent 142 to backup the Exchange databases, one Microsoft Exchange Public Folder data agent 142 to backup the Exchange Public Folders, and one Microsoft Windows File System data agent 142 to backup the file system of the client computing device 102. In such embodiments, these data agents 142 may be treated as four separate data agents 142 even though they reside on the same client computing device 102.

Other embodiments may employ one or more generic data agents 142 that can handle and process data from two or more different applications 110, or that can handle and process multiple data types, instead of or in addition to using specialized data agents 142. For example, one generic data agent 142 may be used to back up, migrate and restore Microsoft Exchange Mailbox data and Microsoft Exchange Database data while another generic data agent may handle Microsoft Exchange Public Folder data and Microsoft Windows File System data.

Each data agent 142 may be configured to access data and/or metadata stored in the primary storage device(s) 104 associated with the data agent 142 and process the data as appropriate. For example, during a secondary copy operation, the data agent 142 may arrange or assemble the data and metadata into one or more files having a certain format (e.g., a particular backup or archive format) before transferring the file(s) to a media agent 144 or other component. The file(s) may include a list of files or other metadata. Each data agent 142 can also assist in restoring data or metadata to primary storage devices 104 from a secondary copy 116. For instance, the data agent 142 may operate in conjunction with the storage manager 140 and one or more of the media agents 144 to restore data from secondary storage device(s) 108.

Media Agents

As indicated above with respect to FIG. 1A, off-loading certain responsibilities from the client computing devices 102 to intermediate components such as the media agent(s) 144 can provide a number of benefits including improved client computing device 102 operation, faster secondary copy operation performance, and enhanced scalability. As one specific example which will be discussed below in further detail, the media agent 144 can act as a local cache of copied data and/or metadata that it has stored to the secondary storage device(s) 108, providing improved restore capabilities.

Generally speaking, a media agent 144 may be implemented as a software module that manages, coordinates, and facilitates the transmission of data, as directed by the storage manager 140, between a client computing device 102 and one or more secondary storage devices 108. Whereas the storage manager 140 controls the operation of the information management system 100, the media agent 144 generally provides a portal to secondary storage devices 108. For instance, other components in the system interact with the media agents 144 to gain access data stored on the secondary storage devices 108, whether it be for the purposes of reading, writing, modifying, or deleting data. Moreover, as will be described further, media agents 144 can generate and store data and metadata data that generally provides insight into the data stored on associated secondary storage devices 108.

Media agents 144 can comprise separate nodes in the information management system 100 (e.g., nodes that are separate from the client computing devices 102, storage manager 140, and/or secondary storage devices 108). In general, a node within the information management system 100 can be a logically and/or physically separate component, and in some cases is a component that is individually addressable or otherwise identifiable. In addition, each media agent 144 may reside on a dedicated secondary storage computing device 106 in some cases, while in other embodiments a plurality of media agents 144 reside on the same secondary storage computing device 106.

A media agent 144 (and corresponding media agent database 152) may be considered to be "associated with" a particular secondary storage device 108 if that media agent 144 is capable of one or more of: routing and/or storing data to the particular secondary storage device 108, coordinating the routing and/or storing of data to the particular secondary storage device 108, retrieving data from the particular secondary storage device 108, coordinating the retrieval of data from a particular secondary storage device 108, and modifying and/or deleting data retrieved from the particular secondary storage device 104.

While media agent(s) 144 are generally associated with one or more secondary storage devices 108, one or more media agents 144 in certain embodiments are physically separate from the secondary storage devices 108. For instance, the media agents 144 may reside on secondary storage computing devices 106 having different housings or packages than the secondary storage devices 108. In one example, a media agent 144 resides on a first server computer and is in communication with a secondary storage device(s) 108 residing in a separate, rack-mounted RAID-based system.

Where the information management system 100 includes multiple media agents 144 (FIG. 1D), a first media agent 144 may provide failover functionality for a second, failed media agent 144. In addition, media agents 144 can be dynamically selected for storage operations to provide load balancing. Failover and load balancing are described in greater detail below.

In operation, a media agent 144 associated with a particular secondary storage device 108 may instruct the secondary storage device 108 to perform an information management operation. For instance, a media agent 144 may instruct a tape library to use a robotic arm or other retrieval means to load or eject a certain storage media, and to subsequently archive, migrate, or retrieve data to or from that media, e.g., for the purpose of restoring the data to a client computing device 102. As another example, a secondary storage device 108 may include an array of hard disk drives or solid state drives organized in a RAID configuration, and the media agent 144 may forward a logical unit number (LUN) and other appropriate information to the array, which uses the received information to execute the desired storage operation. The media agent 144 may communicate with a secondary storage device 108 via a suitable communications link, such as a SCSI or Fiber Channel link.

As shown, each media agent 144 may maintain an associated media agent database 152. The media agent database 152 may be stored in a disk or other storage device (not shown) that is local to the secondary storage computing device 106 on which the media agent 144 resides. In other cases, the media agent database 152 is stored remotely from the secondary storage computing device 106.

The media agent database 152 can include, among other things, an index 153 including data generated during secondary copy operations and other storage or information management operations. The index 153 provides a media agent 144 or other component with a fast and efficient mechanism for locating secondary copies 116 or other data stored in the secondary storage devices 108. In some cases, the index 153 does not form a part of and is instead separate from the media agent database 152.

A media agent index 153 or other data structure associated with the particular media agent 144 may include information about the stored data. For instance, for each secondary copy 116, the index 153 may include metadata such as a list of the data objects (e.g., files/subdirectories, database objects, mailbox objects, etc.), a path to the secondary copy 116 on the corresponding secondary storage device 108, location information indicating where the data objects are stored in the secondary storage device 108, when the data objects were created or modified, etc. Thus, the index 153 includes metadata associated with the secondary copies 116 that is readily available for use in storage operations and other activities without having to be first retrieved from the secondary storage device 108. In yet further embodiments, some or all of the data in the index 153 may instead or additionally be stored along with the data in a secondary storage device 108, e.g., with a copy of the index 153. In some embodiments, the secondary storage devices 108 can include sufficient information to perform a "bare metal restore", where the operating system of a failed client computing device 102 or other restore target is automatically rebuilt as part of a restore operation.

Because the index 153 maintained in the database 152 may operate as a cache, it can also be referred to as an index cache. In such cases, information stored in the index cache 153 typically comprises data that reflects certain particulars about storage operations that have occurred relatively recently. After some triggering event, such as after a certain period of time elapses, or the index cache 153 reaches a particular size, the index cache 153 may be copied or migrated to a secondary storage device(s) 108. This information may need to be retrieved and uploaded back into the index cache 153 or otherwise restored to a media agent 144 to facilitate retrieval of data from the secondary storage device(s) 108. In some embodiments, the cached information may include format or containerization information related to archives or other files stored on the storage device(s) 108. In this manner, the index cache 153 allows for accelerated restores.

In some alternative embodiments the media agent 144 generally acts as a coordinator or facilitator of storage operations between client computing devices 102 and corresponding secondary storage devices 108, but does not actually write the data to the secondary storage device 108. For instance, the storage manager 140 (or the media agent 144) may instruct a client computing device 102 and secondary storage device 108 to communicate with one another directly. In such a case the client computing device 102 transmits the data directly or via one or more intermediary components to the secondary storage device 108 according to the received instructions, and vice versa. In some such cases, the media agent 144 may still receive, process, and/or maintain metadata related to the storage operations. Moreover, in these embodiments, the payload data can flow through the media agent 144 for the purposes of populating the index cache 153 maintained in the media agent database 152, but not for writing to the secondary storage device 108.

The media agent 144 and/or other components such as the storage manager 140 may in some cases incorporate additional functionality, such as data classification, content indexing, deduplication, encryption, compression, and the like. Further details regarding these and other functions are described below.

Distributed, Scalable Architecture

As described, certain functions of the information management system 100 can be distributed amongst various physical and/or logical components in the system. For instance, one or more of the storage manager 140, data agents 142, and media agents 144 may reside on computing devices that are physically separate from one another. This architecture can provide a number of benefits.

For instance, hardware and software design choices for each distributed component can be targeted to suit its particular function. The secondary computing devices 106 on which the media agents 144 reside can be tailored for interaction with associated secondary storage devices 108 and provide fast index cache operation, among other specific tasks. Similarly, the client computing device(s) 102 can be selected to effectively service the applications 110 residing thereon, in order to efficiently produce and store primary data 112.

Moreover, in some cases, one or more of the individual components in the information management system 100 can be distributed to multiple, separate computing devices. As one example, for large file systems where the amount of data stored in the storage management database 146 is relatively large, the management database 146 may be migrated to or otherwise reside on a specialized database server (e.g., an SQL server) separate from a server that implements the other functions of the storage manager 140. This configuration can provide added protection because the database 146 can be protected with standard database utilities (e.g., SQL log shipping or database replication) independent from other functions of the storage manager 140. The database 146 can be efficiently replicated to a remote site for use in the event of a disaster or other data loss incident at the primary site. Or the database 146 can be replicated to another computing device within the same site, such as to a higher performance machine in the event that a storage manager host device can no longer service the needs of a growing information management system 100.

Figure 1D:
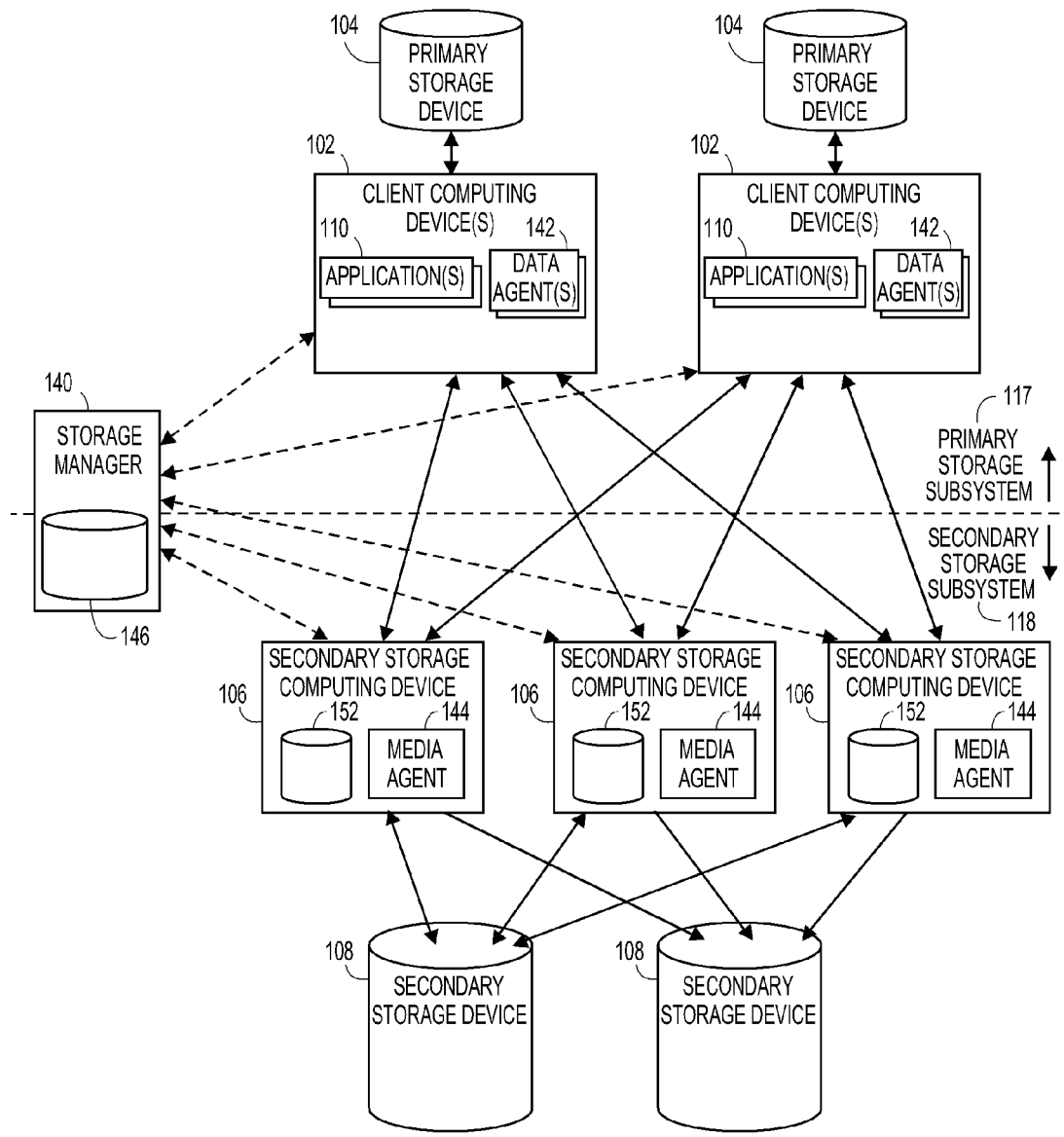
FIG. 1D is a block diagram illustrating a scalable information management system.

The distributed architecture also provides both scalability and efficient component utilization. FIG. 1D shows an embodiment of the information management system 100 including a plurality of client computing devices 102 and associated data agents 142 as well as a plurality of secondary storage computing devices 106 and associated media agents 144.

Additional components can be added or subtracted based on the evolving needs of the information management system 100. For instance, depending on where bottlenecks are identified, administrators can add additional client computing devices 102, secondary storage devices 106 (and corresponding media agents 144), and/or secondary storage devices 108. Moreover, where multiple fungible components are available, load balancing can be implemented to dynamically address identified bottlenecks. As an example, the storage manager 140 may dynamically select which media agents 144 and/or secondary storage devices 108 to use for storage operations based on a processing load analysis of the media agents 144 and/or secondary storage devices 108, respectively.

Moreover, each client computing device 102 in some embodiments can communicate with, among other components, any of the media agents 144, e.g., as directed by the storage manager 140. And each media agent 144 may be able to communicate with, among other components, any of the secondary storage devices 108, e.g., as directed by the storage manager 140. Thus, operations can be routed to the secondary storage devices 108 in a dynamic and highly flexible manner, to provide load balancing, failover, and the like. Further examples of scalable systems capable of dynamic storage operations, and of systems capable of performing load balancing and fail over are provided in U.S. Pat. No. 7,246,207, which is incorporated by reference herein.

In alternative configurations, certain components are not distributed and may instead reside and execute on the same computing device. For example, in some embodiments one or more data agents 142 and the storage manager 140 reside on the same client computing device 102. In another embodiment, one or more data agents 142 and one or more media agents 144 reside on a single computing device.

Exemplary Types of Information Management Operations

In order to protect and leverage stored data, the information management system 100 can be configured to perform a variety of information management operations. As will be described, these operations can generally include secondary copy and other data movement operations, processing and data manipulation operations, analysis, reporting, and management operations.

Data Movement Operations

Data movement operations according to certain embodiments are generally operations that involve the copying or migration of data (e.g., payload data) between different locations in the information management system 100 in an original/native and/or one or more different formats. For example, data movement operations can include operations in which stored data is copied, migrated, or otherwise transferred from one or more first storage devices to one or more second storage devices, such as from primary storage device(s) 104 to secondary storage device(s) 108, from secondary storage device(s) 108 to different secondary storage device(s) 108, from secondary storage devices 108 to primary storage devices 104, or from primary storage device(s) 104 to different primary storage device(s) 104.

Data movement operations can include by way of example, backup operations, archive operations, information lifecycle management operations such as hierarchical storage management operations, replication operations (e.g., continuous data replication operations), snapshot operations, deduplication or single-instancing operations, auxiliary copy operations, and the like. As will be discussed, some of these operations involve the copying, migration or other movement of data, without actually creating multiple, distinct copies. Nonetheless, some or all of these operations are referred to as "copy" operations for simplicity.

Backup Operations

A backup operation creates a copy of a version of data (e.g., one or more files or other data units) in primary data 112 at a particular point in time. Each subsequent backup copy may be maintained independently of the first. Further, a backup copy in some embodiments is generally stored in a form that is different than the native format, e.g., a backup format. This can be in contrast to the version in primary data 112 from which the backup copy is derived, and which may instead be stored in a native format of the source application(s) 110. In various cases, backup copies can be stored in a format in which the data is compressed, encrypted, deduplicated, and/or otherwise modified from the original application format. For example, a backup copy may be stored in a backup format that facilitates compression and/or efficient long-term storage.

Backup copies can have relatively long retention periods as compared to primary data 112, and may be stored on media with slower retrieval times than primary data 112 and certain other types of secondary copies 116. On the other hand, backups may have relatively shorter retention periods than some other types of secondary copies 116, such as archive copies (described below). Backups may sometimes be stored at on offsite location.

Backup operations can include full, synthetic or incremental backups. A full backup in some embodiments is generally a complete image of the data to be protected. However, because full backup copies can consume a relatively large amount of storage, it can be useful to use a full backup copy as a baseline and only store changes relative to the full backup copy for subsequent backup copies.

For instance, a differential backup operation (or cumulative incremental backup operation) tracks and stores changes that have occurred since the last full backup. Differential backups can grow quickly in size, but can provide relatively efficient restore times because a restore can be completed in some cases using only the full backup copy and the latest differential copy.

An incremental backup operation generally tracks and stores changes since the most recent backup copy of any type, which can greatly reduce storage utilization. In some cases, however, restore times can be relatively long in comparison to full or differential backups because completing a restore operation may involve accessing a full backup in addition to multiple incremental backups.

Any of the above types of backup operations can be at the volume-level, file-level, or block-level. Volume level backup operations generally involve the copying of a data volume (e.g., a logical disk or partition) as a whole. In a file-level backup, the information management system 100 may generally track changes to individual files at the file-level, and includes copies of files in the backup copy. In the case of a block-level backup, files are broken into constituent blocks, and changes are tracked at the block-level. Upon restore, the information management system 100 reassembles the blocks into files in a transparent fashion.

Far less data may actually be transferred and copied to the secondary storage devices 108 during a file-level copy than a volume-level copy. Likewise, a block-level copy may involve the transfer of less data than a file-level copy, resulting in faster execution times. However, restoring a relatively higher-granularity copy can result in longer restore times. For instance, when restoring a block-level copy, the process of locating constituent blocks can sometimes result in longer restore times as compared to file-level backups. Similar to backup operations, the other types of secondary copy operations described herein can also be implemented at either the volume-level, file-level, or block-level.

Archive Operations

Because backup operations generally involve maintaining a version of the copied data in primary data 112 and also maintaining backup copies in secondary storage device(s) 108, they can consume significant storage capacity. To help reduce storage consumption, an archive operation according to certain embodiments creates a secondary copy 116 by both copying and removing source data. Or, seen another way, archive operations can involve moving some or all of the source data to the archive destination. Thus, data satisfying criteria for removal (e.g., data of a threshold age or size) from the source copy may be removed from source storage. Archive copies are sometimes stored in an archive format or other non-native application format. The source data may be primary data 112 or a secondary copy 116, depending on the situation. As with backup copies, archive copies can be stored in a format in which the data is compressed, encrypted, deduplicated, and/or otherwise modified from the original application format.

In addition, archive copies may be retained for relatively long periods of time (e.g., years) and, in some cases, are never deleted. Archive copies are generally retained for longer periods of time than backup copies, for example. In certain embodiments, archive copies may be made and kept for extended periods in order to meet compliance regulations.

Moreover, when primary data 112 is archived, in some cases the archived primary data 112 or a portion thereof is deleted when creating the archive copy. Thus, archiving can serve the purpose of freeing up space in the primary storage device(s) 104. Similarly, when a secondary copy 116 is archived, the secondary copy 116 may be deleted, and an archive copy can therefore serve the purpose of freeing up space in secondary storage device(s) 108. In contrast, source copies often remain intact when creating backup copies. Examples of compatible data archiving operations are provided in U.S. Pat. No. 7,107,298, entitled "SYSTEM AND METHOD FOR ARCHIVING OBJECTS IN AN INFORMATION STORE", which is incorporated by reference herein.

Snapshot Operations

Snapshot operations can provide a relatively lightweight, efficient mechanism for protecting data. From an end-user viewpoint, a snapshot may be thought of as an "instant" image of the primary data 112 at a given point in time. In one embodiment, a snapshot may generally capture the directory structure of an object in primary data 112 such as a file or volume or other data set at a particular moment in time and may also preserve file attributes and contents. A snapshot in some cases is created relatively quickly, e.g., substantially instantly, using a minimum amount of file space, but may still function as a conventional file system backup.

A "hardware" snapshot operation can be a snapshot operation where a target storage device (e.g., a primary storage device 104 or a secondary storage device 108) performs the snapshot operation in a self-contained fashion, substantially independently, using hardware, firmware and/or software residing on the storage device itself. For instance, the storage device may be capable of performing snapshot operations upon request, generally without intervention or oversight from any of the other components in the information management system 100. In this manner, using hardware snapshots can off-load processing involved in creating and management from other components in the system 100.

A "software" snapshot operation, on the other hand, can be a snapshot operation in which one or more other components in the system (e.g., the client computing devices 102, media agents 104, etc.) implement a software layer that manages the snapshot operation via interaction with the target storage device. For instance, the component implementing the snapshot management software layer may derive a set of pointers and/or data that represents the snapshot. The snapshot management software layer may then transmit the same to the target storage device, along with appropriate instructions for writing the snapshot.

Some types of snapshots do not actually create another physical copy of all the data as it existed at the particular point in time, but may simply create pointers that are able to map files and directories to specific memory locations (e.g., disk blocks) where the data resides, as it existed at the particular point in time. For example, a snapshot copy may include a set of pointers derived from the file system or an application. In some other cases, the snapshot may created at the block-level, such as where creation of the snapshot occurs without awareness of the file system. Each pointer points to a respective stored data block, so collectively, the set of pointers reflect the storage location and state of the data object (e.g., file(s) or volume(s) or data set(s)) at a particular point in time when the snapshot copy was created.

In some embodiments, once a snapshot has been taken, subsequent changes to the file system typically do not overwrite the blocks in use at the time of the snapshot. Therefore, the initial snapshot may use only a small amount of disk space needed to record a mapping or other data structure representing or otherwise tracking the blocks that correspond to the current state of the file system. Additional disk space is usually required only when files and directories are actually modified later. Furthermore, when files are modified, typically only the pointers which map to blocks are copied, not the blocks themselves. In some embodiments, for example in the case of "copy-on-write" snapshots, when a block changes in primary storage, the block is copied to secondary storage or cached in primary storage before the block is overwritten in primary storage. The snapshot mapping of file system data is also updated to reflect the changed block(s) at that particular point in time. In some other cases, a snapshot includes a full physical copy of all or substantially all of the data represented by the snapshot. Further examples of snapshot operations are provided in U.S. Pat. No. 7,529,782, which is incorporated by reference herein.

A snapshot copy in many cases can be made quickly and without significantly impacting primary computing resources because large amounts of data need not be copied or moved. In some embodiments, a snapshot may exist as a virtual file system, parallel to the actual file system. Users in some cases gain read-only access to the record of files and directories of the snapshot. By electing to restore primary data 112 from a snapshot taken at a given point in time, users may also return the current file system to the state of the file system that existed when the snapshot was taken.

Replication Operations

Another type of secondary copy operation is a replication operation. Some types of secondary copies 116 are used to periodically capture images of primary data 112 at particular points in time (e.g., backups, archives, and snapshots). However, it can also be useful for recovery purposes to protect primary data 112 in a more continuous fashion, by replicating the primary data 112 substantially as changes occur. In some cases a replication copy can be a mirror copy, for instance, where changes made to primary data 112 are mirrored or substantially immediately copied to another location (e.g., to secondary storage device(s) 108). By copying each write operation to the replication copy, two storage systems are kept synchronized or substantially synchronized so that they are virtually identical at approximately the same time. Where entire disk volumes are mirrored, however, mirroring can require significant amount of storage space and utilizes a large amount of processing resources.

According to some embodiments storage operations are performed on replicated data that represents a recoverable state, or "known good state" of a particular application running on the source system. For instance, in certain embodiments, known good replication copies may be viewed as copies of primary data 112. This feature allows the system to directly access, copy, restore, backup or otherwise manipulate the replication copies as if the data was the "live", primary data 112. This can reduce access time, storage utilization, and impact on source applications 110, among other benefits.

Based on known good state information, the information management system 100 can replicate sections of application data that represent a recoverable state rather than rote copying of blocks of data. Examples of compatible replication operations (e.g., continuous data replication) are provided in U.S. Pat. No. 7,617,262, which is incorporated by reference herein.

Deduplication/Single-Instancing Operations

Another type of data movement operation is deduplication or single-instance storage, which is useful to reduce the amount of data within the system. For instance, some or all of the above-described secondary storage operations can involve deduplication in some fashion. New data is read, broken down into portions (e.g., sub-file level blocks, files, etc.) of a selected granularity, compared with blocks that are already stored, and only the new blocks are stored. Blocks that already exist are represented as pointers to the already stored data.

In order to streamline the comparison process, the information management system 100 may calculate and/or store signatures (e.g., hashes) corresponding to the individual data blocks in a database and compare the hashes instead of comparing entire data blocks. In some cases, only a single instance of each element is stored, and deduplication operations may therefore be referred to interchangeably as "single-instancing" operations. Depending on the implementation, however, deduplication or single-instancing operations can store more than one instance of certain data blocks, but nonetheless significantly reduce data redundancy.

Depending on the embodiment, deduplication blocks can be of fixed or variable length. Using variable length blocks can provide enhanced deduplication by responding to changes in the data stream, but can involve complex processing. In some cases, the information management system 100 utilizes a technique for dynamically aligning deduplication blocks (e.g., fixed-length blocks) based on changing content in the data stream, as described in U.S. Pat. Pub. No. 2012/0084269, which is incorporated by reference herein.

The information management system 100 can perform deduplication in a variety of manners at a variety of locations in the information management system 100. For instance, in some embodiments, the information management system 100 implements "target-side" deduplication by deduplicating data (e.g., secondary copies 116) stored in the secondary storage devices 108. In some such cases, the media agents 144 are generally configured to manage the deduplication process. For instance, one or more of the media agents 144 maintain a corresponding deduplication database that stores deduplication information (e.g., datablock signatures). Examples of such a configuration are provided in U.S. Pat. Pub. No. 2012/0150826, which is incorporated by reference herein. Instead of or in combination with "target-side" deduplication, deduplication can also be performed on the "source-side" (or "client-side"), e.g., to reduce the amount of traffic between the media agents 144 and the client computing device(s) 102 and/or reduce redundant data stored in the primary storage devices 104. Examples of such deduplication techniques are provided in U.S. Pat. Pub. No. 2012/0150818, which is incorporated by reference herein.

Information Lifecycle Management and Hierarchical Storage Management Operations

In some embodiments, files and other data over their lifetime move from more expensive, quick access storage to less expensive, slower access storage. Operations associated with moving data through various tiers of storage are sometimes referred to as information lifecycle management (ILM) operations.

One type of ILM operation is a hierarchical storage management (HSM) operation. A HSM operation is generally an operation for automatically moving data between classes of storage devices, such as between high-cost and low-cost storage devices. For instance, an HSM operation may involve movement of data from primary storage devices 104 to secondary storage devices 108, or between tiers of secondary storage devices 108. With each tier, the storage devices may be progressively relatively cheaper, have relatively slower access/restore times, etc. For example, movement of data between tiers may occur as data becomes less important over time.

In some embodiments, an HSM operation is similar to an archive operation in that creating an HSM copy may (though not always) involve deleting some of the source data, e.g., according to one or more criteria related to the source data. For example, an HSM copy may include data from primary data 112 or a secondary copy 116 that is larger than a given size threshold or older than a given age threshold and that is stored in a backup format.

Often, and unlike some types of archive copies, HSM data that is removed or aged from the source copy is replaced by a logical reference pointer or stub. The reference pointer or stub can be stored in the primary storage device 104 (or other source storage device, such as a secondary storage device 108) to replace the deleted data in primary data 112 (or other source copy) and to point to or otherwise indicate the new location in a secondary storage device 108.

According to one example, files are generally moved between higher and lower cost storage depending on how often the files are accessed. When a user requests access to the HSM data that has been removed or migrated, the information management system 100 uses the stub to locate the data and often make recovery of the data appear transparent, even though the HSM data may be stored at a location different from the remaining source data. In this manner, the data appears to the user (e.g., in file system browsing windows and the like) as if it still resides in the source location (e.g., in a primary storage device 104). The stub may also include some metadata associated with the corresponding data, so that a file system and/or application can provide some information about the data object and/or a limited-functionality version (e.g., a preview) of the data object.

An HSM copy may be stored in a format other than the native application format (e.g., where the data is compressed, encrypted, deduplicated, and/or otherwise modified from the original application format). In some cases, copies which involve the removal of data from source storage and the maintenance of stub or other logical reference information on source storage may be referred to generally as "on-line archive copies". On the other hand, copies which involve the removal of data from source storage without the maintenance of stub or other logical reference information on source storage may be referred to as "off-line archive copies". Examples of HSM and ILM techniques are provided in U.S. Pat. No. 7,343,453, which is incorporated by reference herein.

Auxiliary Copy and Disaster Recovery Operations

An auxiliary copy is generally a copy operation in which a copy is created of an existing secondary copy 116. For instance, an initial or "primary" secondary copy 116 may be generated using or otherwise be derived from primary data 112 (or other data residing in the secondary storage subsystem 118), whereas an auxiliary copy is generated from the initial secondary copy 116. Auxiliary copies can be used to create additional standby copies of data and may reside on different secondary storage devices 108 than initial secondary copies 116. Thus, auxiliary copies can be used for recovery purposes if initial secondary copies 116 become unavailable. Exemplary compatible auxiliary copy techniques are described in further detail in U.S. Pat. No. 8,230,195, which is incorporated by reference herein.

The information management system 100 may also perform disaster recovery operations that make or retain disaster recovery copies, often as secondary, high-availability disk copies. The information management system 100 may create secondary disk copies and store the copies at disaster recovery locations using auxiliary copy or replication operations, such as continuous data replication technologies. Depending on the particular data protection goals, disaster recovery locations can be remote from the client computing devices 102 and primary storage devices 104, remote from some or all of the secondary storage devices 108, or both.

Data Analysis, Reporting, and Management Operations

Data analysis, reporting, and management operations can be different than data movement operations in that they do not necessarily involve the copying, migration, or other transfer of data (e.g., primary data 112 or secondary copies 116) between different locations in the system. For instance, data analysis operations may involve processing (e.g., offline processing) or modification of already stored primary data 112 and/or secondary copies 116. However, in some embodiments data analysis operations are performed in conjunction with data movement operations. Some data analysis operations include content indexing operations and classification operations which can be useful in leveraging the data under management to provide enhanced search and other features. Other data analysis operations such as compression and encryption can provide data reduction and security benefits, respectively.

Classification Operations/Content Indexing

In some embodiments, the information management system 100 analyzes and indexes characteristics, content, and metadata associated with the data stored within the primary data 112 and/or secondary copies 116, providing enhanced search capabilities for data discovery and other purposes. The content indexing can be used to identify files or other data objects having pre-defined content (e.g., user-defined keywords or phrases), metadata (e.g., email metadata such as "to", "from", "cc", "bcc", attachment name, received time, etc.).

The information management system 100 generally organizes and catalogues the results in a content index, which may be stored within the media agent database 152, for example. The content index can also include the storage locations of (or pointer references to) the indexed data in the primary data 112 or secondary copies 116, as appropriate. The results may also be stored, in the form of a content index database or otherwise, elsewhere in the information management system 100 (e.g., in the primary storage devices 104, or in the secondary storage device 108). Such index data provides the storage manager 140 or another component with an efficient mechanism for locating primary data 112 and/or secondary copies 116 of data objects that match particular criteria.

For instance, search criteria can be specified by a user through user interface 158 of the storage manager 140. In some cases, the information management system 100 analyzes data and/or metadata in secondary copies 116 to create an "off-line" content index, without significantly impacting the performance of the client computing devices 102. Depending on the embodiment, the system can also implement "on-line" content indexing, e.g., of primary data 112. Examples of compatible content indexing techniques are provided in U.S. Pat. No. 8,170,995, which is incorporated by reference herein.

In order to leverage the data stored in the information management system 100 to perform these and other tasks, one or more components can be configured to scan data and/or associated metadata for classification purposes to populate a database of information (which can be referred to as a "metabase"). Such scanned, classified data and/or metadata may be included in a separate database and/or on a separate storage device from primary data 112 (and/or secondary copies 116), such that operations related to the database do not significantly impact performance on other components in the information management system 100.

In other cases, the database(s) may be stored along with primary data 112 and/or secondary copies 116. Files or other data objects can be associated with user-specified identifiers (e.g., tag entries) in the media agent 144 (or other indices) to facilitate searches of stored data objects. Among a number of other benefits, the metabase can also allow efficient, automatic identification of files or other data objects to associate with secondary copy or other information management operations (e.g., in lieu of scanning an entire file system). Examples of compatible metabases and data classification operations are provided in U.S. Pat. Nos. 8,229,954 and 7,747,579, which are incorporated by reference herein.

Encryption Operations

The information management system 100 in some cases is configured to process data (e.g., files or other data objects, secondary copies 116, etc.), according to an appropriate encryption algorithm (e.g., Blowfish, Advanced Encryption Standard [AES], Triple Data Encryption Standard [3-DES], etc.) to limit access and provide data security in the information management system 100.

The information management system 100 in some cases encrypts the data at the client level, such that the client computing devices 102 (e.g., the data agents 142) encrypt the data prior to forwarding the data to other components, e.g., before sending the data media agents 144 during a secondary copy operation. In such cases, the client computing device 102 may maintain or have access to an encryption key or passphrase for decrypting the data upon restore. Encryption can also occur when creating copies of secondary copies, e.g., when creating auxiliary copies or archive copies. In yet further embodiments, the secondary storage devices 108 can implement built-in, high performance hardware encryption.

Management and Reporting Operations

Certain embodiments leverage the integrated, ubiquitous nature of the information management system 100 to provide useful system-wide management and reporting functions. Examples of some compatible management and reporting techniques are provided in U.S. Pat. No. 7,343,453, entitled "HIERARCHICAL SYSTEMS AND METHODS FOR PROVIDING A UNIFIED VIEW OF STORAGE INFORMATION", which is incorporated by reference herein.

Operations management can generally include monitoring and managing the health and performance of information management system 100 by, without limitation, performing error tracking, generating granular storage/performance metrics (e.g., job success/failure information, deduplication efficiency, etc.), generating storage modeling and costing information, and the like.

As an example, a storage manager 140 or other component in the information management system 100 may analyze traffic patterns and suggest or automatically route data via a particular route to e.g., certain facilitate storage and minimize congestion. In some embodiments, the system can generate predictions relating to storage operations or storage operation information. Such predictions described may be based on a trending analysis that may be used to predict various network operations or use of network resources such as network traffic levels, storage media use, use of bandwidth of communication links, use of media agent components, etc. Further examples of traffic analysis, trend analysis, prediction generation, and the like are described in U.S. Pat. No. 7,343,453, which is incorporated by reference herein.

In some configurations, a master storage manager 140 may track the status of a set of associated storage operation cells in a hierarchy of information management cells, such as the status of jobs, system components, system resources, and other items, by communicating with storage managers 140 (or other components) in the respective storage operation cells. Moreover, the master storage manager 140 may track the status of its associated storage operation cells and associated information management operations by receiving periodic status updates from the storage managers 140 (or other components) in the respective cells regarding jobs, system components, system resources, and other items. In some embodiments, a master storage manager 140 may store status information and other information regarding its associated storage operation cells and other system information in its index 150 (or other location).

The master storage manager or other component in the system may also determine whether a storage-related criteria or other criteria is satisfied, and perform an action or trigger event (e.g., data migration) in response to the criteria being satisfied, such as where a storage threshold is met for a particular volume, or where inadequate protection exists for certain data. For instance, in some embodiments, the system uses data from one or more storage operation cells to advise users of risks or indicates actions that can be used to mitigate or otherwise minimize these risks, and in some embodiments, dynamically takes action to mitigate or minimize these risks. For example, an information management policy may specify certain requirements (e.g., that a storage device should maintain a certain amount of free space, that secondary copies should occur at a particular interval, that data should be aged and migrated to other storage after a particular period, that data on a secondary volume should always have a certain level of availability and be able to be restored within a given time period, that data on a secondary volume may be mirrored or otherwise migrated to a specified number of other volumes, etc.). If a risk condition or other criteria is triggered, the system can notify the user of these conditions and may suggest (or automatically implement) an action to mitigate or otherwise address the condition or minimize risk. For example, the system may indicate that data from a primary copy 112 should be migrated to a secondary storage device 108 to free space on the primary storage device 104. Examples of the use of risk factors and other triggering criteria are described in U.S. Pat. No. 7,343,453, which is incorporated by reference herein.

In some embodiments, the system 100 may also determine whether a metric or other indication satisfies a particular storage criteria and, if so, perform an action. For example, as previously described, a storage policy or other definition might indicate that a storage manager 140 should initiate a particular action if a storage metric or other indication drops below or otherwise fails to satisfy a specified criteria such as a threshold of data protection. Examples of such metrics are described in U.S. Pat. No. 7,343,453, which is incorporated by reference herein.

In some embodiments, risk factors may be quantified into certain measurable service or risk levels for ease of comprehension. For example, certain applications and associated data may be considered to be more important by an enterprise than other data and services. Financial compliance data, for example, may be of greater importance than marketing materials, etc. Network administrators may assign priorities or "weights" to certain data or applications, corresponding to its importance (priority value). The level of compliance with the storage operations specified for these applications may also be assigned a certain value. Thus, the health, impact and overall importance of a service on an enterprise may be determined, for example, by measuring the compliance value and calculating the product of the priority value and the compliance value to determine the "service level" and comparing it to certain operational thresholds to determine if the operation is being performed within a specified data protection service level. Further examples of the service level determination are provided in U.S. Pat. No. 7,343,453, which is incorporated by reference herein.

The system 100 may additionally calculate data costing and data availability associated with information management operation cells according to an embodiment of the invention. For instance, data received from the cell may be used in conjunction with hardware-related information and other information about network elements to generate indications of costs associated with storage of particular data in the system or the availability of particular data in the system. In general, components in the system are identified and associated information is obtained (dynamically or manually). Characteristics or metrics associated with the network elements may be identified and associated with that component element for further use generating an indication of storage cost or data availability. Exemplary information generated could include how fast a particular department is using up available storage space, how long data would take to recover over a particular network pathway from a particular secondary storage device, costs over time, etc. Moreover, in some embodiments, such information may be used to determine or predict the overall cost associated with the storage of certain information. The cost associated with hosting a certain application may be based, at least in part, on the type of media on which the data resides. Storage devices may be assigned to a particular cost category which is indicative of the cost of storing information on that device. Further examples of costing techniques are described in U.S. Pat. No. 7,343,453, which is incorporated by reference herein.

Any of the above types of information (e.g., information related to trending, predictions, job, cell or component status, risk, service level, costing, etc.) can generally be provided to users via the user interface 158 in a single, integrated view or console. The console may support a reporting capability that allows for the generation of a variety of reports, which may be tailored to a particular aspect of information management. Report types may include: scheduling, event management, media management and data aging. Available reports may also include backup history, data aging history, auxiliary copy history, job history, library and drive, media in library, restore history and storage policy. Such reports may be specified and created at a certain point in time as a network analysis, forecasting, or provisioning tool. Integrated reports may also be generated that illustrate storage and performance metrics, risks and storage costing information. Moreover, users may create their own reports based on specific needs.

The integrated user interface 158 can include an option to show a "virtual view" of the system that graphically depicts the various components in the system using appropriate icons. As one example, the user interface may provide a graphical depiction of one or more primary storage devices 104, the secondary storage devices 108, data agents 142 and/or media agents 144, and their relationship to one another in the information management system 100. The operations management functionality can facilitate planning and decision-making. For example, in some embodiments, a user may view the status of some or all jobs as well as the status of each component of the information management system 100.

Users may then plan and make decisions based on this data. For instance, a user may view high-level information regarding storage operations for the information management system 100, such as job status, component status, resource status (e.g., network pathways, etc.), and other information. The user may also drill down or use other means to obtain more detailed information regarding a particular component, job, or the like.

Further examples of some reporting techniques and associated interfaces providing an integrated view of an information management system are provided in U.S. Pat. No. 7,343,453, which is incorporated by reference herein.

The information management system 100 can also be configured to perform system-wide e-discovery operations in some embodiments. In general, e-discovery operations provide a unified collection and search capability for data in the system, such as data stored in the secondary storage devices 108 (e.g., backups, archives, or other secondary copies 116). For example, the information management system 100 may construct and maintain a virtual repository for data stored in the information management system 100 that is integrated across source applications 110, different storage device types, etc. According to some embodiments, e-discovery utilizes other techniques described herein, such as data classification and/or content indexing.

Information Management Policies

As indicated previously, an information management policy 148 can include a data structure or other information source that specifies a set of parameters (e.g., criteria and rules) associated with secondary copy or other information management operations.

One type of information management policy 148 is a storage policy. According to certain embodiments, a storage policy generally comprises a data structure or other information source that defines (or includes information sufficient to determine) a set of preferences or other criteria for performing information management operations. Storage policies can include one or more of the following items: (1) what data will be associated with the storage policy; (2) a destination to which the data will be stored; (3) datapath information specifying how the data will be communicated to the destination; (4) the type of storage operation to be performed; and (5) retention information specifying how long the data will be retained at the destination.

As an illustrative example, data associated with a storage policy can be logically organized into groups. In some cases, these logical groupings can be referred to as "sub-clients". A sub-client may represent static or dynamic associations of portions of a data volume. Sub-clients may represent mutually exclusive portions. Thus, in certain embodiments, a portion of data may be given a label and the association is stored as a static entity in an index, database or other storage location.

Sub-clients may also be used as an effective administrative scheme of organizing data according to data type, department within the enterprise, storage preferences, or the like. Depending on the configuration, sub-clients can correspond to files, folders, virtual machines, databases, etc. In one exemplary scenario, an administrator may find it preferable to separate e-mail data from financial data using two different sub-clients.

A storage policy can define where data is stored by specifying a target or destination storage device (or group of storage devices). For instance, where the secondary storage device 108 includes a group of disk libraries, the storage policy may specify a particular disk library for storing the sub-clients associated with the policy. As another example, where the secondary storage devices 108 include one or more tape libraries, the storage policy may specify a particular tape library for storing the sub-clients associated with the storage policy, and may also specify a drive pool and a tape pool defining a group of tape drives and a group of tapes, respectively, for use in storing the sub-client data. While information in the storage policy can be statically assigned in some cases, some or all of the information in the storage policy can also be dynamically determined based on criteria, which can be set forth in the storage policy. For instance, based on such criteria, a particular destination storage device(s) (or other parameter of the storage policy) may be determined based on characteristics associated with the data involved in a particular storage operation, device availability (e.g., availability of a secondary storage device 108 or a media agent 144), network status and conditions (e.g., identified bottlenecks), user credentials, and the like)

Datapath information can also be included in the storage policy. For instance, the storage policy may specify network pathways and components to utilize when moving the data to the destination storage device(s). In some embodiments, the storage policy specifies one or more media agents 144 for conveying data (e.g., one or more sub-clients) associated with the storage policy between the source (e.g., one or more host client computing devices 102) and destination (e.g., a particular target secondary storage device 108).

A storage policy can also specify the type(s) of operations associated with the storage policy, such as a backup, archive, snapshot, auxiliary copy, or the like. Retention information can specify how long the data will be kept, depending on organizational needs (e.g., a number of days, months, years, etc.)

The information management policies 148 may also include one or more scheduling policies specifying when and how often to perform operations. Scheduling information may specify with what frequency (e.g., hourly, weekly, daily, event-based, etc.) or under what triggering conditions secondary copy or other information management operations will take place. Scheduling policies in some cases are associated with particular components, such as particular logical groupings of data associated with a storage policy (e.g., a sub-client), client computing device 102, and the like. In one configuration, a separate scheduling policy is maintained for particular logical groupings of data on a client computing device 102. The scheduling policy specifies that those logical groupings are to be moved to secondary storage devices 108 every hour according to storage policies associated with the respective sub-clients.

When adding a new client computing device 102, administrators can manually configure information management policies 148 and/or other settings, e.g., via the user interface 158. However, this can be an involved process resulting in delays, and it may be desirable to begin data protecting operations quickly.

Thus, in some embodiments, the information management system 100 automatically applies a default configuration to client computing device 102. As one example, when one or more data agent(s) 142 are installed on one or more client computing devices 102, the installation script may register the client computing device 102 with the storage manager 140, which in turn applies the default configuration to the new client computing device 102. In this manner, data protection operations can begin substantially immediately. The default configuration can include a default storage policy, for example, and can specify any appropriate information sufficient to begin data protection operations. This can include a type of data protection operation, scheduling information, a target secondary storage device 108, data path information (e.g., a particular media agent 144), and the like.

Other types of information management policies 148 are possible. For instance, the information management policies 148 can also include one or more audit or security policies. An audit policy is a set of preferences, rules and/or criteria that protect sensitive data in the information management system 100. For example, an audit policy may define "sensitive objects" as files or objects that contain particular keywords (e.g. "confidential," or "privileged") and/or are associated with particular keywords (e.g., in metadata) or particular flags (e.g., in metadata identifying a document or email as personal, confidential, etc.).

An audit policy may further specify rules for handling sensitive objects. As an example, an audit policy may require that a reviewer approve the transfer of any sensitive objects to a cloud storage site, and that if approval is denied for a particular sensitive object, the sensitive object should be transferred to a local storage device 104 instead. To facilitate this approval, the audit policy may further specify how a secondary storage computing device 106 or other system component should notify a reviewer that a sensitive object is slated for transfer.

In some implementations, the information management policies 148 may include one or more provisioning policies. A provisioning policy can include a set of preferences, priorities, rules, and/or criteria that specify how clients 102 (or groups thereof) may utilize system resources, such as available storage on cloud storage and/or network bandwidth. A provisioning policy specifies, for example, data quotas for particular client computing devices 102 (e.g. a number of gigabytes that can be stored monthly, quarterly or annually). The storage manager 140 or other components may enforce the provisioning policy. For instance, the media agents 144 may enforce the policy when transferring data to secondary storage devices 108. If a client computing device 102 exceeds a quota, a budget for the client computing device 102 (or associated department) is adjusted accordingly or an alert may trigger.

While the above types of information management policies 148 have been described as separate policies, one or more of these can be generally combined into a single information management policy 148. For instance, a storage policy may also include or otherwise be associated with one or more scheduling, audit, or provisioning policies. Moreover, while storage policies are typically associated with moving and storing data, other policies may be associated with other types of information management operations. The following is a non-exhaustive list of items the information management policies 148 may specify:

- schedules or other timing information, e.g., specifying when and/or how often to perform information management operations;
- the type of copy 116 (e.g., type of secondary copy) and/or copy (e.g., type of secondary copy) format (e.g., snapshot, backup, archive, HSM, etc.);
- a location or a class or quality of storage for storing secondary copies 116 (e.g., one or more particular secondary storage devices 108);
- preferences regarding whether and how to encrypt, compress, deduplicate, or otherwise modify or transform secondary copies 116;
- which system components and/or network pathways (e.g., preferred media agents 144) should be used to perform secondary storage operations;
- resource allocation between different computing devices or other system components used in performing information management operations (e.g., bandwidth allocation, available storage capacity, etc.);

whether and how to synchronize or otherwise distribute files or other data objects across multiple computing devices or hosted services; and retention information specifying the length of time primary data 112 and/or secondary copies 116 should be retained, e.g., in a particular class or tier of storage devices, or within the information management system 100.

Policies can additionally specify or depend on a variety of historical or current criteria that may be used to determine which rules to apply to a particular data object, system component, or information management operation, such as:

frequency with which primary data 112 or a secondary copy 116 of a data object or metadata has been or is predicted to be used, accessed, or modified;

time-related factors (e.g., aging information such as time since the creation or modification of a data object);

deduplication information (e.g., hashes, data blocks, deduplication block size, deduplication efficiency or other metrics);

an estimated or historic usage or cost associated with different components (e.g., with secondary storage devices 108);

the identity of users, applications 110, client computing devices 102 and/or other computing devices that created, accessed, modified, or otherwise utilized primary data 112 or secondary copies 116;

a relative sensitivity (e.g., confidentiality) of a data object, e.g., as determined by its content and/or metadata;

the current or historical storage capacity of various storage devices;

the current or historical network capacity of network pathways connecting various components within the storage operation cell;

access control lists or other security information; and the content of a particular data object (e.g., its textual content) or of metadata associated with the data object.

Exemplary Storage Policy and Secondary Storage Operations

Figure 1E:
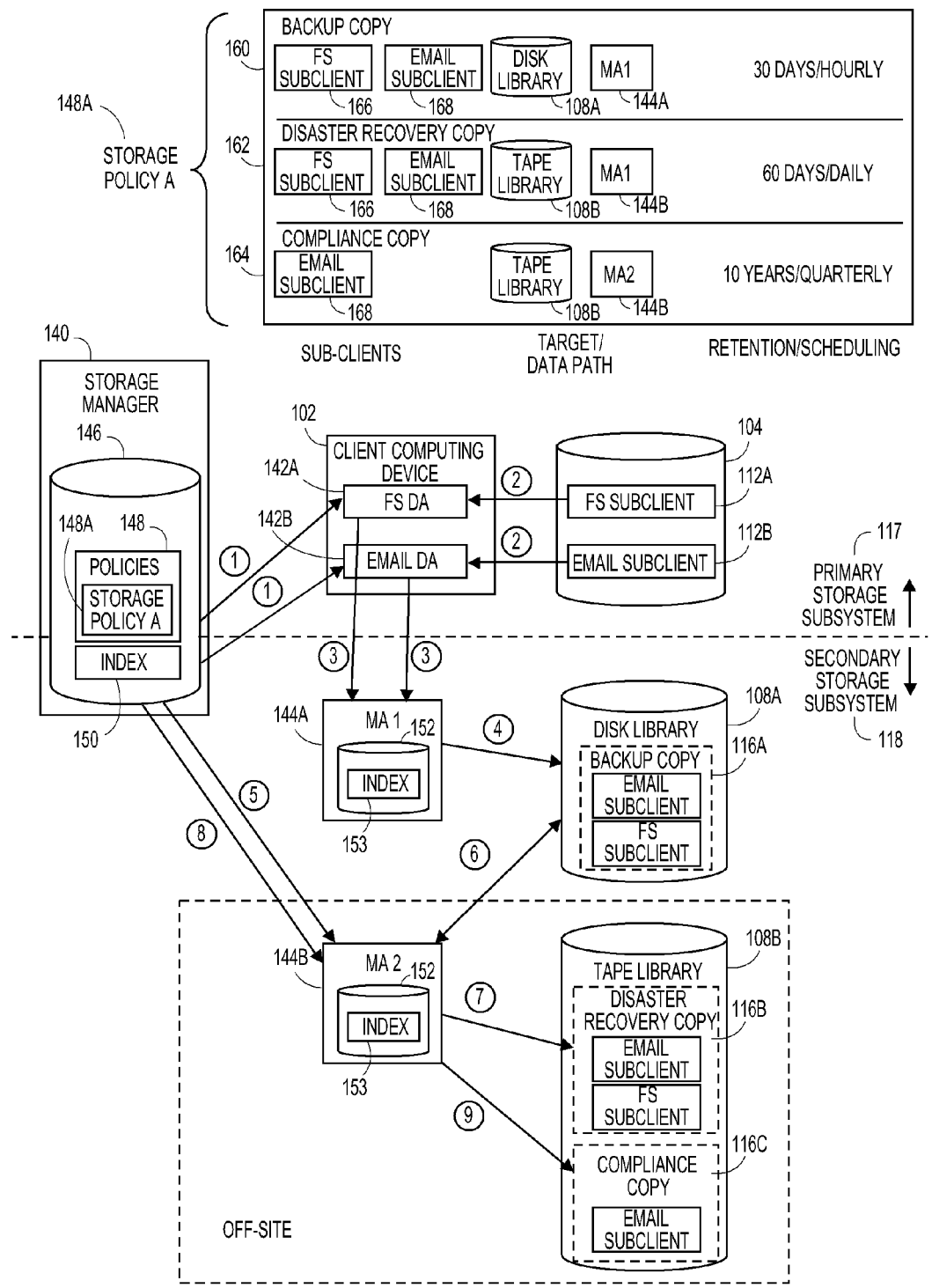
FIG. 1E illustrates certain secondary copy operations according to an exemplary storage policy.

FIG. 1E shows a data flow data diagram depicting performance of storage operations by an embodiment of an information management system 100, according to an exemplary data storage policy 148A. The information management system 100 includes a storage manger 140, a client computing device 102 having a file system data agent 142A and an email data agent 142B residing thereon, a primary storage device 104, two media agents 144A, 144B, and two secondary storage devices 108A, 108B: a disk library 108A and a tape library 108B. As shown, the primary storage device 104 includes primary data 112A, 112B associated with a logical grouping of data associated with a file system) and a logical grouping of data associated with email data, respectively. Although for simplicity the logical grouping of data associated with the file system is referred to as a file system sub-client, and the logical grouping of data associated with the email data is referred to as an email sub-client, the techniques described with respect to FIG. 1E can be utilized in conjunction with data that is organized in a variety of other manners.

As indicated by the dashed box, the second media agent 144B and the tape library 108B are "off-site", and may therefore be remotely located from the other components in the information management system 100 (e.g., in a different city, office building, etc.). In this manner, information stored on the tape library 108B may provide protection in the event of a disaster or other failure.

The file system sub-client and its associated primary data 112A in certain embodiments generally comprise information generated by the file system and/or operating system of the client computing device 102, and can include, for example, file system data (e.g., regular files, file tables, mount points, etc.), operating system data (e.g., registries, event logs, etc.), and the like. The e-mail sub-client, on the other hand, and its associated primary data 112B, include data generated by an e-mail client application operating on the client computing device 102, and can include mailbox information, folder information, emails, attachments, associated database information, and the like. As described above, the sub-clients can be logical containers, and the data included in the corresponding primary data 112A, 112B may or may not be stored contiguously.

The exemplary storage policy 148A includes backup copy preferences or rule set 160, disaster recovery copy preferences rule set 162, and compliance copy preferences or rule set 164. The backup copy rule set 160 specifies that it is associated with a file system sub-client 166 and an email sub-client 168. Each of these sub-clients 166, 168 are associated with the particular client computing device 102. The backup copy rule set 160 further specifies that the backup operation will be written to the disk library 108A, and designates a particular media agent 144A to convey the data to the disk library 108A. Finally, the backup copy rule set 160 specifies that backup copies created according to the rule set 160 are scheduled to be generated on an hourly basis and to be retained for 30 days. In some other embodiments, scheduling information is not included in the storage policy 148A, and is instead specified by a separate scheduling policy.

The disaster recovery copy rule set 162 is associated with the same two sub-clients 166, 168. However, the disaster recovery copy rule set 162 is associated with the tape library 108B, unlike the backup copy rule set 160. Moreover, the disaster recovery copy rule set 162 specifies that a different media agent 144B than the media agent 144A associated with the backup copy rule set 160 will be used to convey the data to the tape library 108B. As indicated, disaster recovery copies created according to the rule set 162 will be retained for 60 days, and will be generated on a daily basis. Disaster recovery copies generated according to the disaster recovery copy rule set 162 can provide protection in the event of a disaster or other data-loss event that would affect the backup copy 116A maintained on the disk library 108A.

The compliance copy rule set 164 is only associated with the email sub-client 166, and not the file system sub-client 168. Compliance copies generated according to the compliance copy rule set 164 will therefore not include primary data 112A from the file system sub-client 166. For instance, the organization may be under an obligation to store maintain copies of email data for a particular period of time (e.g., 10 years) to comply with state or federal regulations, while similar regulations do not apply to the file system data. The compliance copy rule set 164 is associated with the same tape library 108B and media agent 144B as the disaster recovery copy rule set 162, although a different storage device or media agent could be used in other embodiments. Finally, the compliance copy rule set 164 specifies that copies generated under the compliance copy rule set 164 will be retained for 10 years, and will be generated on a quarterly basis.

At step 1, the storage manager 140 initiates a backup operation according to the backup copy rule set 160. For instance, a scheduling service running on the storage manager 140 accesses scheduling information from the backup copy rule set 160 or a separate scheduling policy associated with the client computing device 102, and initiates a backup copy operation on an hourly basis. Thus, at the scheduled time slot the storage manager 140 sends instructions to the client computing device 102 to begin the backup operation.

At step 2, the file system data agent 142A and the email data agent 142B residing on the client computing device 102 respond to the instructions received from the storage manager 140 by accessing and processing the primary data 112A, 112B involved in the copy operation from the primary storage device 104. Because the operation is a backup copy operation, the data agent(s) 142A, 142B may format the data into a backup format or otherwise process the data.

At step 3, the client computing device 102 communicates the retrieved, processed data to the first media agent 144A, as directed by the storage manager 140, according to the backup copy rule set 160. In some other embodiments, the information management system 100 may implement a load-balancing, availability-based, or other appropriate algorithm to select from the available set of media agents 144A, 144B. Regardless of the manner the media agent 144A is selected, the storage manager 140 may further keep a record in the storage manager database 140 of the association between the selected media agent 144A and the client computing device 102 and/or between the selected media agent 144A and the backup copy 116A.

The target media agent 144A receives the data from the client computing device 102, and at step 4 conveys the data to the disk library 108A to create the backup copy 116A, again at the direction of the storage manager 140 and according to the backup copy rule set 160. The secondary storage device 108A can be selected in other ways. For instance, the media agent 144A may have a dedicated association with a particular secondary storage device(s), or the storage manager 140 or media agent 144A may select from a plurality of secondary storage devices, e.g., according to availability, using one of the techniques described in U.S. Pat. No. 7,246,207, which is incorporated by reference herein.

The media agent 144A can also update its index 153 to include data and/or metadata related to the backup copy 116A, such as information indicating where the backup copy 116A resides on the disk library 108A, data and metadata for cache retrieval, etc. After the 30 day retention period expires, the storage manager 140 instructs the media agent 144A to delete the backup copy 116A from the disk library 108A. The storage manager 140 may similarly update its index 150 to include information relating to the storage operation, such as information relating to the type of storage operation, a physical location associated with one or more copies created by the storage operation, the time the storage operation was performed, status information relating to the storage operation, the components involved in the storage operation, and the like. In some cases, the storage manager 140 may update its index 150 to include some or all of the information stored in the index 153 of the media agent 144A.

At step 5, the storage manager 140 initiates the creation of a disaster recovery copy 116B according to the disaster recovery copy rule set 162. For instance, at step 6, based on instructions received from the storage manager 140 at step 5, the specified media agent 144B retrieves the most recent backup copy 116A from the disk library 108A.

At step 7, again at the direction of the storage manager 140 and as specified in the disaster recovery copy rule set 162, the media agent 144B uses the retrieved data to create a disaster recovery copy 116B on the tape library 108B. In some cases, the disaster recovery copy 116B is a direct, mirror copy of the backup copy 116A, and remains in the backup format. In other embodiments, the disaster recovery copy 116C may be generated in some other manner, such as by using the primary data 112A, 112B from the storage device 104 as source data. The disaster recovery copy operation is initiated once a day and the disaster recovery copies 116A are deleted after 60 days.

At step 8, the storage manager 140 initiates the creation of a compliance copy 116C, according to the compliance copy rule set 164. For instance, the storage manager 140 instructs the media agent 144B to create the compliance copy 116C on the tape library 108B at step 9, as specified in the compliance copy rule set 164. In the example, the compliance copy 116C is generated using the disaster recovery copy 116B. In other embodiments, the compliance copy 116C is instead generated using either the primary data 112B corresponding to the email sub-client or using the backup copy 116A from the disk library 108A as source data. As specified, in the illustrated example, compliance copies 116C are created quarterly, and are deleted after ten years.

While not shown in FIG. 1E, at some later point in time, a restore operation can be initiated involving one or more of the secondary copies 116A, 116B, 116C. As one example, a user may manually initiate a restore of the backup copy 116A by interacting with the user interface 158 of the storage manager 140. The storage manager 140 then accesses data in its index 150 (and/or the respective storage policy 148A) associated with the selected backup copy 116A to identify the appropriate media agent 144A and/or secondary storage device 116A.

In other cases, a media agent may be selected for use in the restore operation based on a load balancing algorithm, an availability based algorithm, or other criteria. The selected media agent 144A retrieves the data from the disk library 108A. For instance, the media agent 144A may access its index 153 to identify a location of the backup copy 116A on the disk library 108A, or may access location information residing on the disk 108A itself.

When the backup copy 116A was recently created or accessed, the media agent 144A accesses a cached version of the backup copy 116A residing in the media agent index 153, without having to access the disk library 108A for some or all of the data. Once it has retrieved the backup copy 116A, the media agent 144A communicates the data to the source client computing device 102. Upon receipt, the file system data agent 142A and the email data agent 142B may unpackage (e.g., restore from a backup format to the native application format) the data in the backup copy 116A and restore the unpackaged data to the primary storage device 104.

Exemplary Secondary Copy Formatting

The formatting and structure of secondary copies 116 can vary, depending on the embodiment. In some cases, secondary copies 116 are formatted as a series of logical data units or "chunks" (e.g., 512 MB, 1 GB, 2 GB, 4 GB, or 8 GB chunks). This can facilitate efficient communication and writing to secondary storage devices 108, e.g., according to resource availability. For example, a single secondary copy 116 may be written on a chunk-by-chunk basis to a single secondary storage device 108 or across multiple secondary storage devices 108. In some cases, users can select different chunk sizes, e.g., to improve throughput to tape storage devices.

Generally, each chunk can include a header and a payload. The payload can include files (or other data units) or subsets thereof included in the chunk, whereas the chunk header generally includes metadata relating to the chunk, some or all of which may be derived from the payload. For example, during a secondary copy operation, the media agent 144, storage manager 140, or other component may divide the associated files into chunks and generate headers for each chunk by processing the constituent files.

The headers can include a variety of information such as file identifier(s), volume(s), offset(s), or other information associated with the payload data items, a chunk sequence number, etc. Importantly, in addition to being stored with the secondary copy 116 on the secondary storage device 108, the chunk headers can also be stored to the index 153 of the associated media agent(s) 144 and/or the storage manager index 150. This is useful in some cases for providing faster processing of secondary copies 116 during restores or other operations. In some cases, once a chunk is successfully transferred to a secondary storage device 108, the secondary storage device 108 returns an indication of receipt, e.g., to the media agent 144 and/or storage manager 140, which may update their respective indexes 150, 153 accordingly. During restore, chunks may be processed (e.g., by the media agent 144) according to the information in the chunk header to reassemble the files.

Data can also be communicated within the information management system 100 in data channels that connect the client computing devices 102 to the secondary storage devices 108. These data channels can be referred to as "data streams", and multiple data streams can be employed to parallelize an information management operation, improving data transfer rate, among providing other advantages. Example data formatting techniques including techniques involving data streaming, chunking, and the use of other data structures in creating copies (e.g., secondary copies) are described in U.S. Pat. Nos. 7,315,923 and 8,156,086, and U.S. Pat. Pub. No. 2010-0299490, each of which is incorporated by reference herein.

FIGS. 1F and 1G are diagrams of example data streams 170 and 171, respectively, that may be employed for performing data storage operations. Referring to FIG. 1F, the data agent 142 forms the data stream 170 from the data associated with a client 102 (e.g., primary data 112). The data stream 170 is composed of multiple pairs of stream header 172 and stream payload 174. The data streams 170 and 171 shown in the illustrated example are for a single-instanced storage operation, and a stream payload 174 therefore includes both single-instance ("SI") data and/or non-SI data. A stream header 172 includes metadata about the stream payload 174. This metadata may include, for example, a length of the stream payload 174, an indication of whether the stream payload 174 is encrypted, an indication of whether the stream payload 174 is compressed, an archive file identifier (ID), an indication of whether the stream payload 174 is single instanceable, and an indication of whether the stream payload 174 is a start of a block of data.

Referring to FIG. 1G, the data stream 171 has the stream header 172 and stream payload 174 aligned into multiple data blocks. In this example, the data blocks are of size 64 Kb. The first two stream header 172 and stream payload 174 pairs comprise a first data block of size 64 Kb. The first stream header 172 indicates that the length of the succeeding stream payload 174 is 63 Kb and that it is the start of a data block. The next stream header 172 indicates that the succeeding stream payload 174 has a length of 1 Kb and that it is not the start of a new data block. Immediately following stream payload 174 are an identifier header 176 and identifier data 178 pair. The identifier header 176 includes an indication that the succeeding identifier data 178 includes the identifier for the immediately previous data block. The identifier data 178 includes the identifier that the data agent 142 generated for the data block. The data stream 171 also includes other stream header 172 and stream payload 174 pairs, which may be for SI data and/or for non-SI data.

Figure 1H:
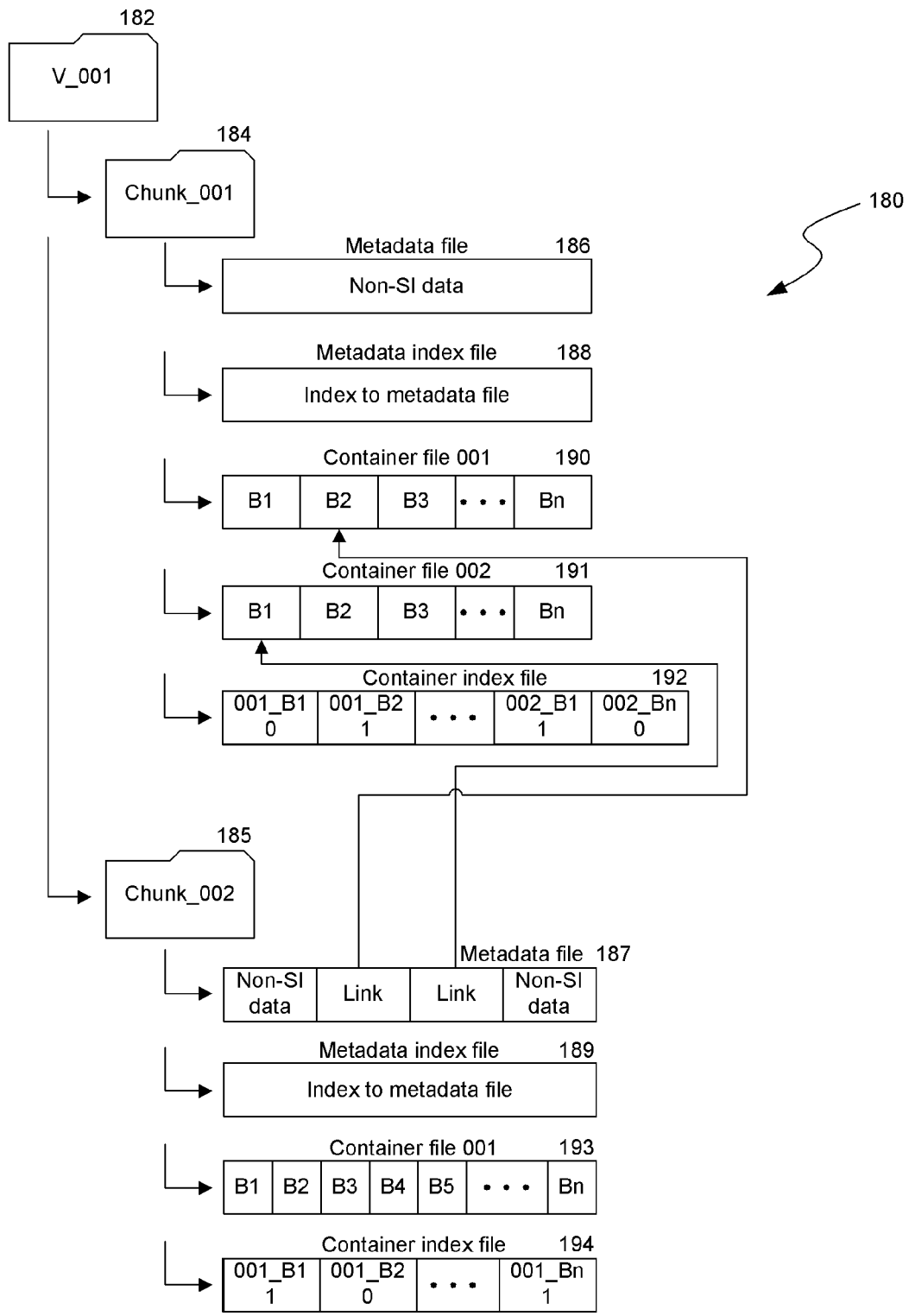

FIG. 1H is a diagram illustrating the data structures 180 that may be used to store blocks of SI data and non-SI data on the storage device (e.g., secondary storage device 108). According to certain embodiments, the data structures 180 do not form part of a native file system of the storage device. The data structures 180 include one or more volume folders 182, one or more chunk folders 184/185 within a volume folder 182, and multiple files within a chunk folder 184. Each chunk folder 184/185 includes a metadata file 186/187, a metadata index file 188/189, one or more container files 190/191/193, and a container index file 192/194. The metadata file 186/187 stores non-SI data blocks as well as links to SI data blocks stored in container files. The metadata index file 188/189 stores an index to the data in the metadata file 186/187. The container files 190/191/193 store SI data blocks. The container index file 192/194 stores an index to the container files 190/191/193. Among other things, the container index file 192/194 stores an indication of whether a corresponding block in a container file 190/191/193 is referred to by a link in a metadata file 186/187. For example, data block B2 in the container file 190 is referred to by a link in the metadata file 187 in the chunk folder 185. Accordingly, the corresponding index entry in the container index file 192 indicates that the data block B2 in the container file 190 is referred to. As another example, data block B1 in the container file 191 is referred to by a link in the metadata file 187, and so the corresponding index entry in the container index file 192 indicates that this data block is referred to.

Figure 7:
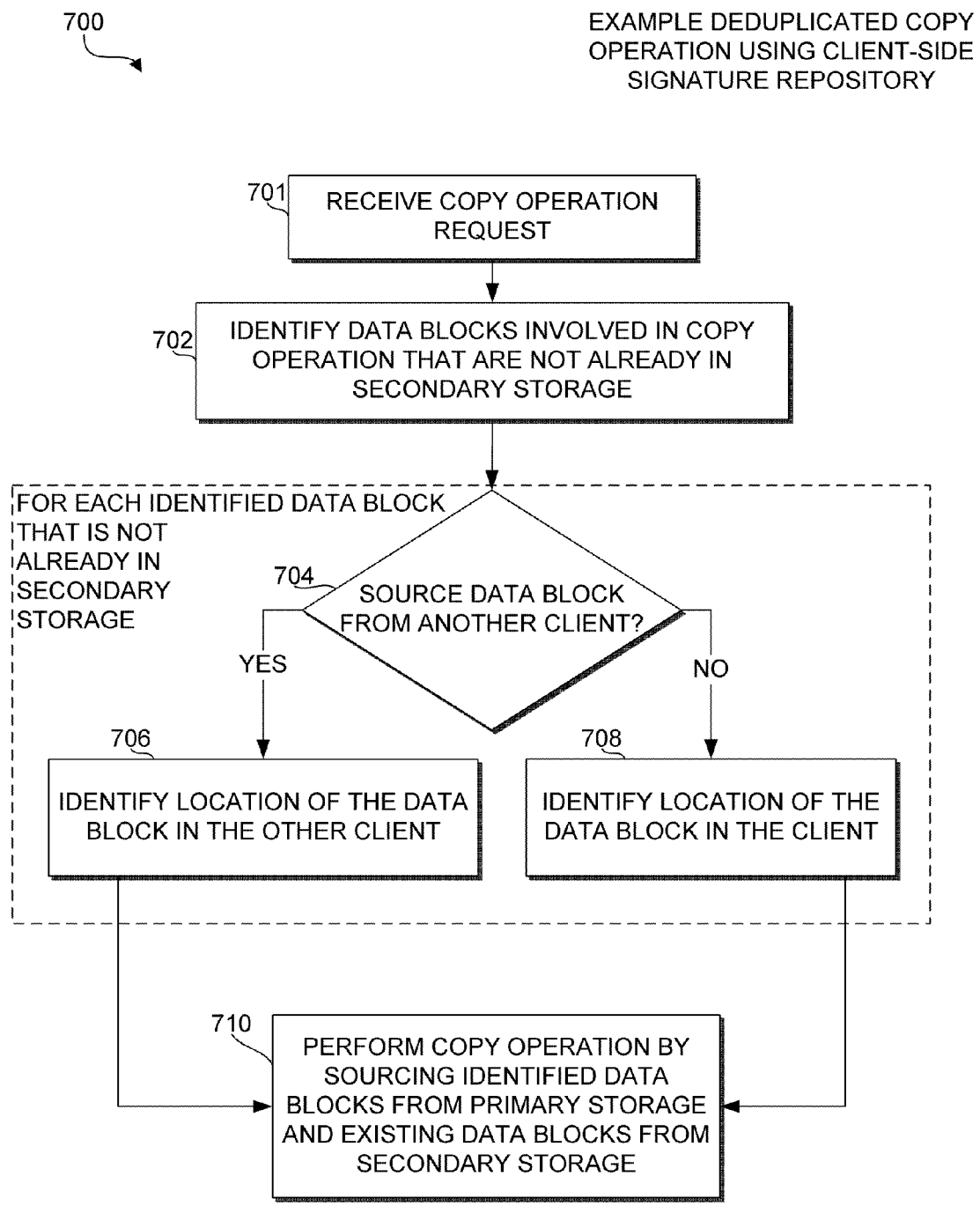
FIG. 7 is a flow diagram illustrative of one embodiment of a routine implemented by a storage system for executing a deduplicated collaborative copy operation using a client-side repository.

As an example, the data structures 180 illustrated in FIG. 7 may have been created as a result of two storage operations involving two clients 102. For example, a first storage operation on a first client 102 could result in the creation of the first chunk folder 184, and a second storage operation on a second client 102 could result in the creation of the second chunk folder 185. The container files 190/191 in the first chunk folder 184 would contain the blocks of SI data of the first client 102. If the two clients 102 have substantially similar data, the second storage operation on the data of the second client 102 would result in the media agent 144 storing primarily links to the data blocks of the first client 102 that are already stored in the container files 190/191. Accordingly, while a first storage operation may result in storing nearly all of the data subject to the storage operation, subsequent storage operations involving similar data may result in substantial data storage space savings, because links to already stored data blocks can be stored instead of additional instances of data blocks.

If the operating system of the secondary storage computing device 106 on which the media agent 144 resides supports sparse files, then when the media agent 144 creates container files 190/191/193, it can create them as sparse files. As previously described, a sparse file is type of file that may include empty space (e.g., a sparse file may have real data within it, such as at the beginning of the file and/or at the end of the file, but may also have empty space in it that is not storing actual data, such as a contiguous range of bytes all having a value of zero). Having the container files 190/191/193 be sparse files allows the media agent 144 to free up space in the container files 190/191/193 when blocks of data in the container files 190/191/193 no longer need to be stored on the storage devices. In some examples, the media agent 144 creates a new container file 190/191/193 when a container file 190/191/193 either includes 100 blocks of data or when the size of the container file 190 exceeds 50 Mb. In other examples, the media agent 144 creates a new container file 190/191/193 when a container file 190/191/193 satisfies other criteria (e.g., it contains from approximately 100 to approximately 1000 blocks or when its size exceeds approximately 50 Mb to 1 Gb).

In some cases, a file on which a storage operation is performed may comprise a large number of data blocks. For example, a 100 Mb file may be comprised in 400 data blocks of size 256 Kb. If such a file is to be stored, its data blocks may span more than one container file, or even more than one chunk folder. As another example, a database file of 20 Gb may comprise over 40,000 data blocks of size 512 Kb. If such a database file is to be stored, its data blocks will likely span multiple container files, multiple chunk folders, and potentially multiple volume folders. As described in detail herein, restoring such files may thus requiring accessing multiple container files, chunk folders, and/or volume folders to obtain the requisite data blocks.

Example Storage Systems Including Client-Side Repositories

Examples of systems and methods will now be described for using client-side signature to improve data storage operations. While described in some cases with respect to certain types of operations (e.g., backup and restore operations) for the purposes of illustration, the deduplication and collaborative data movement techniques described herein may be equally compatible with other types of storage operations including archive, snapshot, and replication operations, to name a few. Descriptions of embodiments of these and other types storage operations compatible with embodiments described are provided above.

Figure 1I:
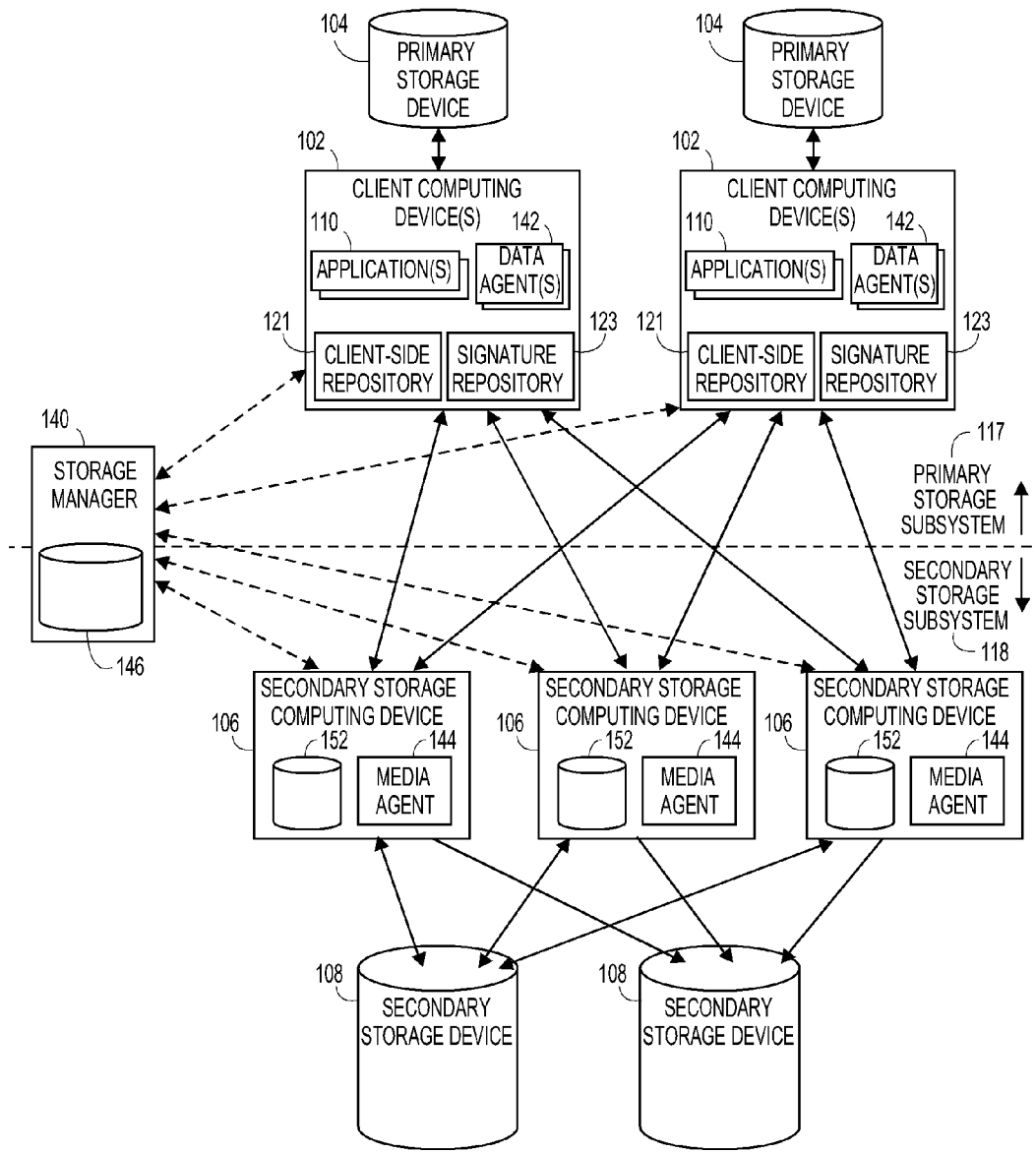
FIGS. 1I and 1J are block diagrams that illustrate components of example storage systems configured to implement data management techniques involving data block signature information and which are compatible with embodiments described herein.

FIG. 1I shows a block diagram illustrative of an embodiment of a networked storage system 100. In the illustrated embodiment of FIG. 1I, the storage system 100 can further include one or more client-side signature repositories 121 and one or more signature generators 123.

The client-side signature repository 121 can include a data store containing data block signatures corresponding to data blocks that form the primary data residing in the primary storage subsystem 117, as well as a processing module or agent, which generally maintains the data store, and can perform functions associated therewith (e.g., signature comparison). As shown in the illustrated embodiment of FIG. 1I, the client-side signature repository 121 can form part of or reside on the client 102. For instance, the data store of the client-side signature repository 121 forms part of the primary storage device 104 of the client 102, and the agent of the client-side signature repository 121 executes on one or more processors of the client 102.

As will be described further with respect to FIG. 1J, in certain other embodiments, the client-side signature repository 121 can be separate from the client(s) 102. For instance, data store of the client-side signature repository 121 is implemented using one or more data stores that are separate from the primary storage devices 104 of the clients 102. Similarly, in other embodiments, the agent of the client-side signature repository 121 can be implemented on a computing device that is separate from the client 102. In such cases, the computing device on which the processing module of the client-side repository 121 and/or the storage device on which the data store of the client-side repository 121 are implemented on can communicate with the client(s) 102 via a network (e.g., a LAN). In some embodiments, each client 102 communicates with a client-side signature repository 121 that is dedicated to that particular client 102. In certain other embodiments, multiple clients 102 (e.g., some or all of the clients) communicate with a common, shared client-side signature repository 121. In yet further embodiments, each client includes a client-side signature repository 121 to track the signatures stored thereon, and the system 100 also includes a client-side signature repository 121 that is common to multiple clients 102 (e.g., some or all of the clients).

The signature generator 123 may be a software module that is generally responsible for generating signatures of the data blocks residing in the primary storage subsystem 117, e.g., primary storage devices 104 associated with the clients 102. The signatures generated by the signature generator 123 can be used to uniquely identify the data blocks within the client 102 or determine when two or more data blocks are identical. The signatures can be generated using a variety of techniques, such as a hash function, as will be described in greater detail below with reference to FIG. 2A.

Figure 1J:
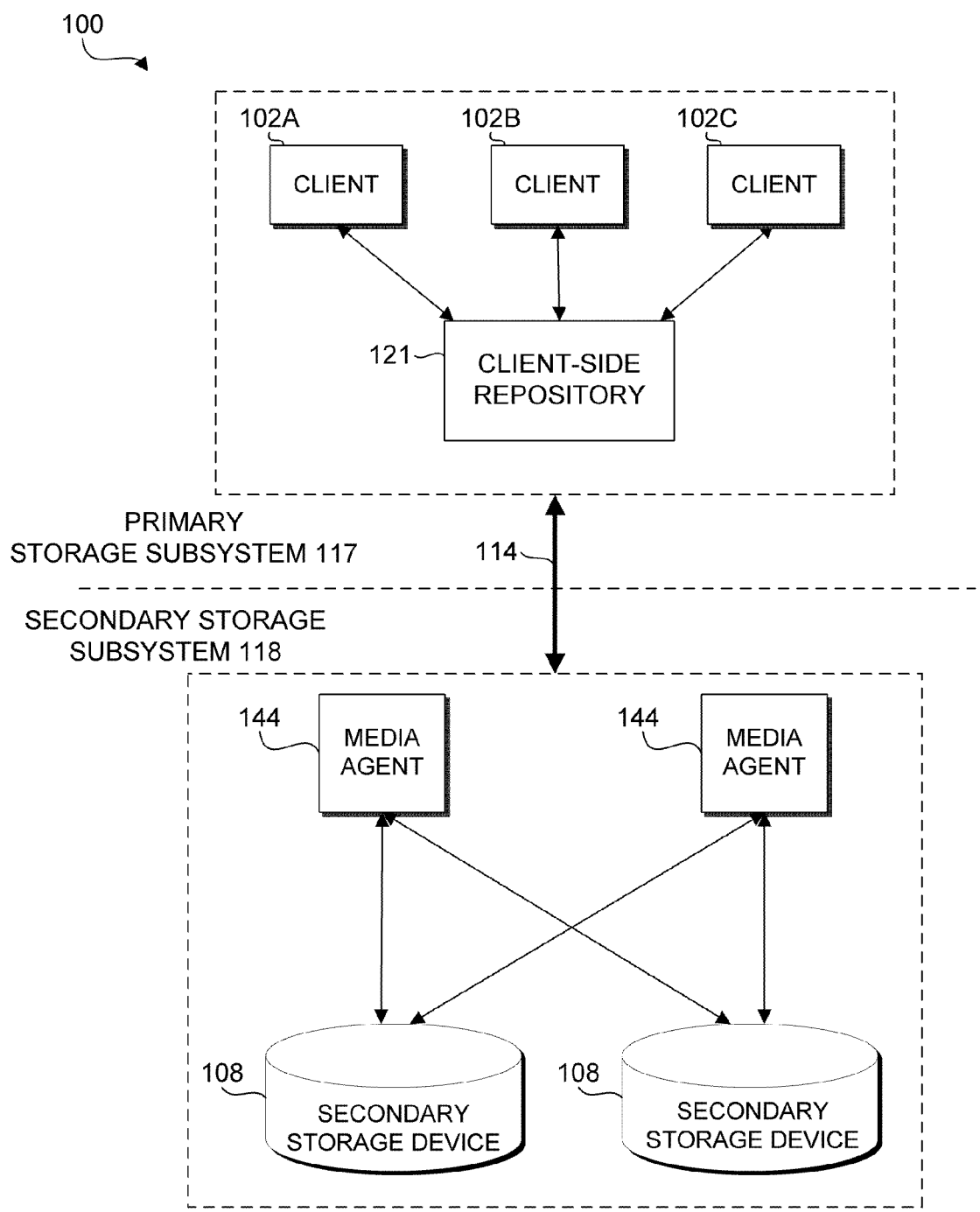

FIG. 1J illustrates a block diagram of another embodiment of a storage system 100. Unlike the embodiment depicted in FIG. 1I, the embodiment shown in FIG. 1J includes a client-side signature repository 121 that is common to multiple clients 102A-102C. For instance, the client-side signature repository 121 may be implemented on a computing device and/or storage device distinct from the one or more clients 102A-102C. For the sake of simplicity, not all of the components and subcomponents of the system 100 are illustrated in FIG. 1J. For example, while not shown, the system 100 of FIG. 1J may include a storage manager 140, data agent(s) 142, secondary storage computing device(s) 106, or other components shown in FIGS. 1A-1I.

In some embodiments, the client-side signature repository 121 is in relatively close physical proximity to the clients 102 as compared to the secondary storage subsystem 118, and communicates with the clients 102 using a different network topology than the topology used for communication between the components in the primary storage subsystem 117 and the components in the secondary storage subsystem 118. For example, in an embodiment, the clients 102 communicate with the client-side signature repository 121 over a LAN and communicate with components in the secondary storage subsystem 118 (e.g., the media agents 144 and/or the secondary storage devices 108) over a WAN. In certain embodiments, communication between the clients 102 and the client-side signature repository 121 takes place at a higher data rate and/or with lower latency than communication between the clients 102 and the components in the secondary storage subsystem.

Referring again to FIG. 1I, the client-side signature repository 121 can be used by the system to store signature information relating to data blocks or primary data units of other granularity stored in the primary storage subsystem 117. Furthermore, depending on the embodiment, the client-side signature repository 121 can store the corresponding signatures of all, or substantially all of the data blocks found in the primary storage subsystem 117. For instance, where a client-side signature repository 121 is dedicated to a particular client 102, the client-side signature repository 121 retains signatures corresponding to all or substantially all (e.g., at least 90 percent, at least 95 percent, or at least 99 percent) of the data blocks in the primary storage device 104 associated with that client 102. Where the client-side signature repository 121 is shared, the client-side signature repository 121 retains signatures corresponding to all or substantially all of the data blocks in the data stores of all the clients 102 that share the client-side signature repository 121. Accordingly, the client-side signature repository 121 can function as an index or global map of the data blocks that form the primary data. In other cases, the client-side signature repository 121 operates as a cache, and signatures are deleted from the client-side signature repository 121 on a first-in first-out or other some other basis.

The system 100 can generate or update the signature information in the client-side signature repository 121 according to any appropriate schedule. As one example, the system 100 can generate or update the client-side signature repository 121 each time primary data is written or modified in a primary storage device 104 associated with a client 102. For example, when data is written to or modified in a primary storage device 104, the system 100 can generate a signature for the constituent data blocks.

In some embodiments, the client-side signature repository 121 stores a single record for each unique signature. Incoming generated signatures are compared with signatures already stored in the client-side signature repository 121. If a signature is already located in the client-side signature repository 121, the record for that signature is updated with the information corresponding to the newly written or modified data block. If the signature is not already located in the client-side signature repository 121, a new record is generated for that data block. Techniques for organizing the client-side signature repository 121 are described in further detail with respect to FIGS. 2A-2B.

In some embodiments, the storage system 100 uses the client-side signature repository 121 to minimize or otherwise reduce the amount of data that is transmitted to secondary storage during backup or other secondary copy operations. Some examples of secondary copy operations that utilize client-side signature information are described herein, e.g., with respect to FIGS. 3-7.

Additionally, in some embodiments, the system 100 improves the efficiency of restore operations to a target client 102 by using the client-side signature repository to determine which data blocks in a restore data set are already located in primary storage. Further examples of restore operations that utilize client-side signature information are described herein, e.g., with respect to FIGS. 8-11.

Example Signature Repository

Figures 2A, 2B:
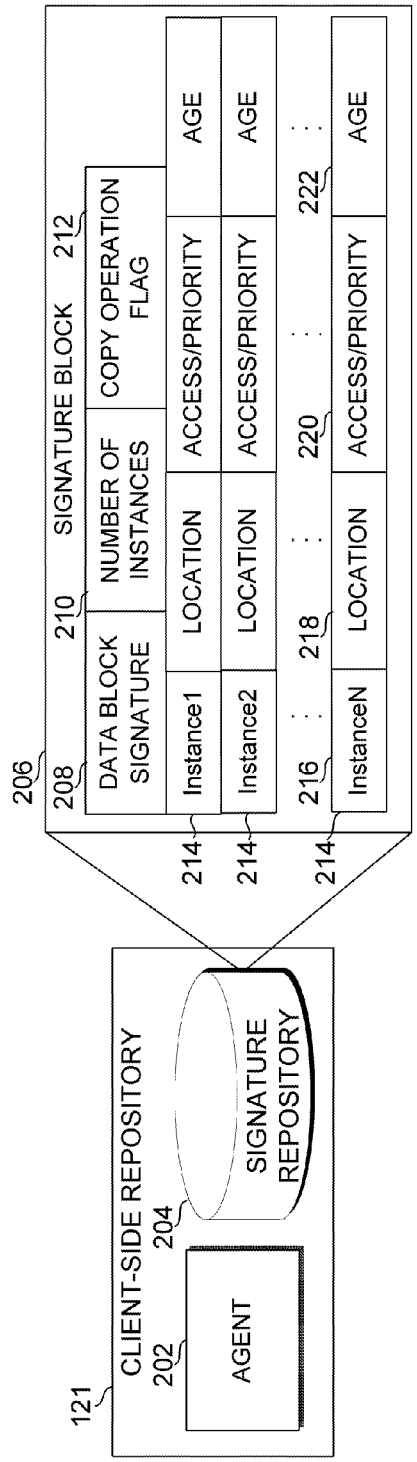
FIG. 2A is a block diagram illustrative of an expanded view of an exemplary client-side repository.
FIG. 2B is a block diagram illustrative of an expanded view of an exemplary signature block stored within the client-side repository.

FIG. 2A is a block diagram illustrative of an expanded view of a client-side signature repository 121 including an agent 202 and a data store 204. Generally speaking, the agent 202 may be implemented as a software module that communicates with the other components of the storage system 100 (e.g., the primary storage devices 104, the storage manager 140, the clients 102, the media agents 144, and/or secondary storage devices 108, and conveys data to and from the signature repository 204. Furthermore, the client-side signature repository agent 202 can perform the various processing steps described herein that are attributed to the client-side signature repository 121. For example, the client-side signature repository agent 202 generally maintains the signatures and corresponding information in the data store 204, and can also access and process the signature information in the data store 204 to determine data blocks do and do not reside in the primary storage devices 104.

The data store 204 can be stored on one or more storage devices of any of the types described herein (e.g., solid state memory, disk drives or other magnetic media, or the like).

While the signature information in the data store 204 can be organized in a variety of ways, in certain embodiments, the signature information is arranged as a plurality of signature blocks 206 as shown in FIG. 2A. Each signature block 206 corresponds to a unique or substantially unique data block signature 208 and corresponding data block.

Each signature block 206 in some embodiments includes information relating to copies of the corresponding data blocks stored in a subset of one or more of the clients 102. In other embodiments, each signature blocks 206 includes information relating to all of the copies of the corresponding data block that are stored in the primary storage subsystem 117, e.g., across all of the primary storage devices 104.

Signature blocks 206 stored in the signature repository 204 can include various pieces of information, or metadata, corresponding to the copies of the corresponding data block that reside in the primary storage subsystem 117. For example, each signature block 206 can include a signature field 208 including the data block signature, a number of instances field 210 that identifies the number of instances or copies of the data block that exist on a particular client (group of multiple clients, or within the entire primary storage subsystem 117, depending on the embodiment), a copy operation flag 212, and entries 214 each corresponding to a different instance or copy of the data block. The entries 214 can further include a location information field 218, an access/priority information field 220, and an age information field 222. These various types of information and fields will be described below in greater detail.

Each signature block 206 can include additional or less information as desired. Moreover, in some other embodiments the client-side signature repository 121 can be organized differently. For instance, while the illustrated embodiment generally groups entries for the data block instances into a separate signature block 206 for each unique signature, other embodiments may instead organize the entries according to some other scheme. For instance, entries may be grouped based on the client 102 that stores the corresponding data block entries, based on the time the data block instance was added to the primary storage subsystem 117, or any other appropriate scheme. In some such cases, where there are multiple copies of a particular data block stored within the primary storage subsystem 117, the client-side signature repository 121 may maintain multiple copies of the corresponding unique signature—one for each copy of the corresponding data block.

Generally speaking, the data block signatures 208 are used as a reference to identify corresponding data blocks and/or determine whether the corresponding data blocks are already stored in the primary storage subsystem 117. The signature in the signature field 208 can be derived by performing a hash or other function on the corresponding data block. In some embodiments, the signature 208 is generated by the signature generator 123 of the client 102 (FIG. 1I). However, the signature can be generated by a variety of different components, depending on the implementation, such as the agent 202 of the client-side signature repository 121, the storage manager 140, the media agent 144, and/or a module executing on a primary storage device 104. In some embodiments, signatures 208 are derived each time data is written to or modified on a primary storage device 104. In other cases, signatures 208, are generated in association with a backup, restore, or other storage operation, or based on some other appropriate schedule. In an embodiment, the SHA-512 algorithm is used (e.g., on a 64 kB or 128 kB data block) to derive the signature 208. The resulting signature is 256 bytes, and can be used for deduplication purposes. Hash functions other than SHA-512 can be used on the data blocks to derive the signature, as well as other non-hash functions. In addition, different sized signatures may be used. Additionally, the secondary storage subsystem 118 can also include signature information in some embodiments. For instance, signatures for backed up, archived, or otherwise copied data blocks residing in the secondary storage devices 108 are maintained in the secondary storage subsystem 118 in certain embodiments.

FIG. 2B is a block diagram illustrative of an expanded view of an example of an entry 216 of a signature block 206 from FIG. 2A. In the illustrated example, each entry includes an instance ID field 216, a location information field 218, an access/priority information field 220, and an age information field 222.

The instance ID field 216 can include an identifier for a particular instance (i.e., copy) of the data block stored in the primary storage subsystem 117, e.g., in a primary storage device 104 associated with a particular client or subset of clients. In some embodiments, the instance ID field 216 includes sourcing order information.

The location information field 218 can include information specifying the location of the data block instance in the primary storage subsystem 117. For instance, where the signature block 206 includes information relating to a data block for which multiple separate instances are stored in the primary storage subsystem 117 in association with multiple clients 102, the location information can include a client ID indicating the client 102 where the instance of the data block is located. Thus, the client ID field can be useful where the system includes a shared client-side signature repository 121 that maintains signature information for multiple clients 102. In some cases, such as where each client 102 maintains its own client-side signature repository 121 and there is not a shared client-side signature repository 121, the client ID field may not be included. The location information can additionally include physical and/or logical memory address information usable to access the instance of the data block within the primary storage device 104 or other data store where the instance of the data block is stored.

In addition to providing location information, each entry can provide access and priority information in an access/priority field 220. The access/priority information can be used to rank or prioritize the different instances of the data block for sourcing purposes. For instance, where multiple copies of a particular data block are stored in the primary storage subsystem 117 (e.g., in data stores for multiple clients 102), the access/priority information can be used by the system 100 to determine which copy of the data block to access for a storage operation (e.g., a backup or restore operation) or other purpose. Such techniques are described in greater detail below with reference to FIG. 12. The access/priority field 220 can include information regarding characteristics of the data store and/or client where the copy of the data block is located. For example, the access/priority field 220 can include information regarding the following for the data store that stores the copy of the data block and/or the associated client 102, without limitation: type and age information, speed or performance information (e.g., hardware capability information), response time, type or version information for installed software or firmware, storage capacity, client operating system information, processing load (e.g., current or average processing load), etc. Some of these types of information can be used to determine a relative access speed for retrieving a copy of a particular instance of a data block.

The access/priority field 220 can also include information regarding the network associated with the data store. For example, the access/priority field 220 can include information regarding the network bandwidth and speed between the data store and various target clients within the storage network. The access/priority field 220 can also provide information regarding downtime or scheduled maintenance of the data store, etc. The data store information and network information can be used to determine an expected overall response time of a particular client.

The access/priority field 220 can also include a priority level ranking of the client 102 identified by the client ID. A higher priority level ranking can indicate that it is less desirable to source data from a particular client because of the relative importance of applications executing thereon, the user of the client, or other reasons. The information can also be used to generate the sourcing rank for each entry 214, as described in greater detail below with reference to FIG. 12. In some cases, information other than the information in the access/priority field 220 can be used in determining which instance of the data block to source, such as the information in the instance ID field 216.

Each entry 214 can also include age information in an age field 222. The age field 222 can be used to determine how long a particular instance of a data block has existed in the primary storage subsystem 117. For example, it may be generally preferable to use newer instances instead of older entries, or vice versa. The age field 222 in one embodiment includes an age ID which is an alphanumeric indication of when the entry 214 was added or revised relative to other data blocks. For instance, the age ID may be a unique identifier for the particular data block or instance of the data block, or may be a unique identifier associated with a particular storage operation, such as a backup, backup catalog, or other storage operation associated with the entry.

In some instances, the client-side signature repository 121 can determine that a particular entry 214 is a new entry if the age field 222 indicates that it was added to the client-side signature repository 121 after a previous backup operation. Further, if the particular entry 214 is the first entry for a signature block 206, the system 100, in certain embodiments, can determine that the data block and corresponding signature are new to the primary storage subsystem 117 and therefore do not yet reside in the secondary storage subsystem 118. If the system determines that the entry 214 resided in the client-side signature repository 121 prior to a previous secondary copy operation that involved the data block corresponding to the entry 214, the system, in some embodiments, can determine that the instance of the data block corresponding to the entry 214 has already been copied to the secondary storage subsystem 118 (e.g., has already been involved in a back up).

Because the clients 102 are frequently generating and modifying primary data stored in the primary storage devices 104, it can in some cases be beneficial to track whether a signature block 206 has been modified since a previous backup. This can be done using a copy operation flag 212. The copy operation flag 212 can indicate the time and/or date of a previous copy operation, whether the signature block 206 has been modified since a previous copy operation, whether the data block corresponding to the signature block has been part of a previous copy data set and stored in the secondary storage subsystem 118 (e.g., the signature block is not a new signature block), or any combination thereof. For example, during a copy operation, the system 100 can identify signature blocks that have been modified since a previous backup by referring to the copy operation flag 212. By identifying signature blocks that have been modified, the system 100 can identify data corresponding to the modified signature blocks that has changed and/or data that may be unique to the primary storage subsystem 117 (e.g., does not reside or is unlikely to reside in the secondary storage subsystem 118). Thus, in some embodiments, rather than reading the data in a copy data set to identify data that may be unique to the primary storage subsystem 117 and/or has changed, the system 100 can refer to the signature information in the client-side signature repository 121 corresponding to the data in the copy data set. In this manner, the system 100 can reduce the amount of data being read and time spent to identify modified data, and can more quickly identify which data might be unique to primary storage, e.g., for performing a deduplicated secondary copy.

Further, the copy operation flag 212 can indicate that the signature block 206 has been modified since a previous copy operation if the signature block 206 is either new or has been revised since the previous copy operation. For example after a copy operation is completed, the copy operation flag 212 can be reset. Thereafter, if the signature block 206 is edited, the copy operation flag 212 can be set, indicating that the signature block 206 may contain information that has not yet been involved in a copy operation. Furthermore, each time a new signature block is generated, the copy operation flag can 212 can be set indicating that the signature block and corresponding data block have not been involved in a copy operation.

The signature block 206 and/or corresponding entries 214 can contain fewer or more pieces of information than what is illustrated in the examples shown in FIGS. 2A and 2B. For example, the signature block 206 can include date data, such as the date when the signature block 206 was created or modified, etc. In some embodiments, the entries 214 include file identifiers that indicate to which file an entry 214 belongs. The file identifiers can be located in the location field 218, in another field, or in a separate field. Furthermore, the entries 214 can include organizational data that indicates where the data block corresponding to the entry 214 is located with respect to other data blocks in a particular file, etc.

Figure 3:
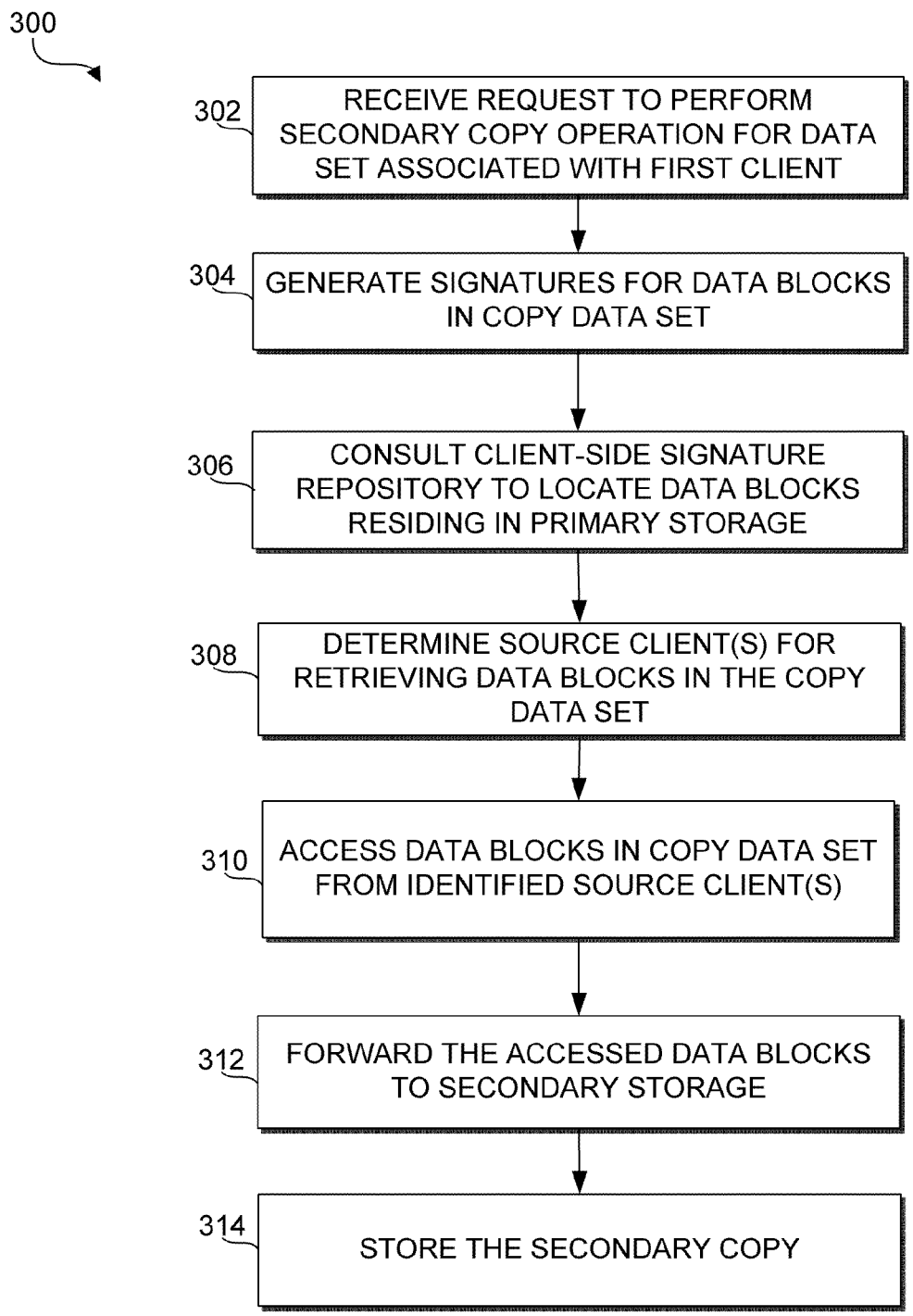
FIG. 3 is a flow diagram illustrative of one embodiment of a routine implemented by a storage system for performing a secondary copy operation using a client-side signature repository.

FIG. 3 is a flow diagram illustrative of one embodiment of a routine implemented by a storage system 100 for performing a secondary copy operation (e.g., a backup, archive, or snapshot operation) using a client-side signature repository 121.

At block 302, a request is received to perform a secondary copy operation for a data set associated with a first client computing device 102 of plurality of client computing devices 102. For instance, a storage policy implemented on a storage manager 140 may trigger a secondary copy operation on a scheduled basis, or a user can trigger a secondary copy operation via interaction with a user interface. In one embodiment, the storage manager 140 forwards an instruction to perform the secondary copy to a data agent 142 executing on the first client computing device 102. The copy data set can generally be any grouping of data associated with the first client 102, and can include one or more files, directories, or the like. In one embodiment, the client data set includes one or more sub-clients, as described herein.

At block 304, the storage system 100 generates signatures for the individual data blocks in the copy data set. Depending on the embodiment, the signatures can be generated by different entities in the storage system 100. For example, in one embodiment, a signature generator 123 on the first client 102 generates the signatures locally. As another example, signatures can be generated by the client-side signature repository 121, which can be separate from and/or remote from the client(s) 102.

At block 306, the agent 102 of the client-side signature repository 121 (or other appropriate component) consults the signature repository 204 to locate data blocks in the copy data set within the primary storage subsystem 117. For instance, while the first client 102 may store actual copies of all data blocks in the copy data set, it may be useful to source the data blocks from data stores associated with other ones of the clients 102 for the purposes of creating and transmitting the secondary copy, as described previously.

At block 308, the storage system 100 determines which client(s) to source the individual data blocks from to compile the copy data set. For example, the agent 102 may access information in the client-side signature repository 204 associated with copies of the individual data blocks that reside in the primary storage subsystem 117. Such information can include any type of information sufficient to select particular copies of the data block to source, and in some embodiments includes information organized along the lines of the signature blocks 206 of FIGS. 2A and 2B, such as the access/priority information 220 and/or age 222 information. Where there are multiple copies of a data block within the primary storage subsystem 117, the agent 202 may compare the accessed information to a sourcing policy or other criteria to determine which copy to source for inclusion in the copy data set. Additional techniques for determining which copy of the data block to source for the purposes of compiling a copy (or restore) data set are described herein, e.g., with respect to FIG. 12.

At block 310, the data blocks in the copy set are sourced from the clients 102 as determined at block 308. Depending on the sourcing determinations, a first subset of one or more data blocks may be sourced from the first client 102 and the remainder of the data blocks may be sourced from one or more second clients 102. Depending on the sourcing determination for any particular copy operation, a variety of scenarios are possible. For instance, in some cases, all data blocks may be sourced from the first client 102. Conversely, all of the data blocks may in other scenarios be sourced from one or more clients 102 other than the first client 102. In order to access the data blocks within the primary storage subsystem 117, the agent of 202 of the client-side signature repository 121 may refer to other information in the signature repository 121 in addition to the signature 208, such as the location information 218 of the signature block 206 described with respect to FIGS. 2A and 2B.

At block 312, the accessed data blocks are forwarded from the primary storage subsystem 117 to the secondary storage subsystem 118. For example, all of the sourced data blocks in the data set may be forwarded to the agent 102 of the client-side signature repository 121 or to some other central or shared location within the primary storage subsystem 117 for forwarding to a media agent 144. In some cases, a data agent or other entity receives the data blocks and compiles the data blocks into a packaged (e.g., formatted) copy data set before sending to the media agent 144. In other embodiments, each source client 102 forwards the datablocks it is responsible for directly to the secondary storage subsystem 118.

At block 314, the media agent 144 or other appropriate component within the secondary storage subsystem 118 creates the secondary copy by conveying the data to one or more secondary storage devices 108 for storage.

Figure 4:
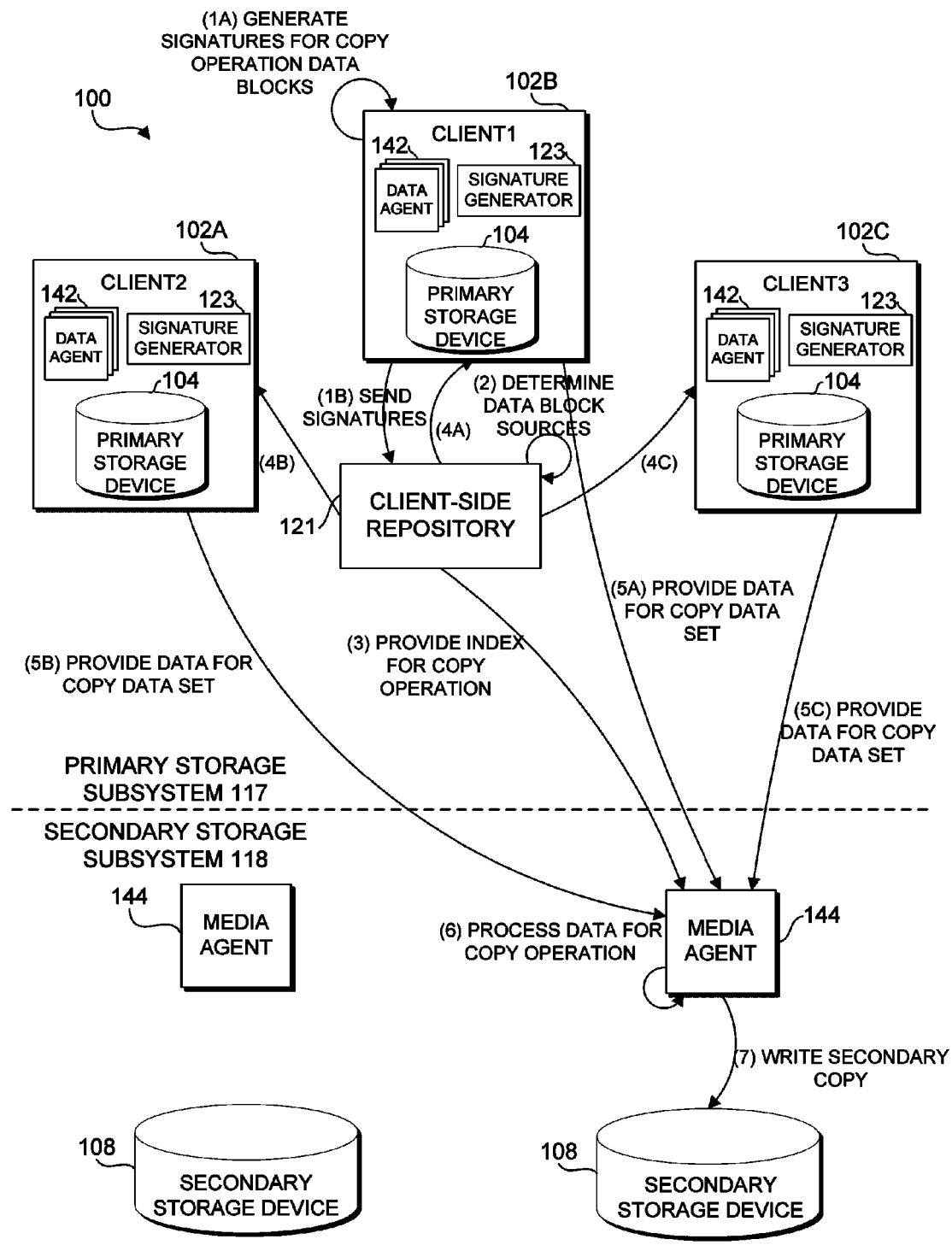
FIG. 4 is a state diagram illustrative of the interaction between the various components of an exemplary storage system with respect to an exemplary collaborative copy operation.

FIG. 4 is a state diagram illustrative of the interaction between the various components of the storage system 100 with respect to an exemplary collaborative copy operation where a copy data set associated with a target client 102B is sourced from multiple clients 102, including one or more clients 102A, 102C other than the target client 102B. For purposes of the example, the illustrated embodiment has been simplified to include interaction between the clients 102, one media agent 144, and one storage device 108. In other embodiments, any of the media agents 144 and any of the storage devices 108, alone or in combination, can be used for performing a collaborative copy operation from any combination of the clients 102.

A collaborative copy operation (or other storage operation) can be initiated in many different ways, such as at predetermined time intervals, upon client request, upon storage manager 140 request, etc. For example, a storage policy associated with the client 102B may dictate that a copy operation occur daily, weekly, monthly or at some other predetermined time interval. Alternatively, the copy operation can occur based on manual selection by a system administrator via user interface.

In the illustrated example, signatures are generally generated locally by the individual clients 102. Thus, as part of the current copy operation, the signature generator 123 of the subject client 102B generates signatures for data blocks in the copy data set (1A). The client forwards (1B) the generated signatures to the client-side signature repository 121. The agent (not shown) of the client-side signature repository 121 in some cases may update the information in the signature repository 204 as appropriate, e.g., to add entries 214 corresponding to the data blocks in the copy data set. In other cases, the entries 214 were added previously, such as at the time the data was originally written to the primary storage device 104 of the target client 102B.

Before the current copy operation, the client-side signature repository 121 already included entries corresponding to some or all of the data blocks previously stored in the primary storage devices 104 associated with the set of clients 102. Although in the illustrated embodiment the client-side signature repository 121 is shared by multiple clients, in some embodiments, each of the clients 102 is associated with its own client-side signature repository 121. Furthermore, in certain other embodiments, the client-side signature repository 121 generates the data block signatures instead of the client signature generators 123.

The client-side repository 121 processes (2) the received signatures in the copy data set to determine where to source the data blocks from in the primary storage subsystem 117 for the purposes of sending to the secondary storage subsystem 118, i.e., to carry out the copy operation. In some cases, such as where the copy operation is a deduplicated copy operation, the client-side signature repository 121 (2) processes the signatures information related to the data blocks in the copy data set to identify for transmission to the secondary storage subsystem 118 only those the data blocks that are unique to the primary storage (that don't exist in the secondary subsystem).

The client-side repository 121 (or other appropriate entity such as a data agent 142 of the client 102B) in some embodiments transmits (3) a copy data set index (FIGS. 13-14) to the media agent 144. As will be described in greater detail herein, the copy data set index may be a data structure including metadata forming a map of the secondary copy, specifying the data blocks in the copy as well as their relative organization. In the illustrated example, one or more of the clients 102 forward copies of the data blocks that form the copy data set to the secondary storage subsystem 118. For instance, once the client-side repository 121 determines which clients 102 the individual copies of the data blocks in the copy data set are going to be sourced from, the client-side repository 121 (or other appropriate component such as the storage manager 140) instructs those source clients 102 to forward copies of those data blocks to the media agent 144. In other embodiments, the data blocks that form the copy data set are accumulated at a central location (e.g., at the client-side repository 121), and the entire copy data set is sent as a group to the media agent 144.

As shown, the target client 102B as well as one or more non-target clients 102A, 102C may be selected as sources for at least some of the data blocks. The client-side signature repository 121 may instruct the respective clients (4A, 4B, 4C) to forward copies of the data blocks that are going to be sourced from each respective client 102 to the secondary storage subsystem 118. In turn, the target client 102B forwards (5A) the requested data blocks to the media agent 144 or other appropriate component in the secondary storage subsystem 118. Where at least some of the data blocks are to be sourced from clients 102A, 102C other than the target client 102B, e.g., based on a data sourcing policy, those data blocks are forwarded (5B), (5C) by the non-target clients 102A, 102C to the media agent 144. Example data sourcing policies will be described in greater detail below with reference to FIG. 12. In this manner, resource utilization in the primary storage subsystem 117 can be allocated as desired. For instance, the amount of processing performed by the target client 102B and/or the amount of downtime of the target client 102B to perform the copy operation can be reduced.

The media agent 144 (6) processes the data received from the primary storage subsystem 117. To process the data, the media agent 144 can store the copy data set index or other map of the files and data within the secondary copy. Once the media agent 144 has processed the received data, the media agent creates (7) the secondary copy by writing the copy data set to the storage device(s) 108.

One skilled in the art will appreciate that all of the components of storage system 100 are not necessary to perform the copy operation, and that the processes described herein can be implemented in any number of ways without departing from the spirit and scope of the description. For example, one or more of the clients 102, the storage manager 140, or another appropriate component may perform the functions described in association with the client-side signature repository.

Figure 5:
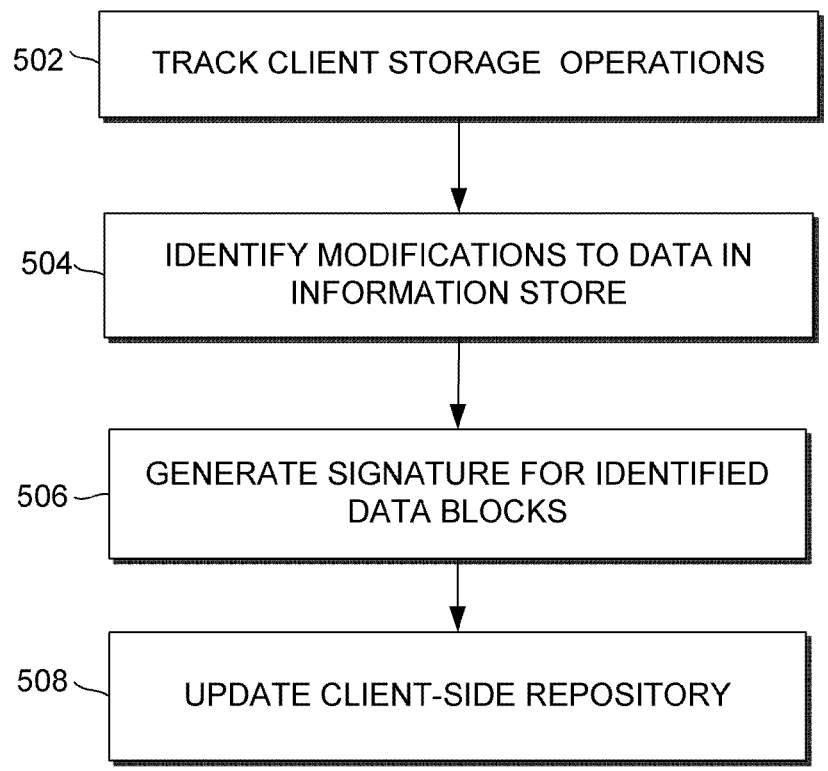
FIG. 5 is a flow diagram illustrative of one embodiment of a routine implemented by a storage system for updating the client-side repository with data block signatures.

FIG. 5 is a flow diagram illustrative of an embodiment of a routine 500 implemented by a storage system 100 for updating a client-side signature repository 121. For example, routine 500 can apply to embodiments described with reference to FIGS. 1A-1J, 2A, and 2B. While specific steps of the example routine 500 provided below are described as being performed by a particular component of the storage system 100, the steps of the routine 500 can generally be implemented by other components in other embodiments, such as any one, or a combination, of the storage manager 140, one or more of clients 102, the agent 202 of the client-side signature repository 121, one or more media agents 144, and/or one or more of the secondary storage devices 108.5

At block 502, the storage system 100 tracks storage operations associated with one or more of the clients 102. The storage operations may include, but are not limited to the generation of a new file, the modification of an existing file, the deletion of an existing file, the saving of a file, etc. For instance, the clients 102 may track their own storage operations, or central, shared component, such as the agent 202 of the client-side signature repository 121 may track the storage operations for multiple ones of the clients 102.

At block 504 the storage system 100 identifies data that has been modified within a primary storage device 104 as a result of tracked primary storage operation (e.g., a newly written or modified file). For instance, to identify the data that has been modified, the storage system 100 can detect or otherwise track or identify each write to the data store. In some instances, each time data is written to or deleted from the primary storage device 104, the storage system 100 records the location of the data that has been modified within the primary storage device 104, as well as additional information. Furthermore, the system 100 can identify the data blocks corresponding to modified data. For example, a file may be formed from six data blocks. A user may edit and save the file. Upon saving the file, the first five data blocks remain the same, but the sixth data block changes and an additional four data blocks can be added (for a total of ten data blocks). The storage system 100 can identify the file and/or the data blocks that have changed together as a group, or can identify the data blocks separately on an individual basis. Furthermore, the system 100 can track the storage location of the data blocks that make up the file.

At block 506, the storage system 100 generates signatures for the data blocks that make up the identified data. As discussed in greater detail above with reference to FIG. 2A, the signature can be generated using a hash function, or some other function capable of uniquely identifying the data blocks or substantially uniquely identifying the data blocks. In some embodiments the storage system 100 can generate the signature for the data blocks during or otherwise in association with the storage operation. In certain embodiments the storage system 100 generates the signature for the data blocks after the storage operation has been completed. In other embodiments, signatures for newly added or modified data can be generated at some other time, e.g., based on a preference included in a storage policy. For example, a storage policy can specify a frequency with which signatures should be generated for data blocks corresponding to modified data. Or a storage policy can specify that signatures are generated once a particular application has been closed, once a client computer is to be shut down, once a day, or some other interval, as desired. In one embodiment, signatures are generated local to each client 102 by the signature generator 123 residing on the client 102. In other cases, signatures 123 are generated by a shared component, such as the agent of the client-side signature repository 121.

At block 508 the storage system 100 updates the client-side signature repository 121. For instance, the agent 202 of the client-side signature repository 121 (or other appropriate component) can determine if (1) a generated signature is new to the client-side signature repository 121, or if instead (2) the client-side signature repository 121 already includes the signature. For instance, where the client-side signature repository 121 is organized using signature blocks 206, if the client-side signature repository 121 includes the generated signature, it will already include a signature block 206 for that signature, and the agent 202 can revise the existing signature block 206 to add an entry 214 corresponding to the newly added data block instance.

In some instances, such as when a data block has been overwritten or deleted, the agent 202 can remove an entry from a signature block 206. Also, if a generated signature is not already included in the client-side signature repository 121, the client-side signature repository 121 can generate a new signature block 206 containing the new signature as well as an entry with additional information regarding the data block used to generate the signature as discussed in greater detail above with reference to FIGS. 2A and 2B. As mentioned previously, the client-side signature repository 121 can include signatures corresponding to data blocks found in one client or multiple clients.

Furthermore, if the storage system 100 determines that a data block has been removed and the entry being deleted is the last entry of a signature block 206, in certain embodiments, the storage system 100 can remove the signature block from the client-side signature repository 121. In this way, the client-side signature repository 121 accurately represents the data currently residing in the primary storage subsystem 117.

One skilled in the art will appreciate that routine 500 can include fewer, more, or different blocks than those illustrated in FIG. 5. For example, the storage system 100 can update the client-side signature repository 121 based on a storage policy, a user request, identified storage operations, etc. The storage policy can indicate a predefined schedule when the client-side signature repository 121 should be updated. For example, the client-side signature repository 121 can be updated every five minutes, every hour, at the end of each day or business day, at the end of each week, etc. In some embodiments the client-side signature repository 121 is updated each time the client computer is to be shut down. Moreover, the described steps may be performed differently in some embodiments. For instance, the agent 202 of the client-side signature repository 121 may decide to retain a signature block 206 in some cases even where the only copy of the corresponding data block in the primary storage subsystem 117 is deleted. In this way, the client-side signature repository 121 can additionally track data blocks that have previously resided in primary storage. In such embodiments, the signature block 206 can include a flag indicating that no copies of the corresponding data block currently reside in the primary storage subsystem 117. For example, the indicator can simply be that the instances field 210 indicates zero entries. In certain embodiments, the agent 202 of the client-side signature repository 121 determines whether or not a signature block with zero entries should be deleted based on whether or not an instance of the corresponding data block was previously copied to the secondary storage subsystem 118 (e.g., as part of a backup operation). If the data block has been previously copied to the secondary storage subsystem 118, the client-side signature repository 121 may decide not to delete the signature block 206, whereas, if the client-side signature repository 121 determines that the data block was not previously copied to the secondary storage subsystem 118, the client-side signature repository 121 may decide to delete the signature block 206, or vice versa, as desired.

Figure 6:
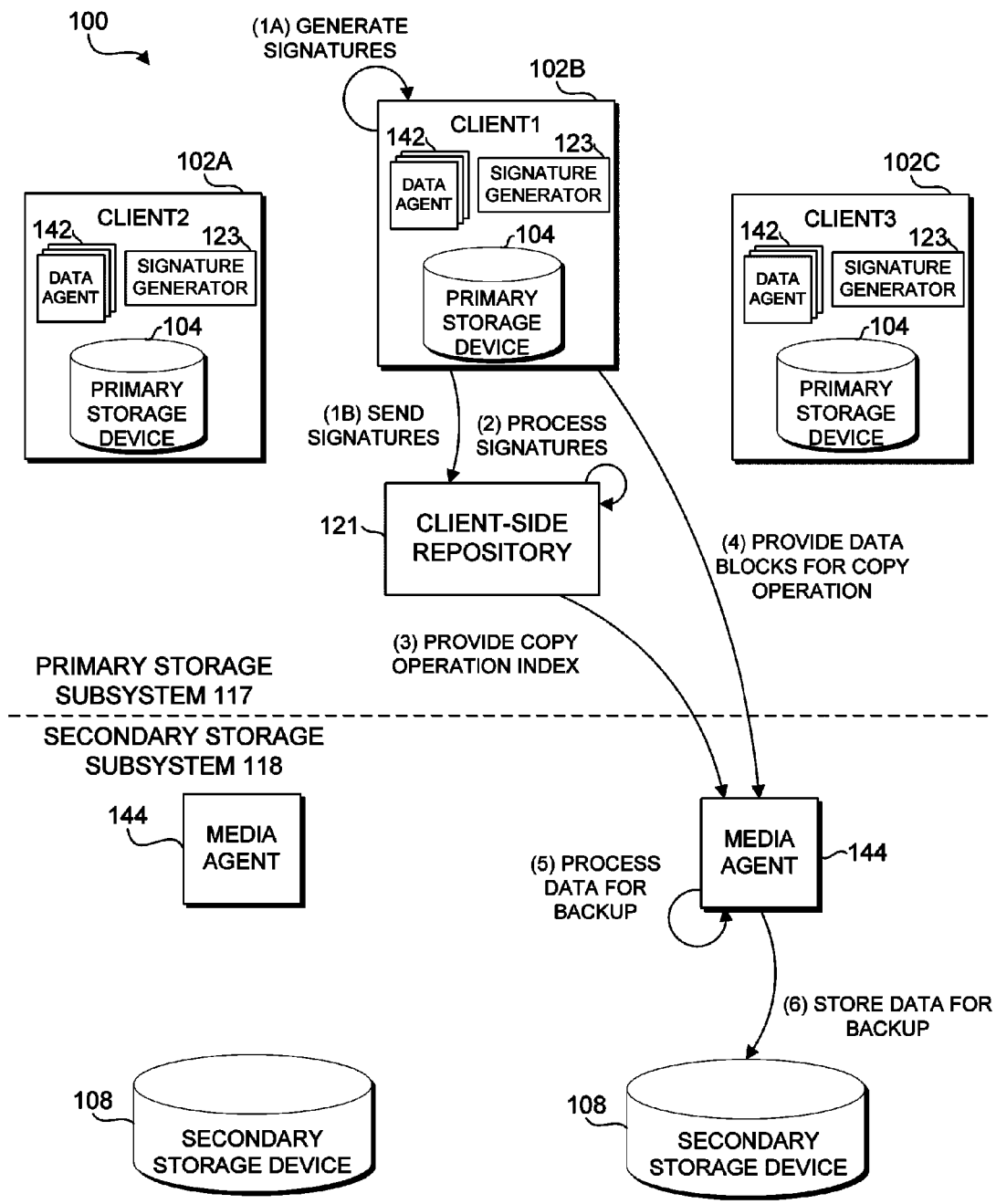
FIG. 6 is state diagram illustrative of the interaction between the various components of an exemplary storage system with respect to an exemplary copy operation involving a client-side signature repository.

FIG. 6 is a state diagram illustrative of the interaction between the various components of an example of the storage system 100 with respect to a secondary copy operation (e.g. a backup operation, snapshot operation, auxiliary copy operation, archive operation, etc.) where data blocks are sourced only from the target client 102B. The copy operation may be a deduplicated operation, as will be described. For purposes of the example, the illustrated embodiment has been simplified to include interaction between one client 102B, 102A, one media agent 144, and one storage device 108. In other embodiments, any of the media agents 144 and storage devices 108, alone or in combination, can be used for performing a copy operation from any combination of the clients 102.

The client 102B (1A) generates signatures of data blocks corresponding to data that has been modified within the primary storage device 104, and (1B) updates the client side repository 121 with the generated signatures. Although in the illustrated embodiment there is one client-side signature repository 121 for three clients 102, in some embodiments, each of the clients 102 is associated with its own client-side signature repository 121. Furthermore, in certain embodiments, the client-side signature repository 121 generates the signatures for the one or more clients with which it is associated, and those clients 102 do not generate the signatures locally.

In an embodiment, the system 100 initiates a copy operation for a copy data set (e.g., of one or more files, file system volumes, etc.) stored within a primary storage device 104 of a target client 102B. Upon initiating the copy operation, the client-side signature repository 121 (2) processes the copy operation request and identifies data blocks to send to the secondary storage subsystem 118 as part of the copy operation.

For instance, the client-side signature repository 121 can be used to carry out a deduplicated copy operation, where only those data blocks unique to the primary storage subsystem 117 (i.e., do not already reside in the secondary storage subsystem 118) that are part of the copy data set are sent to the secondary storage subsystem 118.

The copy data set for any of the embodiments described herein can vary depending on the type and scope of the copy operation being performed. For example, the copy operation can be a full backup or incremental backup of either the entire data store or only portions thereof (e.g., one or more files, folders, etc.). In a full backup of the entire primary storage device 104, the copy data set can include the entire data set found in the primary storage device 104 associated with the client 102B. In an incremental backup of the primary storage device 104, the copy data set can include all of the data in the primary storage device 104 that has changed since a previous backup. Similarly, for a full or incremental backup of one or more files, the copy data set can include all the data in the one or more files or the data in the one or more files that has changed since a previous backup, respectively.

As mentioned, the client-side signature repository 121 can identify the data blocks unique to primary storage that correspond to the copy data set. In this example, the data blocks unique to primary storage refer to the data blocks stored in the storage device 104 associated with the client 102B but not found in the secondary storage subsystem 118. However, in some embodiments, the data blocks unique to the primary storage refers to data blocks that are in any of the clients 102 but that do not already reside in the secondary storage subsystem 118. For example, if the copy operation request is for full or incremental backup of a single file of the client 102B, the client-side signature repository 121 identifies the data blocks unique to primary storage that form at least a portion of the single file.

In some embodiments, to identify the data blocks that are unique to primary storage, the client-side signature repository 121 identifies signature blocks that have been modified since a previous copy operation. For example, the client-side signature repository 121 identifies signature blocks with a copy operation flag 212 set to indicate that the signature block has been modified since a previous copy operation.

In certain embodiments, the client 102B or the media agent 144 identify the data blocks that are unique to primary storage by reviewing signature block information. For example, in a full backup of the entire data store associated with the client 102B, the client 102B or the media agent 144 can identify the data blocks that are unique to primary storage using the copy operation flag 212, or by comparing a creation date of a signature block with the date of the last copy operation.

Once the data blocks that are unique to primary storage have been identified, the client-side signature repository can 121 can in some embodiments (3) provide a copy data set index to the secondary storage subsystem 118 (e.g., to the media agent 144). The copy data set index can provide information regarding the data blocks corresponding to the data associated with the copy operation, as well as a map indicating the relationship between the different data blocks. One embodiment of a copy data set index is described in greater detail below with reference to FIG. 13. In some embodiments, the copy data set index is generated and communicated to the secondary storage subsystem 118 (e.g., to the media agent 144) by the client 102 whose data set is being copied rather than the client-side signature repository 121. In other embodiments, the media agent 144 may generate the copy data set index.

The client 102B (4) provides the identified data blocks (e.g., those that are unique to primary storage subsystem 117) to the secondary storage subsystem 118. In some embodiments, the client 102B provides the data blocks to the client-side signature repository 121, which in turn provides the data blocks to secondary storage. In certain embodiments, the client-side signature repository 121 requests the client(s) 102 to provide the identified data blocks to the media agent 144. In some cases, the media agent 144 requests the identified data blocks from the client 102B.

Upon receiving the data blocks from the primary storage subsystem 117, the media agent 144 (5) processes the data blocks as part of the copy operation. For instance, the media agent 144 may update its index in view of the copy operation as described herein. In some cases, the media agent 144 stores the copy data set index for future use. The media agent 144 then conveys the copy data set to the storage device 108 for storage thereon.

One skilled in the art will appreciate that all of the components of storage system 100 are not necessary to perform the copy operation, and that the processes described herein can be implemented in any number of ways without departing from the spirit and scope of the description. In one embodiment, the client-side signature repository 121, client 102b, or media agent 144 can identify some or all of the unique data blocks in the primary storage subsystem 117 (that aren't already in the secondary storage subsystem 118) regardless of whether the unique data blocks form part of a copy data set. The unique data blocks can then be sent to the media agent 144 (e.g., on a scheduled basis, or as part of a copy operation along with data blocks that are associated with the copy operation) for storage in the secondary storage subsystem 118. In this way, the secondary storage subsystem 118 can accumulate copies of data blocks that exist in the primary storage subsystem 117, e.g., before certain data blocks form part of a copy data set. This technique can take advantage of available bandwidth to simplify future deduplicated copy operations, for example.

FIG. 7 is a flow diagram illustrative of one embodiment of a routine 700 implemented by a storage system 100 for executing a collaborative copy operation of data using a client-side repository 121, where the copy operation is a deduplicated copy operation. One skilled in the relevant art will appreciate that the elements outlined for routine 700 may be implemented by one or many computing devices/components that are associated with the storage system 100. For example, routine 700 can be implemented by any one of, or a combination of, the storage manager 140, one or more clients 102, the client-side signature repository 121, one or more media agents 144, and/or one or more of the storage devices 108.

At block 701, the storage system 100 receives a secondary copy operation request associated with a copy data set (e.g., a subclient) of a target client 102B, such as a request to perform a copy operation. Because the copy operation is deduplicated, at block 702, the storage system 100 identifies data blocks involved with the copy operation that are unique to primary storage subsystem 117 and don't already exist in the secondary storage subsystem 118.

For the identified data blocks that are unique to primary storage, the storage system 100 determines at block 706 consults the client-signature repository 121 to determine whether copies of the data block the data block exist in the data stores of any non-target clients 102 and, if so, determines whether the data block will be sourced from another client 102, or will instead be sourced from the target client 102B. To identify whether the data block is located in another client 102, the storage system 100 can analyze the signature information (e.g., signature blocks 206) corresponding to the data blocks in the copy data set. For example, if a signature block 206 indicates that there are multiple instances of a data block corresponding to a particular signature in field 210, includes multiple entries 214, and/or includes multiple Client IDs in the location field 218, the storage system 100 can determine that multiple copies of the data blocks exist in primary storage. Or, where a shared client-side signature repository 121 is not used and each client 1-2 instead maintains its own separate client-side signature repository 121, the storage system 100 can access the client-side signature repositories 121 of the individual clients 102 to identify whether any non-target clients 102 have a copy of the data block.

Upon determining that a data block is to be sourced from a non-target client at block 704, the storage system 100 at block 706 identifies the location of the data block in the primary storage device(s) 104 associated with that client 102. To identify the location of the data block in the other, non-target client 102, the storage system 100 can review the signature blocks 206 corresponding to the data blocks in the copy data set. For example, the storage system 100 can review the entry 214 corresponding to the data block located in the other client 102. The entry 214 can include the location information of the data block within the other client 102.

On the other hand, if the storage system 100 determines that the data block will be sourced from the target client 102 (e.g., because that is the only copy of the data block), the storage system 100 identifies the location of the data block in the primary storage device 104 associated with the target client 102 at block 708. Sourcing policies for determining which clients 102 to source data blocks from are described in greater detail herein, e.g., below with reference to FIG. 12.

Once the location of the identified data block that is unique to primary storage has been identified, the storage system 100 performs the copy operation at block 710. The data block is retrieved from the identified location in the primary storage device 104 associated with the determined source client 102. In addition, the signature information, such as the corresponding signature block 206 or portion thereof can be retrieved from the client-side signature repository 121 and sent to the secondary storage subsystem 118.

While described with respect to a single data block for the purposes of clarity, the retrieved data (data blocks and/or signature information) can be sent from their respective locations either individually or bundled together. Moreover, signatures corresponding to the data blocks that are not unique to the primary storage subsystem 117 (already exist in the secondary storage subsystem 118) are generally sent to the secondary storage subsystem 118 instead of copies of the data blocks themselves. The secondary storage subsystem 118 utilizes the signature to identify the pre-existing copy of the data block in the secondary storage device(s) 108 for use in creating the secondary copy.

One skilled in the art will appreciate that routine 700 can include fewer, more, or different blocks than those illustrated in FIG. 7. Moreover, a number of alternative embodiments are possible. For instance, in some cases the secondary copy operation is not a deduplicated copy operation, and copies of all of the data blocks in the copy data set are forwarded to the secondary storage subsystem 118 instead of just copies of those data blocks that are unique to the primary storage subsystem 117.

Figure 8:
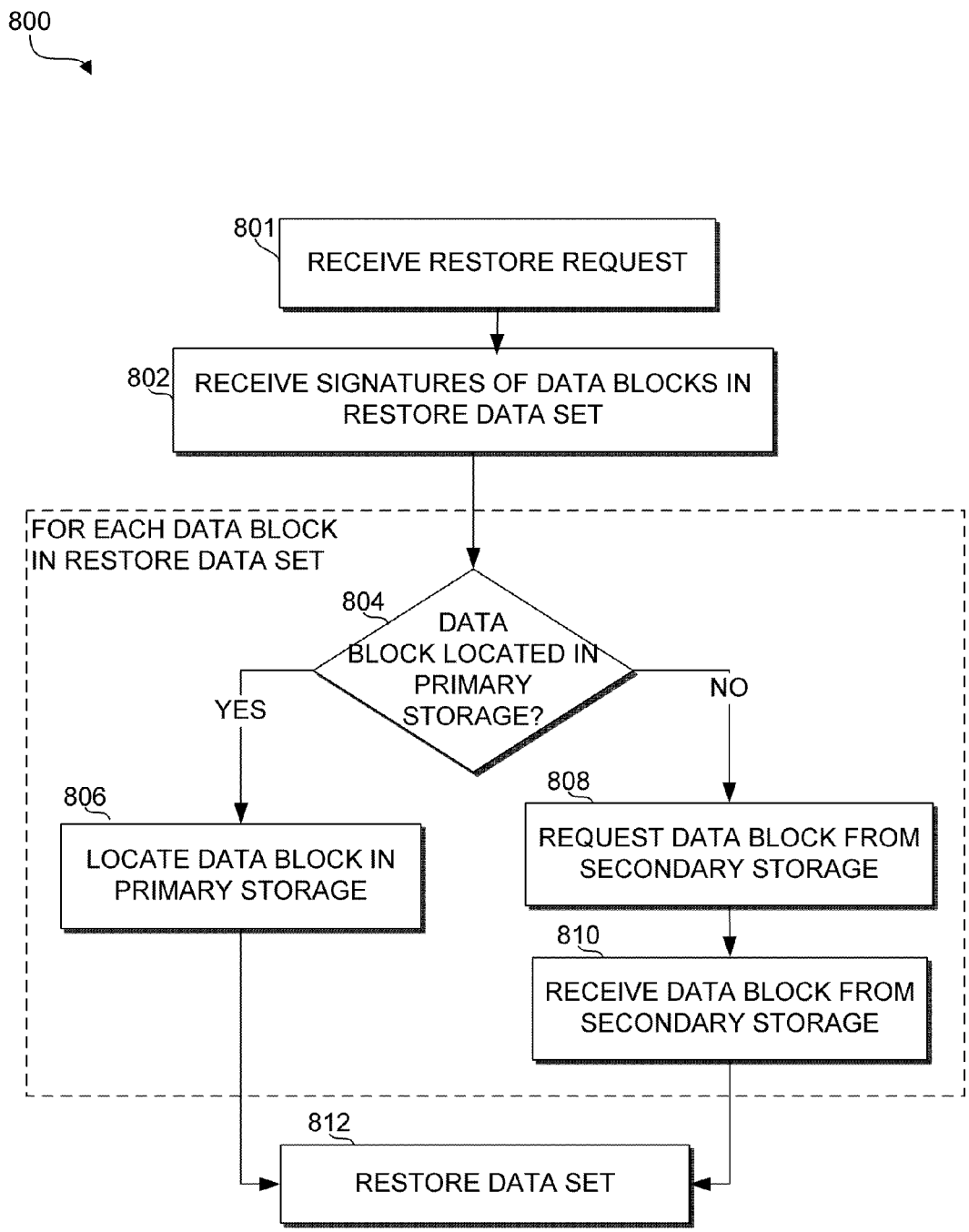
FIG. 8 is a flow diagram illustrative of one embodiment of a routine implemented by a storage system for restoring data using a client-side repository.

FIG. 8 is a flow diagram illustrative of an embodiment of a routine 800 implemented by a storage system 100 for using a client-side repository 121 to perform a restore operation. One skilled in the relevant art will appreciate that the elements outlined for routine 800 may be implemented by one or many computing devices/components that are associated with the storage system 800. For example, routine 800 can be implemented by any one, or a combination of, the storage manager 140, one or more clients 102, the client-side signature repository 121, one or more media agents 144, and/or one or more storage devices 108.

At block 801, the storage system 100 receives a request to restore a restore data set to a target client 102B. At block 802, the storage system 100 receives signatures of data blocks in the restore data set. The storage system 100 can receive the signatures of the data blocks to be restored from the media agent 144, for example. In other cases, the signatures can be obtained from the target client 102B, the component requesting the restore, the storage manager 140, and/or the client-side signature repository 121.

For each data block to be restored, the storage system 100 determines whether the data block is located in the primary storage subsystem 117 at block 804. For instance, as described in greater detail above, with reference to FIG. 8, the storage system 100 can determine whether the data block is located in the primary storage subsystem 117 by reviewing the signature blocks 206 stored in the client-side signature repository 121.

In some embodiments, if a signature corresponding to a data block to be restored is located in the client-side signature repository 121 or if an existing signature block 206 has at least one entry 214, the storage system 100 determines that the data block is located in the primary storage subsystem 117.

Figure 9:
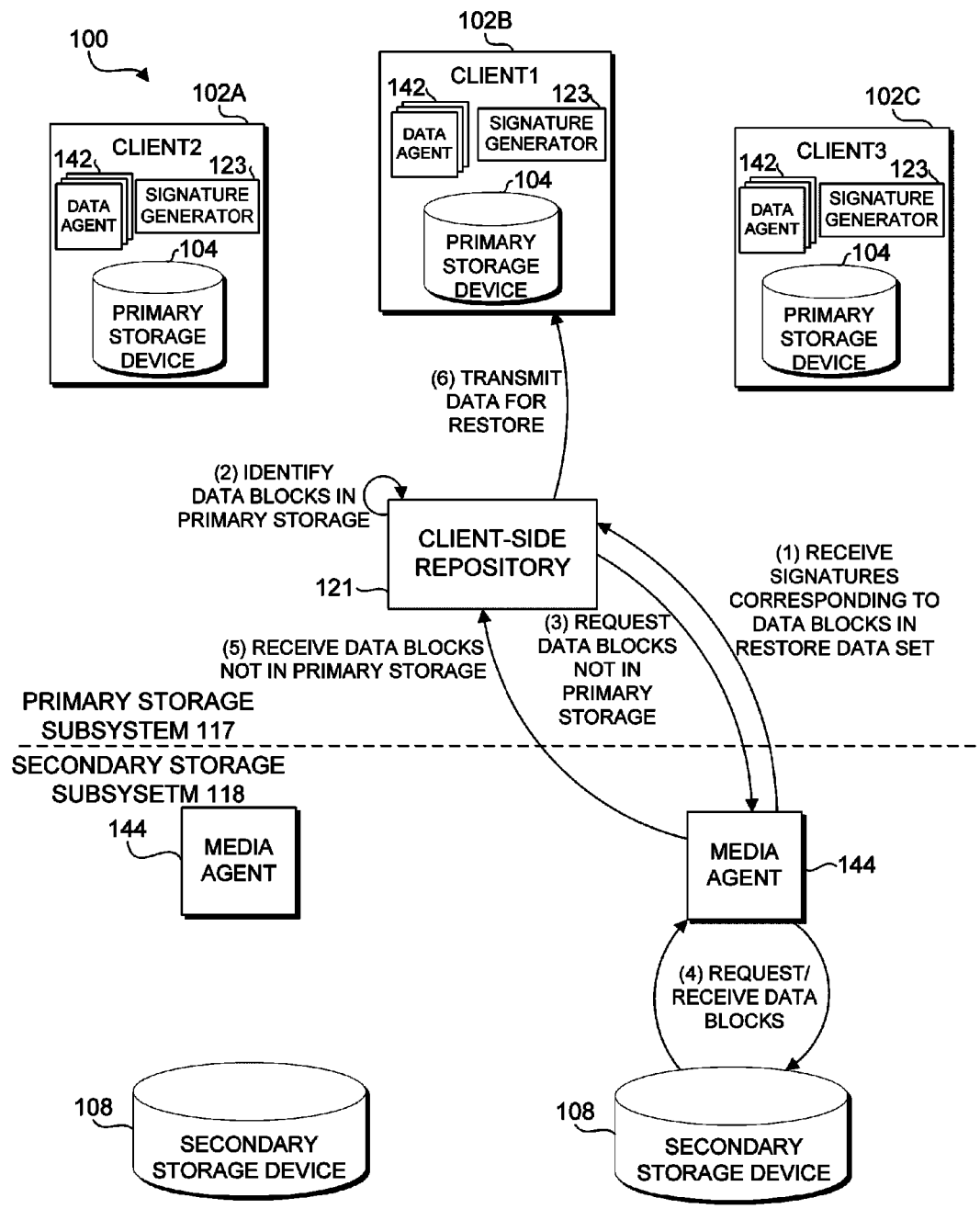
FIG. 9 is a state diagram illustrative of the interaction between the various components of an exemplary storage system with respect to an exemplary restore operation.
Figure 10:
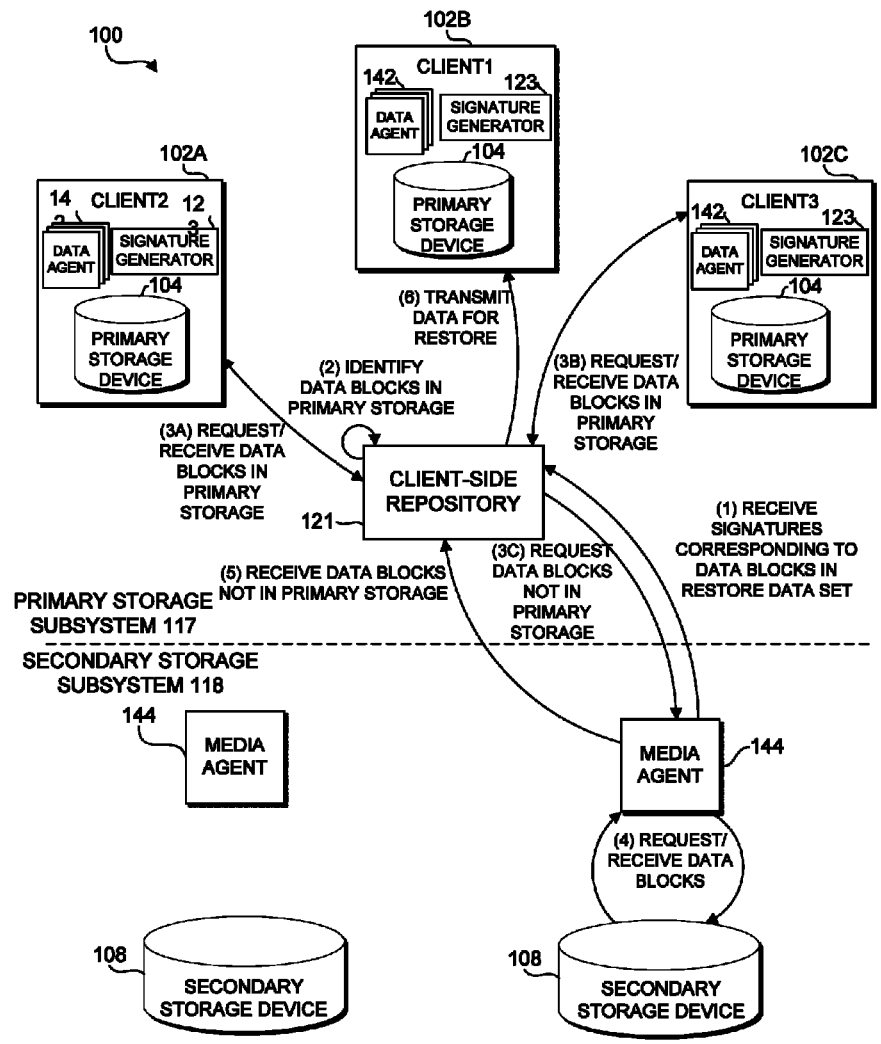
FIG. 10 is a state diagram illustrative of the interaction between the various components of an embodiment of a storage system with respect to an exemplary collaborative restore operation.

Upon determining that the data block is located in the primary storage subsystem 117, the storage system 100 identifies the location of the data block, as illustrated at block 806. For instance, copies of the data block may reside in the target client 102B and/or any of the other non-target clients 102. FIGS. 9 and 10, described below, illustrate examples of restore operations where data is sourced from only the target client 102B (FIG. 9) and where data is collaboratively sourced from multiple ones of the clients 102 (FIG. 10).

On the other hand, if the information in the signature repository 116 indicates that the data block is not located in the primary storage subsystem 117, the storage system 100 can request and receive the data block from the secondary storage subsystem 118 at blocks 808 and 810, respectively.

Once the data blocks located in the primary storage subsystem 117 have been identified and the data blocks not located in the primary storage subsystem 117 have been received at the primary storage subsystem 117 from the secondary storage subsystem 118, the storage system 100 can restore the data, as illustrated in block 812. One skilled in the art will appreciate that routine 800 can include fewer, more, or different blocks than those illustrated in FIG. 8.

FIG. 9 is a state diagram illustrative of the interaction between the various components of the storage system 100 with respect to an example of an implementation of a restore operation. For purposes of the example, the illustrated embodiment has been simplified to include interaction between one client 102B, one media agent 144, and one storage device 108. In other embodiments, any of the media agents 144 and any of the storage devices 108, alone or in combination, can be used for performing a restore operation of any combination of the clients 102. For instance, an example of a collaborative restore operation is described with respect to FIG. 10, where data is sourced from other ones of the clients 102 in performing the restore operation. Although in the illustrated embodiment the client-side signature repository 121 is generally central to and associated with multiple clients 102, in some embodiments, each of the clients 102 is associated with a dedicated client-side signature repository 121.

In an embodiment, the storage manager 140 or other appropriate component initiates a restore by instructing the media agent 144 a restore data set be restored to a target client 102B. The restore request can be initiated by one or more of the components of the storage system 100. Such a restore may initiate upon the occurrence of some predetermined criteria, such as a re-boot after a power outage, information store error, or some other condition that causes a client system to go off-line, addition of a new client, or the like. In one embodiment, the data from one client system 102B can be restored to another client 102A, 102C.

In response to the restore request, the client-side signature repository 121 (1) receives the signatures of the data blocks in the restore data set. The data blocks involved in the restore operation can include the data blocks that are to be restored to a target client 102B. Although the illustrated embodiment shows the client-side signature repository 121 receiving the signatures from the media agent 144, the client-side signature repository 121 can receive the signatures from various components of the storage system 100. For example, the client-side signature repository 121 can receive the signatures from the component initiating the restore request, from the client 102B, or can generate the signatures itself.

In some embodiments, a component of the storage system 100 includes an index of the restore data set, which can include the signatures corresponding to the data blocks in the restore data set as well as a mapping of the organization of the restore data set. The index can be a copy data set index that is generated during the secondary copy operation, for example, or can be derived therefrom. In certain other embodiments, the client-side signature repository 121 already has a copy of the index and the index is therefore not sent from the secondary storage subsystem 118 to the primary storage subsystem 117. For instance, the client-side repository 121 in some cases retains copies of indexes associated with secondary copy operations for later use in the restore operation.

Once the client-side signature repository 121 receives the signatures of the data blocks in the restore data set, the client-side signature repository 121 (2) identifies data blocks in the restore data set that are already located in the primary storage subsystem 117. In the illustrated embodiment, the client-side signature repository 121 identifies copies of the data blocks in the restore data set that already reside in the target client 102B. However, in other embodiments, the system can implement a collaborative restore operation (FIG. 10) in which data blocks are sourced from non-target clients 102 instead of or in addition to the target client 102.

For data blocks for which copies do not reside in the primary storage subsystem 117 (e.g., where no corresponding signature was found in the client-side signature repository 121, or where the information in the client-side repository 121 otherwise indicates the data block is not in primary storage), the client-side signature repository 121 (or other appropriate component) (3) requests copies of the data blocks from the media agent 144. For instance, the client-side signature repository 121 can request the data blocks individually from the media agent 144 and/or can bundle multiple data block requests together. In turn, the media agent 144 can (4) request and receive the data blocks from the storage device 108 and the client-side signature repository 121 can (5) receive the data blocks from the media agent 144. Similar to the client-side signature repository 121, the media agent 144 can send the data blocks individually or bundle multiple data blocks together.

Once the client-side signature repository 121 has identified the location of the data blocks within primary storage and received the data blocks not in primary storage from secondary storage, the client-side signature repository 121 can (6) forward information to the client 102 that is sufficient to perform the restore operation. For instance, references (e.g., location information) to the data blocks in the restore set that already reside in the target client 102B are forwarded to the target client 102B along with copies of the data blocks received from the secondary storage subsystem 118. In addition to the location information of the data blocks stored in the primary storage device 104 and the data blocks received from secondary storage subsystem 118, the client-side signature repository 121 can transmit a restore data set index that provides information regarding how the data blocks in the restore data set are organized. The target client 102B can use the received location information, received data block copies, and/or received restore data set index to create the restored data set.

One skilled in the art will appreciate that all of the components of storage system 100 are not necessary to store and restore data blocks, and that the processes described herein can be implemented in any number of ways without departing from the spirit and scope of the description. For example, in an embodiment, the client-side signature repository 121 does not perform any of the processing steps. In such an embodiment, the client 102B or media agent 144 can query the client-side signature repository 121 for the signatures corresponding to the data blocks involved in the restore operation. The client 102B or media agent 144 can then identify the data blocks stored in primary storage as described previously. In some embodiments, the client-side signature repository 121 can simply transmit the signatures of the data blocks not located in primary storage to the media agent 144 without requesting the data blocks in return. In response, the media agent 144 can transmit the data blocks not found in primary storage directly to the client 102B for restore via a network, bypassing the client-side signature repository 121.

FIG. 10 is a state diagram illustrative of the interaction between the various components of a storage system 100 with respect to an exemplary collaborative restore operation. For purposes of the example, the illustrated embodiment has been simplified to include interaction between the clients 102, one media agent 144, and one storage device 108. In other embodiments, any of the media agents 144 and any of the storage devices 108, alone or in combination, can be used for performing a collaborative restore operation on any combination of the clients 102. Although in the illustrated embodiment the client-side signature repository 121 is associated with multiple clients, in some embodiments, each of the clients 102 is associated with its own client-side signature repository 121.

As described in greater detail above, with reference to FIGS. 8 and 9, the storage system 100 initiates a restore request and the CSR 121 (1) receives signatures of data blocks in a restore data set that are to be restored to a target client and (2) identifies data blocks in the restore data set that are located in primary storage. In this embodiment, the data blocks located in primary storage refers to all of the data blocks located in any of the clients 102A, 102B, 102C, or other clients for which the client-side signature repository 121 stores signature blocks. However, as mentioned previously, in some embodiments, the data blocks located in primary storage can refer to only the data blocks located in a single client.

As discussed in greater detail above, with reference to FIGS. 8 and 9, the data blocks located in the primary storage subsystem 117 can be identified using the signature blocks stored in the client-side signature repository 121. Once identified, the location information of the data blocks located in the primary storage subsystem 117 can also be retrieved, as described previously. For example, the client-side signature repository 121 can review the location information 218 of the entries 214 of the signature block 206 corresponding to the data blocks in the restore data set to identify one or more locations within the primary storage subsystem 117 where the data block is located.

In this example, some of the data blocks to be restored to a first location in the client 102B can be located in a second location in the client 102B and/or in one or more of the other clients 102A, 102C. Accordingly, the client-side signature repository 121 can identify which of the different locations will be used as within the primary storage subsystem 117 to source to each data block based on a data sourcing policy, which will be described in greater detail below with reference to FIG. 12.

Once the sources of the respective data blocks in the restore data set have been identified, the client-side signature repository 121 (3A), (3B) requests and receives the data blocks to be used in the restore from the source client(s) 10 based on the data sourcing policy. In other cases, the data blocks are forwarded directly to the target client 102B without first being transmitted to the client-side repository 121. In addition, the client-side signature repository 121 (3C) requests the data blocks not already residing in the primary storage subsystem 117 from the media agent 144, and the media agent 144 in turn requests and receives (4) the data blocks from the storage device 108. The client-side signature repository 121 then receives (5) the data blocks from the media agent 144. In some cases, even if a copy of one or more of the data blocks in the restore data set resides in the primary storage subsystem 117 (e.g., in one of the non-target clients 102A, 102C), the data block may nonetheless be sourced from the secondary storage subsystem 118. For instance, the sourcing policy may dictate that the client(s) 102 that stores the copy of the data block should not be interrupted for the purposes of accessing the data block, such as where that client 102 is performing critical tasks or the like.

In the illustrated embodiment, once the data blocks have been received from the clients 102A, 102C and secondary storage, the client-side signature repository 121 can (6) transmit the data to the client 102B. The target client 102B may compile the restore data set by combining the received data with any data blocks that are sourced from the target client 102B, and restore the data set to the primary storage device 104, completing the restore operation. In other configurations, the entire restore data set is compiled at the client-side repository 121 and then communicated to the target client 102B.

In some embodiments, the client-side signature repository 121 is also updated in view of the data that is copied to the primary storage subsystem 117 during the restore operation. For instance, the client-side signature repository 121 can be updated to reflect data blocks that were received from the secondary storage subsystem 118 during the restore and written to the primary storage device 104 associated with the target client 102B. Moreover, the client-side signature repository 121 can be updated to reflect copies of data blocks that were communicated from any non-target clients and written to the primary storage device 104 associated with the target client 102B.

One skilled in the art will appreciate that all of the components of storage system 100 are not necessary to store and restore data blocks, and that the processes described herein can be implemented in any number of ways without departing from the spirit and scope of the description. For example, in an embodiment, the client-side signature repository 121 does not perform any of the processing steps. In such an embodiment, the client 102B or media agent 144 can query the client-side signature repository 121 for the signatures corresponding to the data blocks involved in the restore operation. The client 102B or media agent 144 can then identify the data blocks stored in primary storage as described previously. In some embodiments, the client-side signature repository 121 can simply transmit the signatures of the data blocks not located in primary storage to the media agent 144 without requesting the data blocks in return. In reply, the media agent 144 can bypass the client-side signature repository 121 and transmit the data blocks not found in primary storage directly to the client 102B for restore via a network. Similarly, the clients 102A, 102C can bypass the client-side signature repository 121 and transmit the data blocks to be restored from the clients 102A, 102C directly to the client 102B via a network. Furthermore, in some embodiments, multiple client-side signature repositories 121 can be used. For example, each client 102 can be associated with its own client-side signature repository 121. The client-side signature repositories 121 can communicate with each other during the restore to effectuate the various processes described above.

Figure 11:
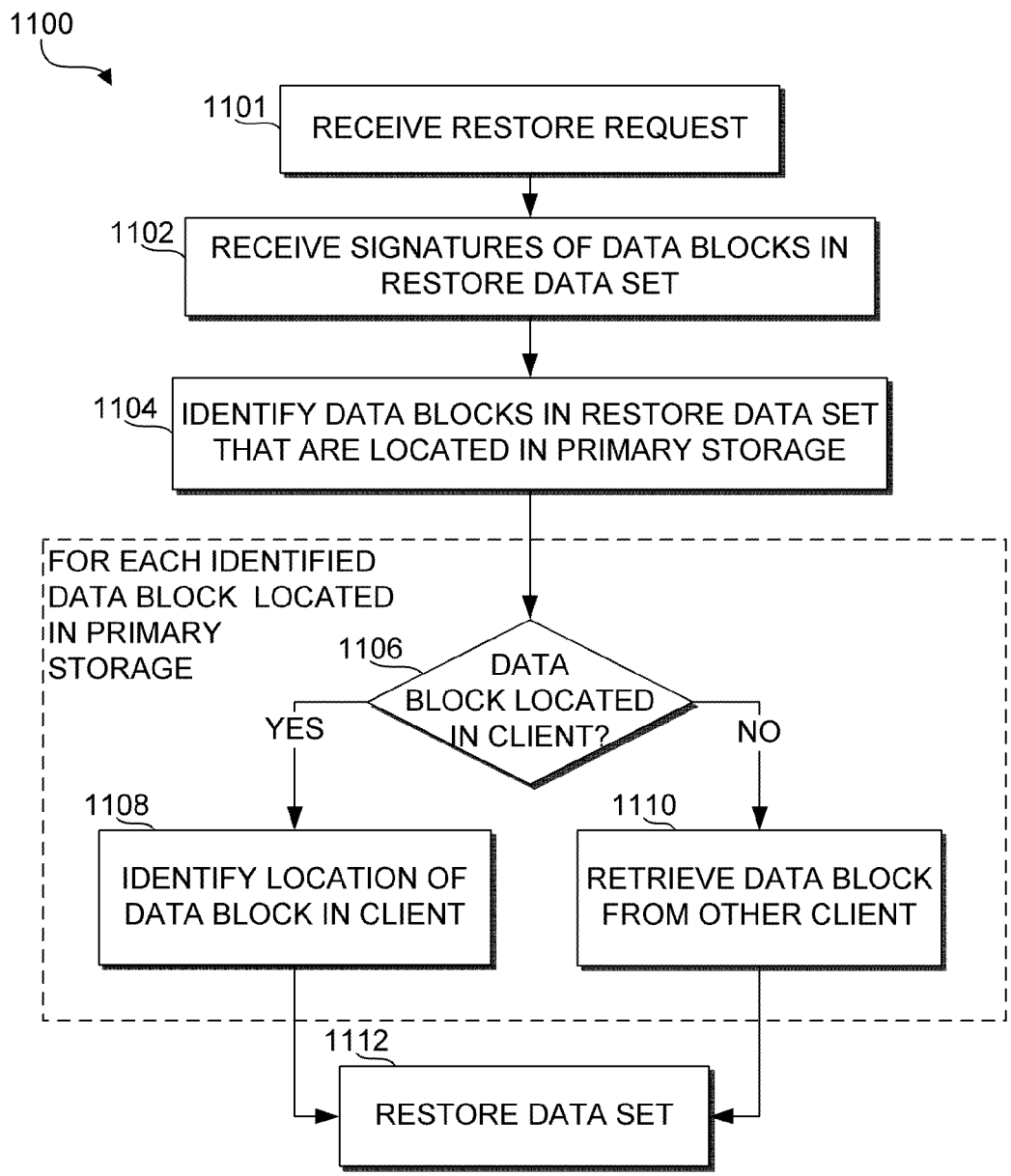
FIG. 11 is a flow diagram illustrative of one embodiment of a routine implemented by a storage system for executing a collaborative restore of data using a client-side repository.

FIG. 11 is a flow diagram illustrative of an embodiment of a routine 1100 implemented by a storage system 100 for performing a collaborative restore operation. One skilled in the relevant art will appreciate that the elements outlined for routine 1100 may be implemented by one or more computing devices/components that are associated with the storage system 1100. For example, routine 1100 can be implemented by any one, or a combination of, the storage manager 140, one or more clients 102, the client-side signature repository 121, one or more media agents 144, and/or one or more storage devices 108.

At block 1101, the storage system 100 receives a request to restore a restore data set to a target client 102B.

At block 1102, the client-side signature repository 121 receives signatures of data blocks in the restore data set. The client-side signature repository 121 may be shared by the clients, or separate dedicated client-side signature repositories may be associated with some or all of the clients 102. At block 1104, the agent of the client-side signature repository 121 reviews the information in the client-side signature repository 121 to identify data blocks in the restore data set that are located in the primary storage subsystem 117 in any of the manners described herein.

For each data block in the restore data set that is located in the primary storage, the agent 202 of the client-side signature repository 121 determines whether the data block already resides in the primary storage device(s) 104 associated with the target client 102B, at block 1106. For instance, where signature information is organized in signature blocks 206, the agent 202 of the client-side signature repository 121 can review the entries 214 of the signature blocks 206 corresponding to the data blocks located in the primary storage subsystem 117 to determine whether the data block is located in the primary storage device(s) 104 associated with the target client 102B. For example, the location information 218 in each entry 214 can include a client ID indicating which client 102 includes a copy of the data block and/or indicating the physical location of the data block within the storage device 104 associated with the client 102.

If it is determined that the data block is located in the storage device 104 associated with the target client 102B, the agent 202 of the client-side repository 121 can identify the location of the data block at block 1108, e.g., by referring to information provided in the location field 218 in the entry 214 of the corresponding data block. On the other hand, if the storage system 100 determines that the data block is not located in the target client 102B, the storage system 100 can request and receive the data block from another client 102, at block 1110. The source client 102 can be determined based on a data sourcing policy, which will be described in greater detail below with reference to FIG. 12.

The agent of the client-side repository 121 also identifies data blocks not located in the primary storage subsystem 117, and those data blocks are requested and received from the secondary storage subsystem 118. In some cases where a data block does not exist in the storage device 104 associated with the target client 102B, even if a copy of the data block does reside in one of the other clients 102, it is nonetheless sourced from the secondary storage subsystem 118 based on the sourcing policy. In some other embodiments, the sourcing policy specifies that, even if a copy of the data block is found in the storage device 104 associated with the target client 102B, the data block is still sourced from one of the non-target clients 102 or from the secondary storage subsystem 118.

At block 1112 the data set is restored to the primary storage device 104 of the target client 102B.

One skilled in the art will appreciate that routine 1100 can include fewer, more, or different blocks than those illustrated in FIG. 11.

Figure 12:
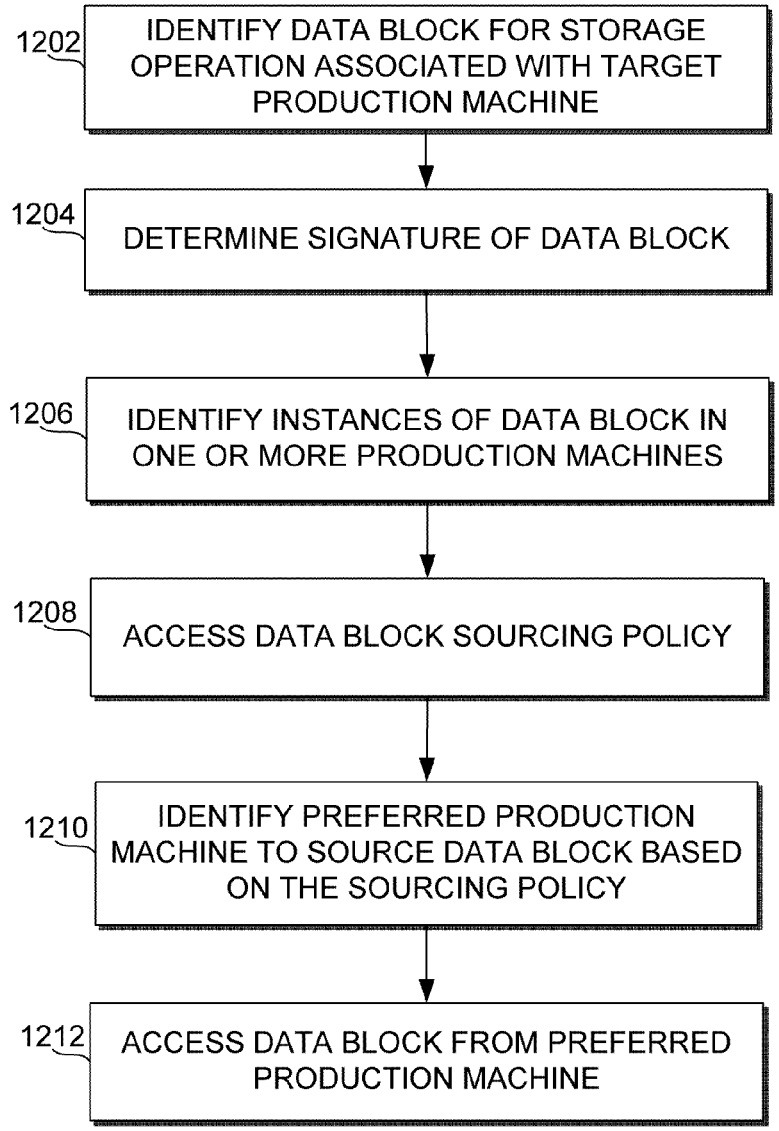
FIG. 12 is a flow diagram illustrative of one embodiment of a routine implemented by a storage system for implementing a sourcing policy to determine where to source data blocks for a storage operation.

FIG. 12 is a flow diagram illustrative of an embodiment of a routine implemented by a storage system 100 for determining a location from which to source data blocks for a storage operation. One skilled in the relevant art will appreciate that the elements outlined for routine 1210 may be implemented by one or many computing devices/components that are associated with the storage system 1210. For example, routine 1210 can be implemented by any one, or a combination of, the storage manager 140, one or more clients 102, the client-side signature repository 121, one or more media agents 144, and/or one or more storage devices 108.

At block 1212, the storage system 100 identifies a data block involved in a storage operation that is associated with a target client 102. The storage operation can include, but is not limited to, a copy operation, restore operation, other storage operation, etc. The identified data block can include a data block to be restored, that is involved in the copy operation, and/or involved in another storage operation.

At block 1214, the storage system 100 identifies the signature of the current data block. In some embodiments, the storage system 100 identifies the signature by generating the signature of the data block. In certain embodiments the storage system 100 identifies the signature of the data block by retrieving the signature information from the client-side signature repository 121, or other location.

At block 1216, the storage system 100 identifies the instances of the data block that reside within the primary storage subsystem 117. In some embodiments, where the signature information is organized as signature blocks 206 in the manner described herein, the storage system 100 identifies the instances of the data block by reviewing the signature blocks 206. As described in greater detail above, with reference to FIGS. 2A, 2B, and 3, the signature blocks stored in the client-side signature repository 121 can include an instances field 210 that identifies the number of instances of a particular signature 208. Moreover, the signature block 206 can include location information of the data block in the location field 218 and access/priority information of the data block in the access/priority field 220 of each instance of the data block.

At block 1208, the storage system 100 accesses a data sourcing policy. The data sourcing policy can be located in one or more components of the storage system 100. For example, the data sourcing policy can reside in the storage manager 140, one or more clients 102, the client-side signature repository 121, one or more media agents 144, and/or one or more storage devices 108. In some embodiments, portions of the data sourcing policy reside in different components of the storage system 100.

At block 1206, the storage system 100 may have determined that a particular data block resides in multiple sources within the primary storage subsystem 117 (e.g., data stores associated with multiple ones of the clients 102). The data sourcing policy can be used to determine from which source the data block should be retrieved for the particular storage operation. For example, during a copy operation when multiple instances of a data block that is unique to primary storage (i.e., not located in secondary storage) are located in the primary storage subsystem, the storage policy can be used to determine which source to retrieve the data block from for transmission to the secondary storage subsystem 118. Similarly, during a restore operation, where multiple copies of a data block reside within the primary storage subsystem 117, the data sourcing policy can indicate from which source to retrieve the data block to be restored.

The data sourcing policy can specify that the determination of the source of the data block based on a variety of factors. For instance, characteristics associated with the different sources (e.g., characteristics associated with the clients 102 or the primary storage devices 104), network information, and/or relative priority information associated with the sources may be used. For example, the data sourcing policy can compare the relative speeds of the different available sources, estimated total expected times to retrieve the particular data block from the available sources, or software or firmware versions residing on the available sources to determine which source is better suited to be involved in the storage operation, etc. The data sourcing policy can also specify that the relative proximity of the available sources to the target client and/or available network bandwidth between the available sources and the target client 102B should be factored in to determine the preferred source. In addition, the data sourcing policy can specify that if one or more data blocks are to be retrieved from a particular source client 102, that source client is a preferred source for subsequent data blocks.

In some embodiments, the data sourcing policy reviews a priority indication associated with the sources. The priority indication can specify the relative priority of a potential data block source (e.g., client 102 and/or primary storage device 104) with respect to other sources. The priority indication can be a fixed value, or can be determined dynamically, e.g., based on a load associated with the source, based on the number or types of processes being executed by source, a user associated with the source, etc. For example, if one source containing a copy of a data block has a higher priority than another source, the data sourcing policy can specify that a source with the lower priority should be used to retrieve the data block. Furthermore, the data sourcing policy can account for upcoming processes to be performed by the source. For example, if a source is about to begin a processor intensive process, the data can be retrieved from a different source. In certain embodiments, the data sourcing policy selects the source that can most quickly provide the data block. In general, the sourcing policy can specify that any combination of the above or other appropriate factors can be used in making the data block sourcing determination.

At block 1210, the storage system 100 identifies a preferred source based on the data sourcing policy. For instance, where the preferred source is dynamically determined, e.g., on the fly and/or in real time during a storage operation, once the available sources of the data block are identified, the accessed data sourcing policy is referred to determine which of the sources is the preferred source for that particular storage operation.

On the other hand, where the preferred source is fixed or otherwise predetermined, each time a signature block is updated in the client-side signature repository 121, the storage system 100 can access the sourcing information (e.g., review the entries of the signature block 206) to determine the preferred sourcing order for retrieving the data block. In some cases, different sourcing orders are specified, e.g., depending on the type storage operation involved and the identity of the target client.

The preferred sourcing order can be stored in a separate field of the signature block, or each entry can include a sourcing rank that indicates its relative priority among the various potential data block sources. For instance, in the event, both a top ranked (e.g., high priority) source and another, lower ranked source maintain a copy of a data block, the lower ranked source is selected.

At block 1212, the storage system 100 accesses the data block from the preferred source. In some embodiments, the source transmits the data block to the target client 102B (e.g., for a copy operation), the media agent 144 (e.g., for a restore operation), and/or the client-side signature repository 121, etc., based on the storage operation.

One skilled in the art will appreciate that routine 1210 can include fewer, more, or different blocks than those illustrated in FIG. 12. In some embodiments, the storage system 100 can omit block 1218 and identify the preferred source without accessing the data block sourcing policy. For example, if the sources have been previously ranked, the storage system can identify the preferred source by referring to the signature block without accessing the data block sourcing policy.

Figure 13:
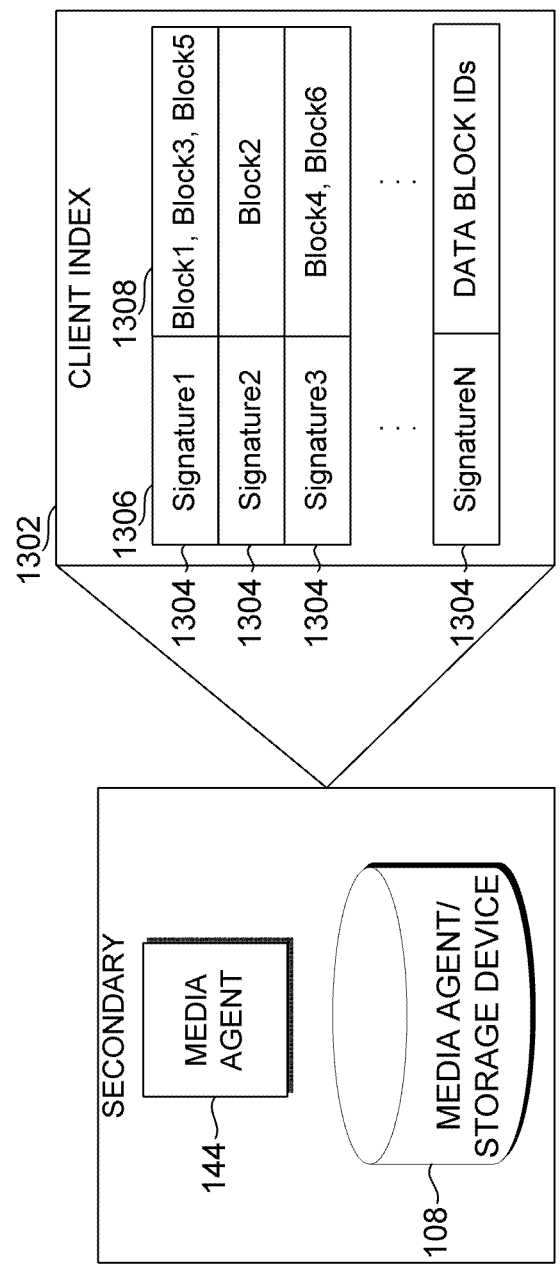
FIG. 13 is a block diagram illustrative of an expanded view of an exemplary copy data set index stored within secondary storage.

FIG. 13 is a block diagram illustrative of an expanded view of an example copy data set index 1302 stored in the storage system 100. The copy data set index 1302 can be located in one or more components of the storage system 100. In the illustrated embodiment, the copy data set index 1302 is located in the secondary storage subsystem 118 within the media agent 144 and/or the storage device 108.

Further, the copy data set index 1302 can be generated in response to a copy operation associated with a client 102. The copy data set index 1302 can include information that can be used by the storage system 100 to identify the signatures of the data blocks involved in the copy operation and/or determine how the identified data blocks are organized. The copy data set index 1302 can include information regarding substantially all of the data stored on a primary storage device(s) 104 associated with a client 102, or of select data (e.g., particular files or folders or of one or more subclients).

The copy data set index 1302 can include multiple data entries 1304. While a variety of organizational schemes are possible, in the illustrated organization, each entry 1304 provides information regarding the signature of one or more data blocks in a copy data set. For example, each entry 1304 can include a signature field 1306 and a data block ID field 1308.

The signature field 1306 can include a signature of one or more data blocks that are in the copy data set. The signature can be generated as described previously with respect to FIGS. 1A-1J, 2A, 2B, and 3. In some embodiments, each entry 1304 corresponds to a different unique signature of one or more data blocks that are in the copy data set. For example, if a particular copy operation involves 1,000 data blocks with a total of 600 different signatures, the copy data set index 1302 can include 600 different entries. In certain embodiments, each entry corresponds to an instance of each data block. For example, with continued reference to the previous example, the copy data set index 1302 in such a case would include 1,000 entries corresponding to the 1,000 data blocks involved in the storage operation.

The data block ID field 1308 can include identifiers for each data block with a signature that matches the signature in the signature field 1306. The identifiers can provide information regarding how the data blocks are related, such as the order of the data blocks with respect to one another. For example, the copy data set index 1302 for File A in the client 102B, can indicate in the data block ID fields 1308 which data block is first, second, third, and so on, so that when File A is restored to client 102B, the client 102B will know how the data blocks are to be arranged. In the illustrated embodiment, Block1, Block3, and Block5 all have the same signature (Signature1). Similarly, Block4 and Block6 share Signature3. Block2 has a unique signature. In this embodiment, Block1 corresponds to the first data block of the copy operation, Block2 corresponds to the second data block of the copy operation, etc. Accordingly, using the copy data set index 1302, the storage system 100 can identify all of the signatures in the copy data set index 1302, all of the data blocks corresponding to the signature, and the order of the data blocks with respect to each other.

The copy data set index 1302 can include additional information as desired. For example, in some embodiments, the copy data set index 1302 can include signature block reference relating the particular signature in the copy data set index 1302 with a signature block in the client-side signature repository 121. In some embodiments, the copy data set index 1302 includes additional metadata (e.g., file and directory metadata).

Figure 14:
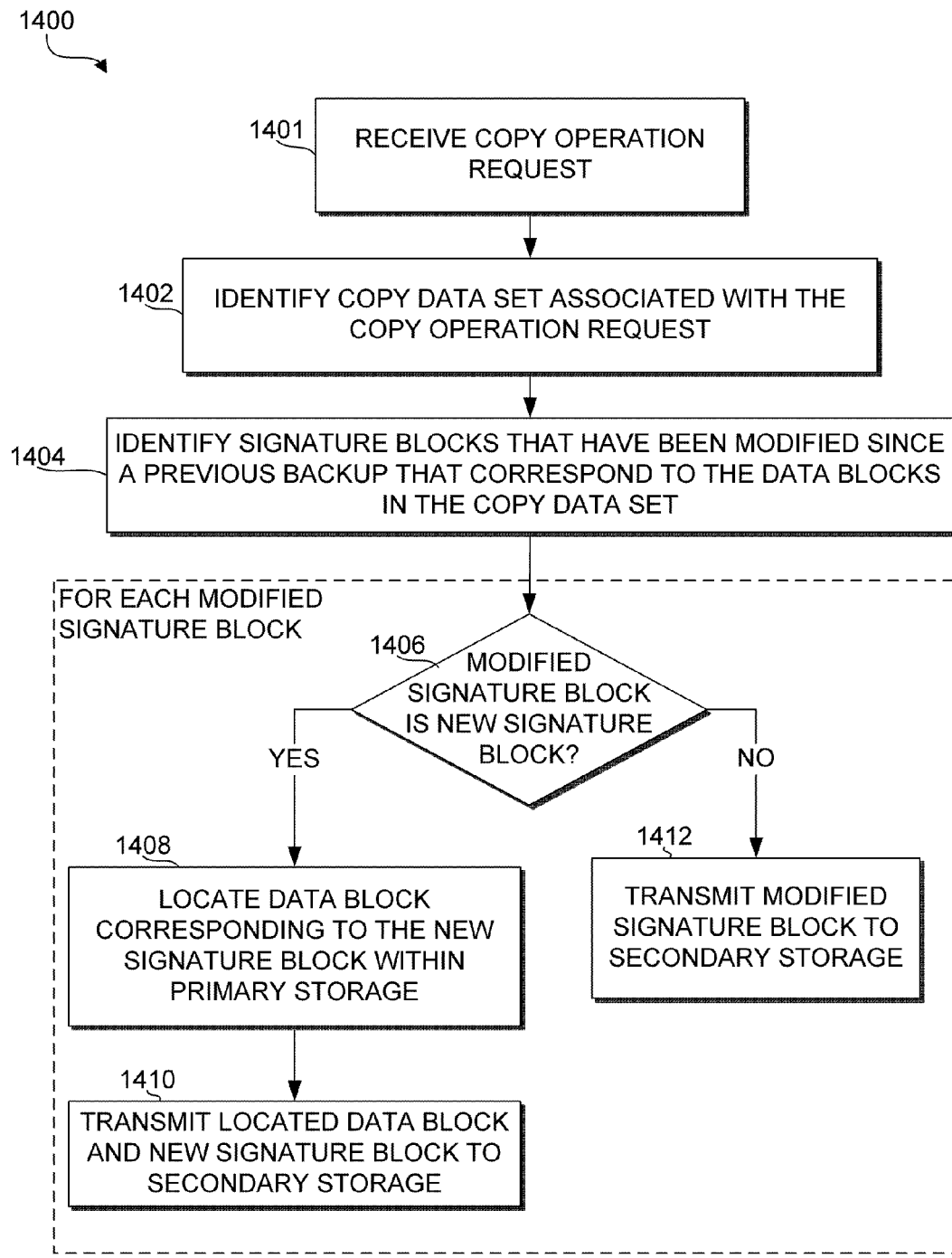
FIG. 14 is a flow diagram illustrative of another embodiment of a routine implemented by a storage system for executing a copy operation, where information relating to when entries in a client-side signature repository are updated is used to assist in the performance of the copy operation.

FIG. 14 is a flow diagram illustrative of one embodiment of a routine 1400 implemented by the storage system 100 for executing a secondary copy operation using a client-slide signature repository 121. One skilled in the relevant art will appreciate that the elements outlined for routine 1400 may be implemented by one or more computing devices/components that are associated with the storage system 100. For example, the routine 1400 can be implemented by any one, or a combination of, the storage manager 140, one or more clients 102, the client-side signature repository 121, one or more media agents 144, and/or one or more storage devices 108.

At block 1401, the storage system 100 receives a copy operation request. For example, the storage manager 140 can instruct the client 102, client-side signature repository 121, and/or media agent 144 to initiate the copy operation. The request can occur in any of the manners described herein, such as automatically according to a schedule (e.g., daily, weekly, monthly) specified in a storage policy. Alternatively, the copy operation can occur in response to user interaction with a user interface. Furthermore, the copy operation request can include information regarding a specific client whose data is to be copied, the specific data (e.g., particular files, folders, or portions thereof) that are to be copied, specific type of operation (e.g., incremental backup, full backup, snapshot, and the like).

At block 1402, the storage system 100 identifies a copy data set associated with the copy operation request.

In some embodiments, the client-side signature repository 121 includes an index of all the files, folders, etc., found on the clients 102 with which the client-side signature repository 121 is associated. For example, if the client-side signature repository 121 is associated with one client it can include an index of all the files, folders, etc., found on the one client. If the client-side signature repository 121 is associated with multiple clients it can include an index of all the files, folders, etc., found on the multiple clients. The copy data set index can be used to identify which data blocks correspond to the copy data set, and how the data blocks are organized. In other cases, such an index is stored on each client 102.

At block 1404, the storage system 100 identifies signature blocks that correspond to the identified data blocks in the copy data set and that have been modified since a previous copy operation (also referred to as a modified signature block). A modified signature block can indicate that an entry has either been added or removed to the signature block since the previous copy operation, and that a copy of the corresponding data block has either been added somewhere in primary storage or removed. Furthermore, a modified signature block can indicate that the secondary storage does not include references to all of the instances of a particular data block and/or may not include the data block at all. In this way, the system can identify which data blocks already exist in secondary storage and which do not. If the data blocks already exist in secondary storage, significant time can be saved by during deduplicated copy operations, by transmitting signature block information as part of a copy data set index, described below. The signature block information can indicate that another copy of the data block already exists in the secondary storage, instead of transmitting the entire data block.

As mentioned previously, the identification of signature blocks that have been modified since the previous copy operation can be done by reviewing the copy operation flag 212 of the signature block. Other methods can be used to identify signature blocks that have been modified since the previous copy operation. In some embodiments, the client 102, the client-side signature repository 121, and/or the media agent 144 can include an index that maps signatures of data blocks stored in a client with one or more files or folders stored in the client that have been previously copied to the secondary storage subsystem. The index can include how many data blocks are used to form a particular file and how the data blocks are organized within the file.

The storage system 100 can also use the age field 222 in the entries 214 of the signature blocks 206 stored in the client-side signature repository to identify signature blocks that have been modified since a previous copy operation. For instance, the storage system 100 can compare information in the age field, such as creation date or edit date with date information for a previous copy operation. If the age field indicates that the entry 214 was added after the previous copy operation, the storage system 100 can determine that the signature block has been modified since the previous copy operation.

For each modified signature block, the storage system 100 determines whether the modified signature block is a new signature block, as illustrated in decision block 1406. New signature blocks correspond to signatures and/or corresponding data blocks do not exist in the secondary storage subsystem 118 and/or signatures that did not exist in the client-side signature repository 121 prior to the previous backup. Signature blocks that are not new can correspond to signatures and/or corresponding data blocks that have been stored in the secondary storage subsystem 118 in conjunction with a previous copy operation (e.g., as part of a copy data set index or otherwise) and/or existed in the client-side signature repository 121 prior to the previous backup. The system 100 can determine whether the signature block is new in a variety of ways. For instance, to determine whether the signature block is new, the system 100 can determine when the signature block was created. If the signature block was created after a previous copy operation, the signature block can be identified as new. In some embodiments, if the signature block contains only one entry, and the one entry is a new entry, the signature block is identified as new. Furthermore, the system can refer to a copy operation flag in the signature block that indicates whether the signature blocks has been part of a copy data set in a copy operation (e.g., has already been backed up to secondary storage). Similarly, the system 100 can determine that the signature block is not new in many different ways. For example, the system can determine that the signature block is not new when multiple entries are included in the signature block, when the signature block was created prior to a previous copy operation that included the corresponding data block, when the copy operation flag indicates that the signature block has not been part of a copy operation, or any number of other ways, or any combinations thereof.

Upon determining that the modified signature block is a new signature block, the storage system 100 locates the data block corresponding to the new signature block within the primary storage subsystem 117 as illustrated in block 1408. The storage system 100 can also identify the data block corresponding to the signature found in the signature block as a new data block. In some embodiments, the storage system locates the data block within the client 102B. In certain embodiments, the storage system 100 locates the data block within one or more clients other than client 102B, such as client 102A and 102C.

Once the data blocks corresponding to the new signature blocks have been identified, the storage system 100 transmits the located data blocks and new signature blocks to the secondary storage subsystem 118, as illustrated in block 1410. In some embodiments the storage system 100 transmits portions of the new signature block but not the entire signature block. In certain embodiments, the storage system 100 waits until all modified signature blocks have been reviewed and transmits multiple located data blocks and multiple new signature blocks to secondary storage. In some embodiments the storage system 100 transmits all of the located data blocks and all of the new signature blocks to secondary storage simultaneously.

If the storage system 100 determines that the modified signature block is not a new signature block, the storage system 100 transmits the modified signature block to the secondary storage subsystem 118, as illustrated in block 512. By identifying the modified signature block as not being a new signature block, the storage system 100 has determined that the corresponding signature that is being reviewed was stored in the client-side signature repository 121 prior to the previous storage operation and/or that the corresponding data block exists in the secondary storage subsystem 118. Accordingly, only the signature block or portions thereof (e.g., just the signature), and not the data block itself, are transmitted to secondary storage, so that secondary storage can update the maps and indices related to the client 102B.

One skilled in the relevant art will appreciate that routine 1400 can include fewer, more, or different blocks than those illustrated in FIG. 14. For example, the storage system 100 can transmit a copy data set index (FIGS. 13-14) to the media agent 144. The copy data set index can include signature information for all of the data blocks that correspond to the copy data set. In some embodiments, once the storage system 100 identifies the signature blocks corresponding to the data blocks in the copy data set and that have been modified since a previous copy operation, the storage system 100 identifies which of the identified signature blocks constitute new signature blocks, as described previously. The storage system 100 then locates and transmits the data blocks corresponding to the new signature blocks to secondary storage. The storage system can also transmit the copy data set index to the media agent, which includes the signature information for all of the data blocks in the copy data set.

Further, the retrieved data (data blocks and/or signature blocks) can be sent from their respective locations either individually or bundled together. In certain embodiments, a component of the storage system 100 can bundle all the data blocks and/or signature blocks together in groups prior to sending the data to secondary storage. Furthermore, a copy data set index can be generated or retrieved and sent to secondary storage as well. The copy data set index can indicate how the various data blocks are related. For example, the copy data set index can indicate the order of the data blocks with respect to one another (e.g., for a particular file, group of files, or other copy data set).

For any of the embodiments described herein, the copies of the data blocks residing in the primary storage subsystem 117 that are sourced for generating secondary copy data sets or restore data sets were generated by programs (e.g., software applications) executing on a client 102 during normal operation. For example, the copies form a portion of a file, folder, or other type of primary data, and are not cache copies (e.g., copies made for the purpose of decreasing retrieval time and removed on a first-in-first-out basis) of other data blocks stored on the target client 102.

It will be appreciated by those skilled in the art and others that all of the functions described in this disclosure may be embodied in software executed by one or more processors of the disclosed components and mobile communication devices. The software may be persistently stored in any type of non-volatile storage.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other suitable interfaces.

Further, the processing of the various components of the illustrated systems can be distributed across multiple machines, networks, and other computing resources. In addition, two or more components of a system can be combined into fewer components. Various components of the illustrated systems can be implemented in one or more virtual machines, rather than in dedicated computer hardware systems. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flow chart and/or block diagram block or blocks.

These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the acts specified in the flow chart and/or block diagram block or blocks.

While certain embodiments have been described, these embodiments have been presented by way of example only, and are not intended to limit the scope of the disclosure. Indeed, the novel methods and systems described herein may be embodied in a variety of other forms; furthermore, various omissions, substitutions and changes in the form of the described methods and systems may be made without departing from the spirit of the disclosure. The accompanying claims and their equivalents are intended to cover such forms or modifications as would fall within the scope and spirit of the disclosure.

What is claimed is:

1. A method of sourcing data from storage associated with a pool of computing devices during a data storage operation associated with one of the computing devices in the pool, the method comprising:

obtaining signatures corresponding to data units that form a data set associated with a data storage operation, the data set corresponding to a version of one or more files of primary data of a first computing device in a pool of a plurality of computing devices, each respective computing device in the pool storing primary data generated by one or more software applications executing on the respective computing device, the primary data stored in at least one storage device associated with the respective computing device, wherein the storage devices of the computing devices in the pool store a plurality of data units of primary data including at least the data set stored in the at least one storage device of the first computing device, wherein each file of a plurality of files of primary data stored in the storage devices comprises at least one data unit of the plurality of data units, wherein at least a first data unit of the data set forms at least a portion of a first file of primary data stored in the at least one storage device of the first computing device and a second data unit of the plurality of data units matches the first data unit and forms at least a portion of a second file of primary data stored in the at least one storage device of a second computing device of the plurality of computing devices, and wherein the first file and the second file are generated by the one or more software applications executing on the first computing device and the second computing device, respectively;

populating, by one or more processors, a shared signature repository that includes:

signatures corresponding to at least each data unit of the plurality of data units, wherein a first signature corresponds to the first data unit and the second data unit; and for each signature included in the signature repository, an indication as to one or more of the computing devices whose at least one storage device includes an independently generated data unit that corresponds to the signature, wherein each independently generated data unit forms at least a portion of a distinct file residing on the respective storage device, and wherein the shared signature repository includes at least a first indication that indicates a first location of the first data unit in the at least one storage device of the first computing device and a second location of the second data unit in the at least one storage device of the second computing device;

comparing the obtained signatures, including a signature of the first data unit, with the signature repository to identify one or more matching data units, including the second data unit, stored in the respective at least one storage device of the computing devices in the pool, wherein each of the one or more matching data units forms at least a portion of a read/write file residing in the respective storage device and is stored in a native format of the respective software application that generated the respective matching data unit;

consulting, by one or more processors, a priority policy; and based on the priority policy, and for at least the first data unit in the data set, determining to access the second data unit rather than the first data unit for the data storage operation.

2. The method of claim 1, wherein the priority policy includes an indication as to a relative priority of one or more of the computing devices with respect to one or more others of the computing devices.

3. The method of claim 1, wherein the data storage operation comprises a backup copy operation in which a copy of the data set is stored in secondary storage that is separate from the pool of computing devices and from each at least one storage device of the respective computing devices.

4. The method of claim 1, wherein the data storage operation comprises a restore operation in which the data set is restored to the at least one storage device associated with the first client computing device.

5. The method of claim 4, wherein at least some of the data units in the data set are sourced from secondary storage which is separate from the pool of computing devices and is separate from each at least one storage device of the respective computing devices.

6. The method of claim 1, wherein said consulting is performed by a data sourcing module executing on one or more processors of a computing device that is separate from the pool, and wherein the signature repository is separate from each of the at least one storage devices.

7. The method of claim 1, wherein at least 10 percent of the data units are sourced from the at least one storage device of computing devices in the pool other than the first computing device.

8. The method of claim 1, wherein at least 25 percent of the data units are sourced from the at least one storage device of computing devices in the pool other than the first computing device.

9. The method of claim 1, wherein at least 50 percent of the data units are sourced from the at least one storage device of computing devices in the pool other than the first computing device.

10. The method of claim 1, wherein all of the data units are sourced from the at least one storage device of one or more computing devices in the pool other than the first computing device.

11. A storage system for sourcing data from storage associated with a pool of computing devices during a data storage operation associated with one of the computing devices in the pool, the storage system comprising:

a global signature repository including:

signatures corresponding to at least each data unit of a plurality of data units of primary data, the plurality of data units stored in storage devices associated with a plurality of computing devices in a pool, wherein each file of a plurality of files of primary data stored in the storage devices comprises at least one data unit of the plurality of data units, wherein at least a first data unit of the plurality of data units forms at least a portion of a first file of primary data stored in a first storage device associated with a first computing device of the plurality of computing devices and a second data unit of the plurality of data units matches the first data unit and forms at least a portion of a second file of primary data stored in a second storage device associated with a second computing device of the plurality of computing devices, wherein the first file and the second file are generated by one or more software applications executing on the first computing device and the second computing device, respectively, and wherein a first signature of the signatures corresponds to the first data unit and the second data unit; and for each signature included in the signature repository, an indication as to one or more of the plurality of computing devices whose at least one storage device includes an independently generated data unit that corresponds to the signature, wherein each independently generated data unit forms at least a portion of a distinct file residing on the respective storage device, and wherein the global signature repository includes at least a first indication that indicates a first location of the first data unit in the first storage device and a second location of the second data unit in the second storage device; and a repository agent executing in one or more processors and configured to:
  obtain signatures corresponding to data units that form a data set associated with a data storage operation, the data set corresponding to a version of one or more files of primary data of the first computing device and including the first data unit;
  compare the obtained signatures, including a signature of the first data unit, with the signature repository to identify one or more matching data units, including the second data unit, stored in the respective at least one storage device of the computing devices in the pool, wherein each of the one or more matching data units forms at least a portion of a read/write file residing in the respective storage device and is stored in a native format of the respective software application that generated the respective matching data unit;
  consult a priority policy; and
  based on the priority policy, and for at least the first data unit in the data set, determine to access the second data unit rather than the first data unit for the data storage operation.

12. The system of claim 11, wherein the priority policy includes an indication as to a relative priority of one or more of the computing devices with respect to one or more others of the computing devices.

13. The system of claim 11, wherein the data storage operation comprises a backup copy operation in which a copy of the data set is stored in secondary storage that is separate from the plurality of computing devices and from each at least one storage device of the respective computing devices.

14. The system of claim 11, wherein the data storage operation comprises a restore operation in which the data set is restored to the at least one storage device associated with the first client computing device.

15. The system of claim 14, wherein at least some of the data units in the data set are sourced from secondary storage which is separate from the plurality of computing devices and is separate from each at least one storage device of the respective computing devices.

16. The system of claim 11, wherein the repository agent executes on one or more processors of a computing device that is separate from the pool and wherein the signature repository is separate from the storage devices.

17. The system of claim 11, wherein at least 10 percent of the data units are sourced from the at least one storage device of computing devices in the pool other than the first computing device.

18. The system of claim 11, wherein at least 25 percent of the data units are sourced from the at least one storage device of computing devices in the pool other than the first computing device.

19. The system of claim 11, wherein at least 50 percent of the data units are sourced from the at least one storage device of computing devices in the pool other than the first computing device.

20. The system of claim 11, wherein all of the data units are sourced from the at least one storage device of one or more computing devices in the pool other than the first computing device.

* * * * *